United States Patent [19]

Collins

[11] Patent Number: 5,581,454
[45] Date of Patent: Dec. 3, 1996

[54] HIGH POWER SWITCHED CAPACITOR VOLTAGE CONVERSION AND REGULATION APPARATUS

[76] Inventor: Hansel Collins, 901 C Ridgefield Cir., Clinton, Mass. 01510

[21] Appl. No.: 345,817

[22] Filed: Nov. 22, 1994

[51] Int. Cl.⁶ .................................... H02M 3/18
[52] U.S. Cl. .................................... 363/59; 363/62
[58] Field of Search .................... 363/59, 60, 62, 363/74, 78, 79; 323/282, 283, 285; 307/109, 110

[56] References Cited

U.S. PATENT DOCUMENTS 5,095,223  3/1992  Thomas ........................... 307/110
5,414,614  5/1995  Fette et al. ......................... 363/59

Primary Examiner—Peter S. Wong
Assistant Examiner—Aditya Krishnan
Attorney, Agent, or Firm—Wenderoth, Lind & Ponack

[57] ABSTRACT

A DC-to-DC voltage convertor is made up of a capacitor array having plural capacitor elements ($C_{p1}$, $C_{p2}$, $C_{p3}$) and a plurality of switches (S2 ... S10) which are switchable between at least two states. When the switches are switched in the first state, the capacitor elements are connected in series, and when the switches are connected in the second state, the capacitor elements are connected in parallel. The DC-to-DC voltage convertor may be configured as a step-down convertor (FIG. 2a) or a step-up convertor (FIG. 2b).

12 Claims, 30 Drawing Sheets

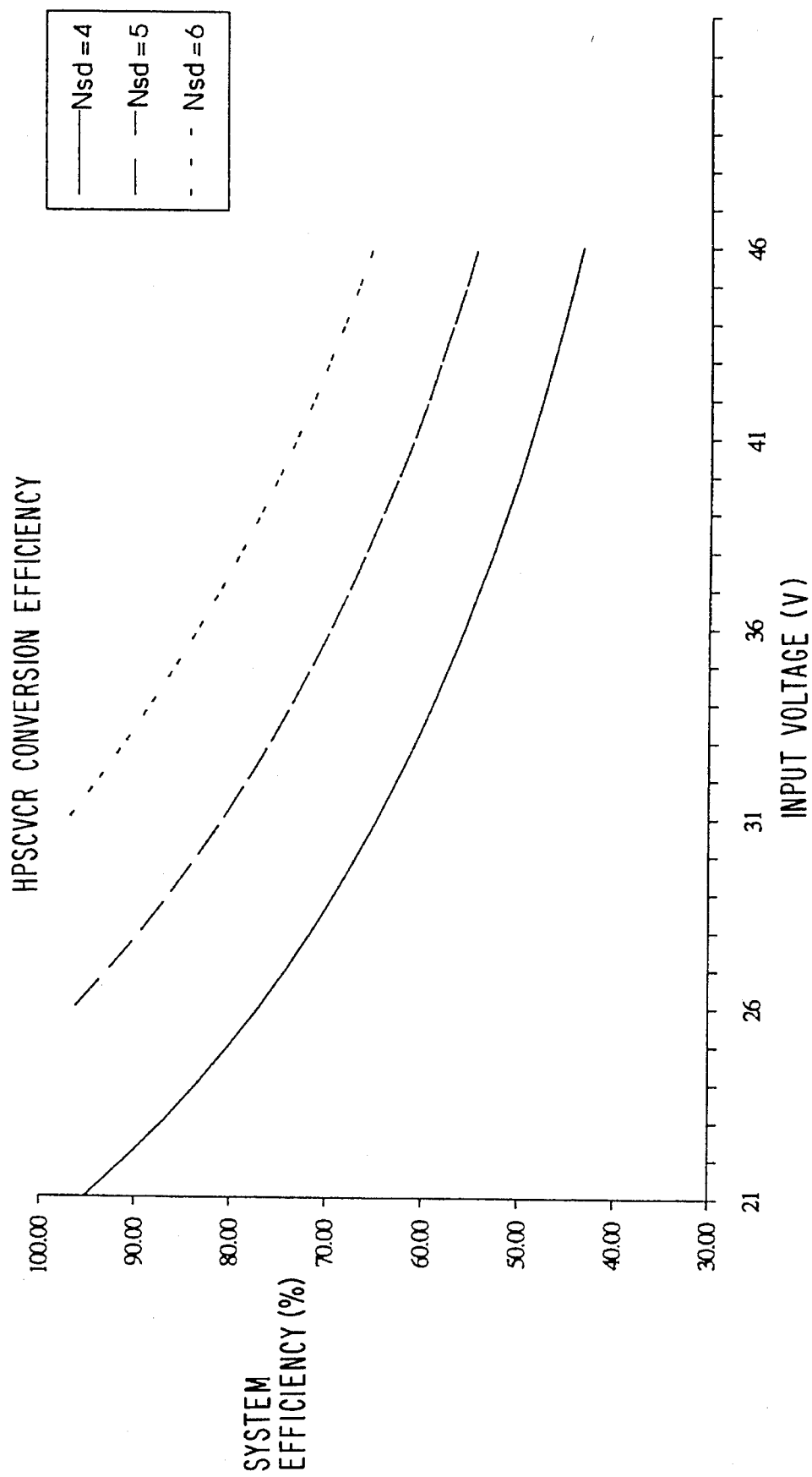

Equivalent Cap Xfmr Input Charge circuit

Equivalent Cap Xfmr Output Charge circuit

FIG. IIa
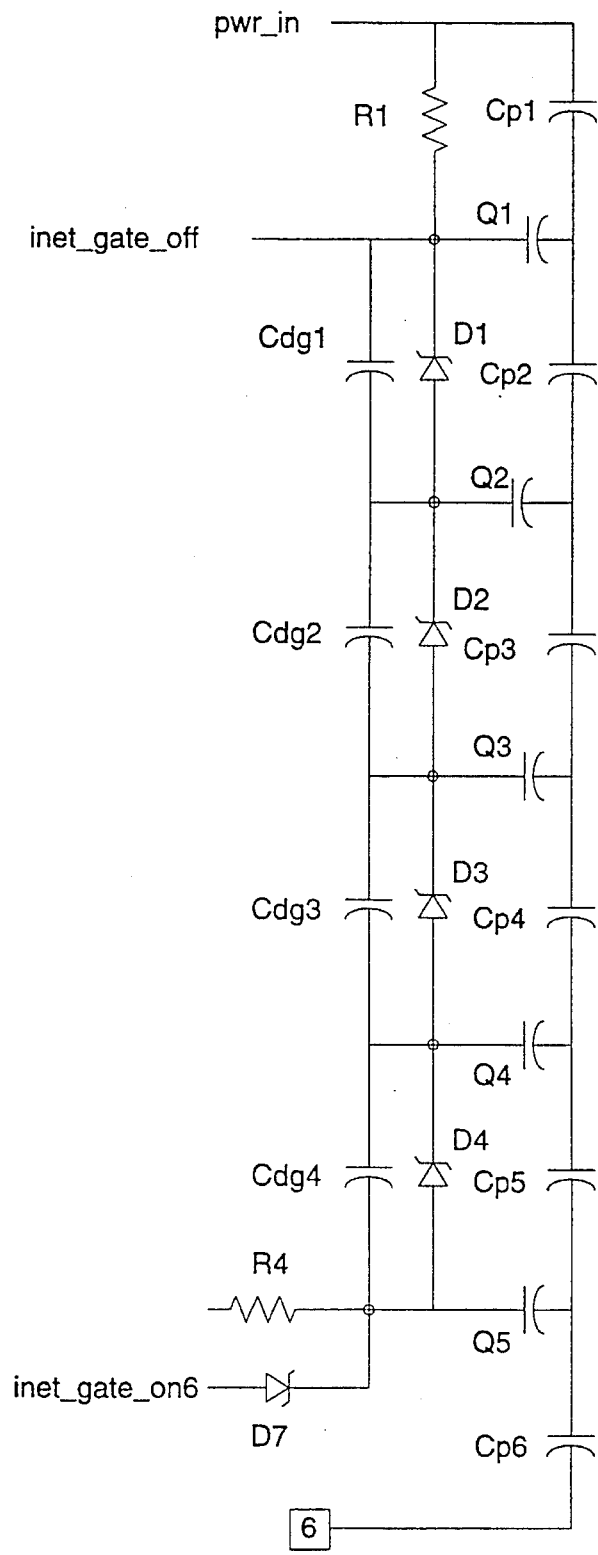

HIGH POWER SWITCHED CAPACITOR VOLTAGE CONVERSION AND REGULATION APPARATUS

BACKGROUND OF THE INVENTION

1. Field of the Invention

The present invention relates to a DC-to-DC voltage converter, and more particularly, to a DC-to-DC voltage converter employing a capacitive transformer array.

2. Description of the Related Art

It is the objectives of all types of DC-to-DC voltage converter designs to produce output power at the desired voltage level efficiently and to be available in small package sizes. Additional goals for all DC-to-DC voltage converter designs is to also provide fast response times and a wide operational input voltage range. In practice, however, the type of conversion process employed affects all of the goals listed above forcing "trade-offs" between intended application (end use) and the DC-to-DC voltage converter design selected.

Presently there are three basic types of DC-to-DC voltage regulators: Transformer based switching voltage converter-regulators, Linear Voltage regulators, and Switched capacitor voltage regulators. Of these, only the transformer based switching voltage converter designs offer power conversion which also offers the best all around performance. Both the linear regulator and switched capacitor regulator designs implement an attenuation and therefore can not perform power conversion. Hence, the maximum of efficiency of this approach is limited to the ratio of the applied input voltage to the desired output voltage as shown below in equation EQa. This is because with the attenuation approach the input current, $I_{in}$, is approximately equal to the output current, $I_{out}$.

EQ 1:

$$\eta = \frac{P_{out}}{P_{in}} \times 100\%$$

$$= \frac{I_{out} \cdot V_{out}}{I_{in} \cdot V_{in}} \times 100\% \text{ where: } I_{out} \approx I_{in}$$

$$= \frac{V_{out}}{V_{in}} \times 100\%$$

NOTE: $V_{in} > V_{out}$

The transformer based DC-to-DC voltage converter designs offer the best all around performance in terms of available output power, operational efficiency, and input voltage range. However, these designs generates large amounts of electrical noise, and generally require more board area than either of the linear or switched capacitor regulators. In addition, the response times of the transformer based DC-to-DC voltage converter designs are usually very large. Those applications that does not require any of the major advantages of the transformer based DC-to-DC voltage converter designs usually will implement a solution based on a linear regulator design. Still a smaller number of application will select a switched capacitor based DC-to-DC voltage converter designs due to its size, and when voltage inversion is required. The Table 1 below shows the DC-to-DC voltage converter designs and typical output voltage and power.

TABLE 1

| | DC-to-DC Converter Types | | | |
|---|---|---|---|---|
| Convert Type | Typical Input Voltage Range | Typical Output Voltage Range | Typical Output Power | Typical Operational Efficiency |
| Switched Capacitor Regulators (1) | −16 V | −12 V to +12 V | 0.5 W | $V_{out}/V_{in}$ (3) |
| Linear Regulators-Series | $V_{out}$ + 1.0 V −36 V | 1.2 V−24 V | <1 W−60 W | $V_{out}/V_{in}$ (3) |
| Linear Regulators-Shunt | | | | |
| Transformer Based Switchers (1) | 5 V−110 V | 2.0 V−48 V | 2 W− 1500 W | 72%−90% (2) |

(1) Inverted output voltage from positive voltage source
(2) Highest efficiency occurs at higher output voltage
(3) This is the maximum efficiency possible

Linear Voltage Regulators

Linear voltage regulators operate using either a shunt regulating or series regulating topology. Both of these techniques requires the use of active devices to implement the regulating function. The advantage of both these schemes is that they have fast response times (limited by the feedback network response and the regulating active device) and can be integrated into very small packages. The disadvantage of the linear voltage regulators is that they are both very inefficient. As a result they dissipate large amounts of power having some to require heat sinks at power output levels of 1 W or greater.

In the case of the shunt regulating topology the active device is used to divert any excess current from the load network to maintain a constant output voltage. Because the shunt regulator topology requires that the active device carry all of output current under a no load condition makes this topology unsuitable for high power applications. Hence, shunt regulators which are typically zener diodes, are typically used to provide low power voltage references.

For the series regulator topology the active device is used to accumulate the voltage difference between the input and output networks. In this scheme a forward biased transistor (usually a bipolar transistor) is the output device used to regulate the output voltage. Regulation is accomplished by controlling the current flow through the output transistor to maintain the desired output voltage, having any difference between the applied input voltage and the desired output voltage appear across this device. Hence, as the difference between the output and input voltages increases the power dissipated by the output transistor also increases. In addition, no power conversion is possible since the input current is equal to or greater than the regulator's output current which greatly lowers the efficiency of this scheme. For these reasons, the series regulator topology is usually limited to low power voltage regulation applications where high efficiency and isolation is not required.

Switched Capacitor Regulators

Switched capacitor regulator designs employ the flying capacitor techniques. In this scheme a small capacitor is electronically switched between the input and output ports to transfer charge it had received from the input port to the output port. Output voltage regulation is accomplished by controlling the switching rate of the flying capacitor and the ratio between this capacitor to the output capacitor values. In the commercially available designs, a single capacitive element is used to implement the flying capacitor function. Because only a single capacitive element is used, no "power" conversion is possible with this scheme since there is no change in the flying capacitor's value. So that the input port current remains equal to or greater than the output port current. Hence, the efficiency of the switched capacitor voltage regulator is approximately equal to that of the linear series regulator. The major advantage of the switched capacitor regulator is that it has voltage inversion capabilities (i.e. produce a negative output voltage from a positive voltage source).

Transformer Based Switching Converters

Transformer based designs are the most common of the high powered DC-to-DC voltage converters in use today. These designs employ a transformer which has its primary windings excited by pulses of DC current. This causes a current to be induced in the secondary windings of the transformer. Both the amount of the current and the voltage induced in the secondary of the transformer is a function of the primary to secondary "turns" ratio and the primary input DC current pulse rate, duration, and amplitude. The output of the transformer's secondary is an AC voltage and must be rectified and filtered to produce the DC output voltage. Output voltage regulation is typically achieved using a Pulse Width Modulation or PWM technique, where duration of the DC current pulse widths in the transformer's primary is varied to obtain the desired output voltage.

There are a number of benefits offered by the transformer based DC-to-DC voltage converter, with the greatest being it efficient power conversion (typically 70% to 82% at 5 V). Because the transformer's secondary voltage and current is a function of the turns ratio true power conversion is achieved for both the voltage step-up or step-down versions. Since the primary and secondary windings of the transformers are electrically isolated, the DC-to-DC voltage converter can provide input to output network isolation.

In a well designed transformer based DC-to-DC voltage converter, the greatest limitations offered to its performance (i.e. overall efficiency, power density, and load step response times) is found in the areas of its transformer and the rectifiers used in its secondary. The rectifiers used in the output network have a large "ON" resistance when forward biased, typically 20 to 100 times greater than that of a comparable power MOSFET. In addition a small forward "ON" voltage is introduced by the rectifier so that significant power loss is realized with any sizable rectifier current. Still another limitation offered by the semiconductor rectifiers is that they have a maximum operational frequency above which the rectifier stops rectifying and appear as a short. This is due to the reverse recovery time of the device, so that the frequency of the AC voltage must remain below this value. The net effect of the semiconductor characteristics is to lower the operational frequency and converter efficiency. Some of the effects can be partially reduced by the use of physically larger components.

The limitation offered by the transformer is in their frequency range. The high inductive nature and parasitic capacitance, which are present in all transformers, limits the operational frequency range of the transformer. This also increases the voltage converters response time to any significant change in its load current.

SUMMARY OF THE INVENTION

An object of the present invention is to overcome the drawbacks of conventional DC-to-DC converters by provision of what will be called herein a "High Power Switched Capacitor Voltage Conversion and Regulation" architecture.

The High Power Switched Capacitor Voltage Conversion and Regulation (HPSCVCR) architecture is a family of transformer-less based DC-to-DC voltage converters. The HPSCVCR architecture utilizes modified switched capacitor techniques to transform the input voltage to the desired output value. As a result, DC-to-DC voltage converter designs based on the HPSCVCR architecture offers both high output power and efficiency at all converter output voltage levels. In addition, this architecture can provide converter designs that have very fast response times and are capable of achieving power densities of 100 watts per cubic inch and greater. Some of the highlights of this invention are listed below.

Invention Highlights:
High efficiency: 90% or greater under worst case conditions
High output power: 2 W to 750 W (theoretical)
Very fast response times: less than 500 nS no-load to load step
Low EMI signature (theoretical)
Very high power density: approximately
Full Input-to-Output isolation This invention operates on the "flying capacitor" techniques which, as noted above, are also used in other switching capacitor converter designs. In this technique a small capacitor, $C_p$, is electronically switched between the converter's input and output networks transferring the charge to the output network and external load that it had received from the input DC voltage source. The amount of power that is delivered to the external load is largely dependent upon the rate at which the small capacitor, $C_p$, is being switched between the input and output networks. FIG. 1 shows a simplified switching capacitor voltage converter that shares a common input and output return path. This is a typical switching capacitor voltage converter architecture that is used commercially today. A brief description of the simplified switching capacitor voltage converter is given below.

The operational cycle of the switching capacitor DC-to-DC voltage converter is divided into four phases called conduction angles, these are: 1) input conduction angle, 2) input break angle, 3) output conduction angle, and 4) an output break angle. The input and output break angles are in place to implement a "brake-before-make" operation. This is needed to prevent an input to output short by insuring that S1 and S2 have enough time to reach their respective open (i.e. non-conductive) states before the other starts to conduct.

During the input conduction angle, electronic switch S1 is closed and S2 is opened. The charge pump capacitor $C_p$ is now connected across the input network while being electrically isolated from the output network. The input conduction angle is made long enough to ensure that the charge pump capacitor $C_p$ is sufficiently charged. At the end of the input conduction angle, the input break angle time period is entered. It is during this phase of the operational cycle that both S1 and S2 are in their open state. Upon entering the output conduction angle of the cycle, S1 remains in its open state while S2 is moved into its closed state. With S1 and S2 in their respective states, the charge pump capacitor $C_p$ is electrically connected to the output network and external load while being isolated from the input network. The output voltage and power delivered by this system is determined by three primary factors: 1) the ratio of $C_p$ to $C_{out}$, 2) the output conduction angle time length, and 3) the rate at which the charge pump capacitor is switched between the input and output networks (i.e. the switching frequency).

In general, output voltage regulation is achieved by controlling the amount of charge that is delivered to the external load. For the switching capacitor DC-to-DC voltage converter, this is achieved by controlling the time length of the output conduction angle and the rate at which the charge pump capacitor $C_p$, is switched between the input and output networks. The switching frequency required to achieve a particular output power level to a great extent is determined by the ratio of $C_p$ to $C_{out}$ along with other circuit parameters (i.e. DC path resistances). The $C_p$ to $C_{out}$ ratio also affects the efficiency of the converter.

The simplified circuit shown in FIG. 1 has a number of significant limitations. The most significant limitation is that there is no power conversion, hence the input current is equal to the output current. Therefore, the efficiency of this architecture is defined by the ratio of the output to input voltages as described by equation EQ2.

EQ 2:
$$\text{Efficiency} = \frac{P_{out}}{P_{in}} \times 100\%$$
$$= \frac{V_{out}I}{V_{in}I} \times 100\%$$
$$= \frac{V_{out}}{V_{in}} \times 100\%$$

The second limitation is that the internal power loss for this type of converter is proportional to the square of the input to output voltage difference which is described by equation EQ3. As a result, the input operational voltage range and delivered output power of this architecture has server limitation.

$$P_{loss} = C_p \Delta V^2 f = \Delta V I_{out} \qquad \text{EQ3:}$$

$\Delta V$—is the difference between the input to output voltages $f$—is the switching capacitor converter's frequency of operation

HPSCVCR Overview

The HPSCVCR architecture of the present invention addresses the limitations of the conventional switching capacitor DC-to-DC voltage converter's architecture with the implementation of the "capacitive transformer". The capacitive transformer is used to in place of the charge pump capacitor, $C_p$, shown in the simplified circuit of FIG. 1. The 'capacitive transformer' is a set of capacitors that can be electronically configured into either a series or parallel connected capacitor array. By selecting the capacitor array configuration that receives charge from the input DC voltage source and the configuration that delivers this charge to the output network and external load, a voltage "step-up" or "step-down" function can be realized. Additionally, because there is this change in the effective capacitance offered by the capacitive transformer when viewed from the input network as when viewed from the output network the input and output currents are different (i.e. $I_{in} = \{C(input)/C(output)\} I_{out}$). Hence, true power conversion is realized which allows for a conversion efficiency that is greater than the input to output voltage ratio. Table 2 lists the input and output capacitor configurations for both the step-up and step-down capacitive transformer types.

Practical capacitive transformer designs perform either the voltage step-up or step-down function only. This restriction is due mainly to the currently available electronic components needed to implement the required circuits. However, this restriction also benefits the capacitive transformer designs in that it reduces circuit complexity and as a result increases the overall system performance.

TABLE 2

| Capacitive Transformer Operational Configurations | | |
|---|---|---|
| Capacitive Transformer Type | Input Capacitor Array Configuration | Output Capacitor Array Configuration |
| Step Down | Series | Parallel |
| Step Up | Parallel | Series |

Output voltage regulation of the HPSCVCR architecture based converter designs is achieved by controlling the period of time that the capacitive transformer is electrically connected to its output network and external load. Hence, both the voltage conversion process (i.e. step-up or step-down) and output voltage regulation is achieved directly through the precise control of the capacitive transformer's operation. Because the voltage conversion process and output voltage regulation are achieved through the control of the capacitive transformers, the HPSCVCR DC-to-DC voltage converters are essentially "designed" around the capacitive transformer. This produces a total of four basic variants or sub-architecture of the HPSCVCR architecture family. These are: 1) the Voltage Step-Down Architecture (VSDA), 2) the Voltage Step-Up Architecture (VSUA), 3) the Integrate Step Up/Down Architecture (ISUDA), and 4) the Integrate Step Down/Up Architecture (ISDUA). A brief description of each is given below.

1. The Voltage Step Down Architecture or VSDA variant is based solely on the step-down capacitive transformer. This is an important variant of the HPSCV CR architecture in that it is one of the simplest of the HPSCVCR architecture variants and has a large number of application possibilities. However, its conversion efficiency, although high, is affected by the applied input DC voltage. By reducing or 'fixing' the input DC voltage to a particular value or sets of values these affects can be controlled.

2. The Voltage Step Up Architecture or VSUA variant is based solely on the step-up capacitive transformer. This is another important variant of the HPSCVCR architecture family. It is one of the simplest of the HPSCVCR architecture based designs and should have a number of application possibilities. Much like the VSDA variant, the VSUA design conversion efficiency is high, but is also affected by the applied input DC voltage. By reducing or 'fixing' the input DC voltage to a particular value or sets of values these affects can be controlled.

3. The Integrate Step Up/Down Architecture or ISUDA design is the concatenation of the VSUA and VSDA variants to form a single system. With this combination, the VSUA section of the ISUDA design operates as a pre-converter and provides a constant input DC voltage for the VSDA section. The post-converter operation of the VSDA section can now be operated at a 'fixed' input voltage (supplied by the VSUA section) which would yield its optimal performance. In addition a number of protocols can be implemented that would allow the ISUDA performance to be unaffected by the input DC voltage. In general, the ISUDA variant has the highest overall performance of the HPSCVCR architecture family in terms of its operational efficiency, delivered output power, and input DC voltage range.

4. The Integrate Step Down/Up Architecture or ISDUA variant of the HPSCVCR architecture is believed to have the least number of possible applications. Hence, the amount of development will be very limited.

BRIEF DESCRIPTION OF THE DRAWINGS

The advantage and features of the present invention will become more apparent in the detailed description that follows with reference to the accompanying drawings, in which:

FIG. 6 shows a VSDA efficiency family of curves for a DC-to-DC voltage converter which with an output of 10 W at 5 V, FIG. 11a shows a CMA PTD gate drive distribution sub-circuit. Shown is a six segment implementation design.

DETAILED DESCRIPTION OF THE PREFERRED EMBODIMENTS

HPSCVCR OVERVIEW

VSDA and VSUA Overview

The operational cycles of both the VSUA and the VSDA variants are similar to the operational cycle of the commercially available switching capacitor DC-to-DC voltage converters. As in the case of commercially available switching capacitor DC-to-DC voltage converters, the operational cycle of the VSUA divided into four phases called sequences. These sequences are the equivalent to the conduction angles used in the commercially available switching capacitor voltage converters. The four sequences are: the input and output conduction sequences and the respective input and output transitional dead zones sequences. The input conduction sequence is used to charge the capacitors of the capacitive transformer from the input DC voltage source. During the output conduction sequence, the charge that was stored in the capacitive transformer is transferred to the output network and external load. The two remaining sequences are the input and output transitional dead zones sequences. The input and output transitional dead zone sequences are used to provide a "break-before-make" function to separate the input and output conduction sequences. This is done to ensure the isolation between the input and output networks.

Figure 2A:
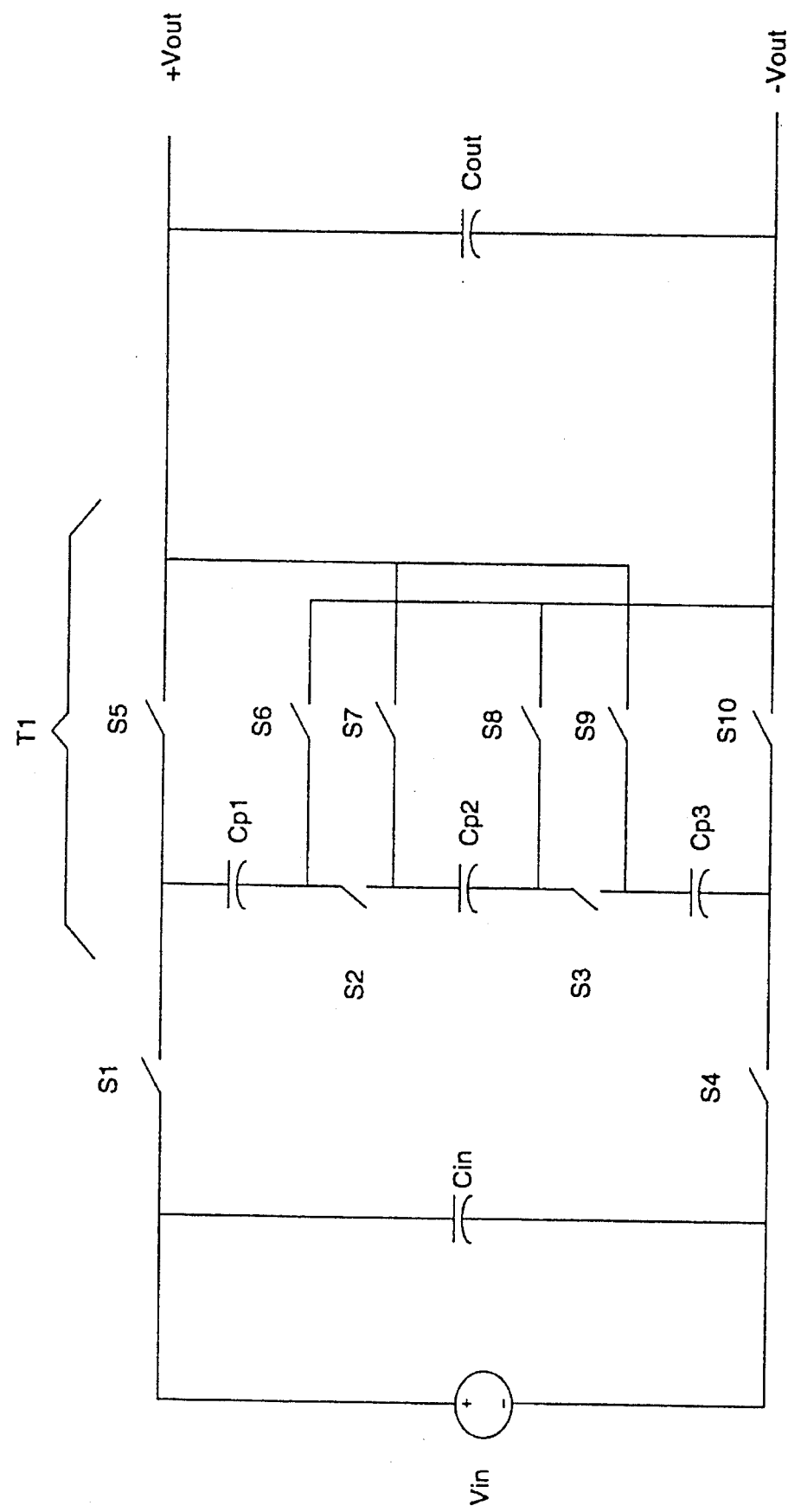
FIG. 2a shows a VSDA version (step-down configuration) of the HPSCVCR architecture.
Figure 2B:
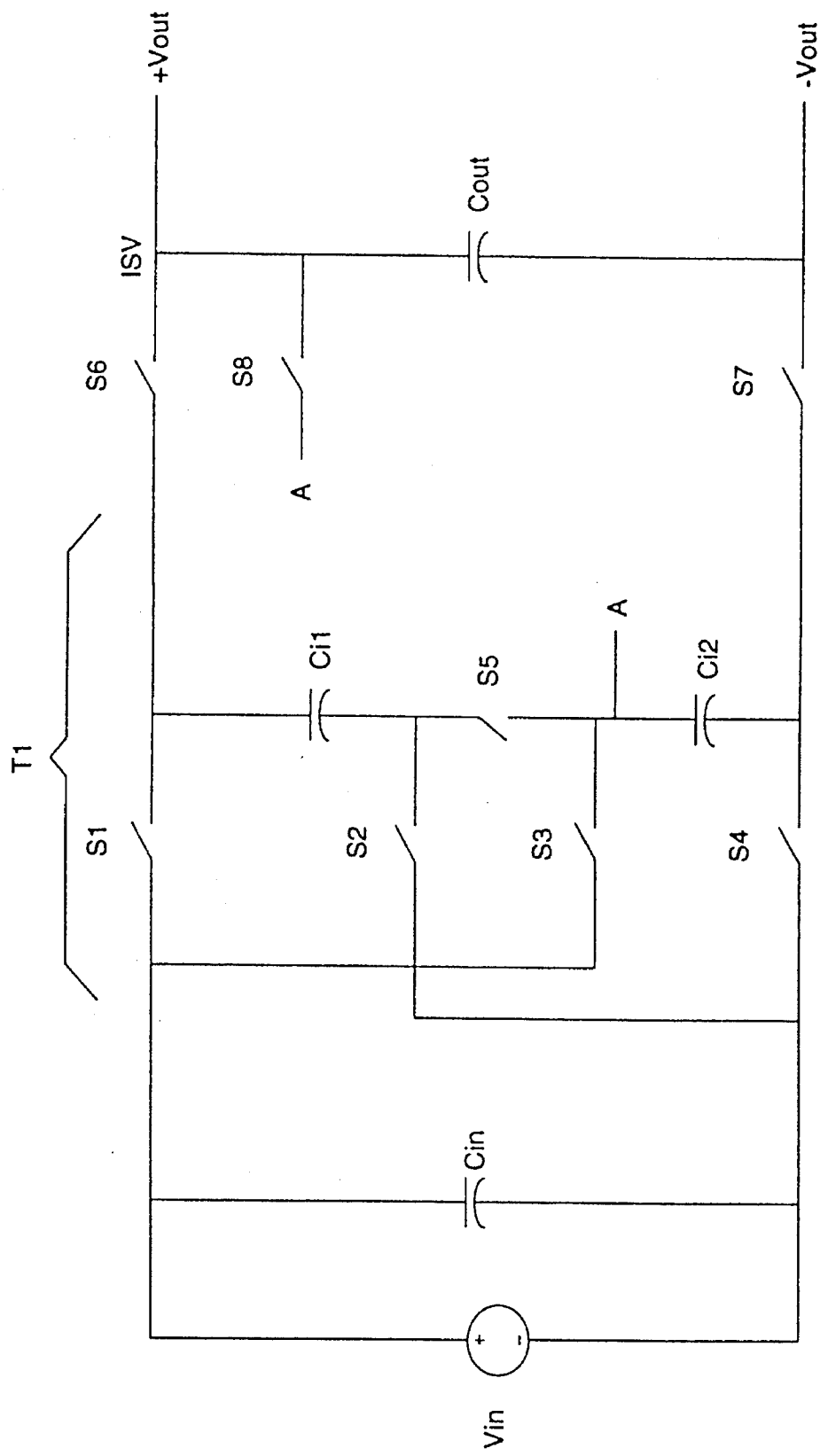
FIG. 2b shows the VSUA version (step-up configuration) of this architecture.

The conceptual schematics of the VSDA and VSUA variants of the HPSCVCR architecture are shown in FIGS. 2a and 2b respectively. A description for each of the conduction sequences is given below for the VSDA variant only. This is done since the operation of both the VSDA and VSUA are very similar. A summary for the switch states during the input and output conduction sequences is given below in Table 3 for both the VSDA and VSUA variants.

Input Conduction Sequence

During the input conduction sequence, capacitive transformer T1 of the VSDA variant (FIG. 2a) is switched into its series configuration such that it is connected across the input DC voltage source. Switches S2 and S2 are closed which connects the capacitors (also called segment capacitors) $C_{p1}$ through $C_{p3}$ of the capacitive transformer into its series connected configuration. Switches S1 and S4 are also closed to complete the charge path to the DC input voltage source. Switches S5 through S10 are opened to isolate the segment capacitors of the capacitive transformer from its output network and the external load during this period of time.

Input Transitional Dead Zone Sequence

The input transitional dead zone sequence separates the input conduction sequence from the output conduction sequence. During this period of time all switches are forced to their open state. This ensures that all connections to the DC input voltage source have been "broken"—"before" entering into the output conduction sequence.

Output Conduction Sequence

During the output conduction sequence, capacitive transformer T1 of the VSDA variant is switched into its parallel configuration and connected across the output network (e.g. capacitor $C_{out}$) and the external load. Switches S5 through S10 are closed connecting each segment capacitor of the capacitive transformer in parallel across the output network and external load. Switches S1 and S4 are opened isolating the input network from the capacitive transformer T1, output network, and external load. Switches S2 and S3 are in their open state during this period of time.

As mentioned earlier, the length of the output conduction sequence is the primary factor in determining the amount of charge that is transferred from the capacitive transformer T1 to the output capacitor $C_{out}$ and the external load. So that by controlling the amount of charge transferred, the output voltage at capacitor $C_{out}$ and the external load can be regulated. Hence, the output conduction sequence duration must be adjusted on a cycle-by-cycle basis as a result of external load that it is connected too.

Output Transitional Dead Zone

The output transitional dead zone sequence separates the output conduction sequence from the input conduction sequence. During this period of time all switches are forced to their open state. This ensures that all connections to the output network and external load have been "broken"—"before" entering into the input conduction sequence.

TABLE 3

HPSCVCR Switch states for VSDA and VSUA variants

| | VSDA | | VSUA | |
|---|---|---|---|---|
| SWITCH | Input Sequence | Output Sequence | Input Sequence | Output Sequence |
| S1 | C | | C | |
| S2 | C | | C | |
| S3 | C | | C | |
| S4 | C | | C | |
| S5 | | C | | C |
| S6 | | C | | C |
| S7 | | C | | C |
| S8 | | C | | (4) |
| S9 | | C | na | na |
| S10 | | C | na | na |

(1) S8–S10 are used in FIG. 2a only
(2) All blank entries under Input and Output Sequences are assumed opened
(3) The transitional dead zone sequences are not shown. The switches are assumed opened at these times.
(4) Closed at this time if $N_{SU} = 1$, otherwise it remains open The effective "step-down" or "step-up" ratio achieved by the capacitive transformer is directly proportional to the number of active capacitor sub-circuits or segments, N, during a particular operation cycle. For example, assuming a VSDA variant has $N_{SD}$ segments that are active during a normal operation cycle, then the effective step-down ratio is $N_{SD}$:1 or $1/N_{SD}$. It is important to note that during the output conduction sequence, $N_{SD}$ represents the number of active segments (i.e. segment capacitors) of the capacitive transformer that are switched from the serial into a parallel configuration. This has two affects: 1) the effective charge pump capacitor value as viewed from the external load is increased and now is equal to $N_{SD}C_P + C_{OUT}$, and 2) the DC output path resistance is also reduced by a factor of $N_{SD}$. These relationships for VSDA and VSUA variants are presented in Table 4.

TABLE 4

Capacitive Transformer Output Relationships

| VSDA | VSUA |
|---|---|
| $C_{Peff} = N_{SD}C_P$ | $C_{Peff} = C_P/N_{SU}$ |
| $R_{eff} = R_{path}/N_{SD}$ | $R_{eff} = R_{path}N_{SU}$ |

Note:
VSDA - Voltage Set Down Architecture
VSUA - Voltage Set Up Architecture

Another important feature of the HPSCVCR architecture based designs, is that they are able to provide input-to-output electrical isolation as opposed to the conventional switching capacitor voltage converters. This is accomplished via circuit implementation and operational procedures (i.e. protocols and algorithms). Although this feature is possible in other switched capacitor voltage converters designs, it is not readily available commercially.

ISUDA Overview (Initially, it is noted that a majority of this disclosure will focus on the ISUDA design for two reasons: 1) the ISUDA design is considered the most significant of the HPSCVCR architecture variants in terms of its overall performance and application possibilities. 2) The ISUDA also incorporate both the VSDA and VSUA variants and as a result will be discussed in more detail in this portion of the disclosure.)

Figure 3:
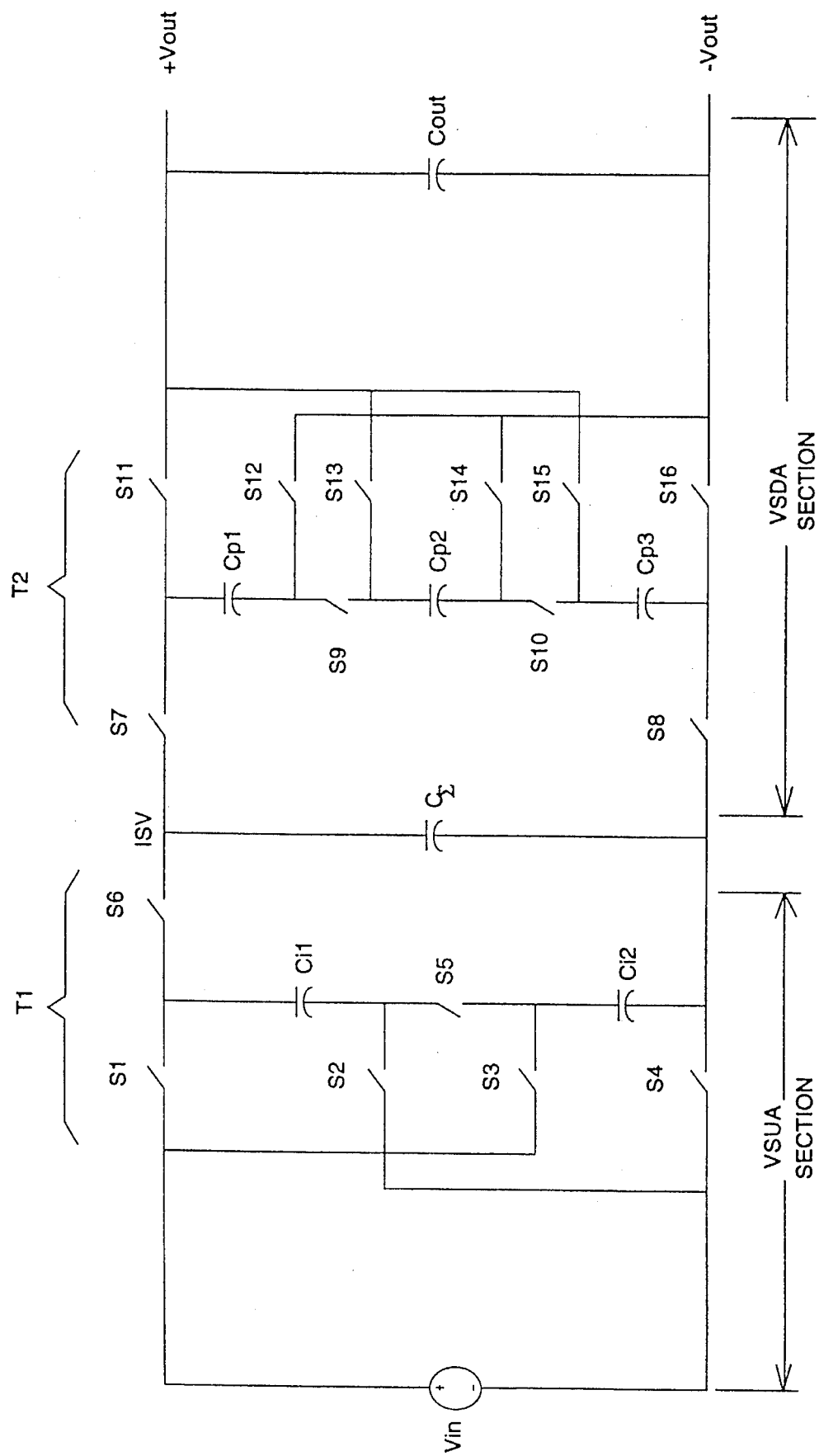
FIG. 3 shows an integrated step up/down architecture (ISUDA) with a set-up ratio of $N_{SU}=2$ and a step-down ratio of $N_{SD}=3$ the intermediate system voltage, $ISV=V_{in}\cdot N_{SU}$.

The Integrated Step Up/Down Architecture or ISUDA variant of the HPSCVCR architecture is formed by the concatenation of both the VSUA and VSDA variants. Of the HPSCVCR architecture variants, the ISUDA design offers the best overall performance in terms of operational input voltage range, conversion efficiency, and delivered output power. Additionally, a number of protocols can be implemented in the ISUDA designs that are not possible in either the VSUA or VSDA variant based designs alone. A conceptual circuit diagram of the ISUDA variant is shown in FIG. 3. Those features unique to ISUDA variant are listed below.

1. Increased input voltage range.
2. Increased delivered output power for a given input voltage range
3. System efficiency is constant over the full input range
4. Voltage Step-Up or Step-Down operation capability As in the commercially available switched capacitor DC-to-DC voltage converters, the operational cycle of the ISUDA variant is divided into four phases called sequences. These sequences are the equivalent of the conduction angles used in the commercially available switched capacitor DC-to-DC voltage converters. These four sequences are: the input and output conduction sequences and the respective input and output transitional dead zone sequences. These four sequences are present in the operation of both capacitive transformers T1 and T2 of the ISUDA variant shown in FIG. 3.

In normal operation the input conduction sequence is used to charge the segment capacitors of capacitive transformer T1 from the DC input voltage source and T2 from the summation capacitor $C_\Sigma$. During the output conduction sequence, the charge stored in the capacitive transformers is transferred to the respective output capacitors and load (T1 charges $C_\Sigma$, while T2 transfers charge to $C_{out}$ and the external load). The two remaining sequences are the input and output transitional dead zone sequences which separate the input and output conduction sequences providing a "break-before-make" function. A detailed description of each sequence and the state of the switches during each of these periods are given below for the ISUDA variant.

Input Conduction Sequence

During the input conduction sequence the capacitive transformer T2 of the VSDA section is switched into its series configuration and connected across the summation capacitor $C_\Sigma$. Switches S9 and S10 are closed, which connects the segment capacitors $C_{P1}$ through $C_{P3}$ of T2 into its series connected configuration. Switches S7 and S8 are also closed to complete the charge path from $C_\Sigma$. Switches S11 through S16 are opened to isolate the capacitors of the VSDA capacitive transformer T2 from its output network and the external load during this period of time.

The capacitors $C_1$ and $C_2$ of the VSUA capacitive transformer T1, are connected in parallel across the input DC voltage terminals. Switches S1 through S4 are closed while S5 and S6 are opened. Generally the switches of both sections will remain in these states until for the duration of the input conduction sequence.

Input Transitional Dead Zone

The input transitional dead zone sequence separates the input conduction sequence from the output conduction sequence. During this period of time all switches are forced to their open state. This ensures that all connections to the DC input voltage source have been "broken"—"before" entering into the output conduction sequence.

Output Conduction Sequence

During the output conduction sequence the capacitive transformer T2 of the VSDA is switched into its parallel configuration and connected across its output network of the capacitor $C_{out}$, and the external load. Switches S11 through S16 are closed connecting each segment capacitor of the capacitive transformer in parallel across the output network and external load. Switches S7 and S8 are opened isolating $C_\Sigma$ and the input network from the output network and external load.

At this time switches S1 through S4 in the VSUA capacitive transformer T1 are opened isolating the capacitors $C_1$ and $C_2$ from the input DC voltage source. Switch S5 is closed to connect T1 segment capacitors $C_1$ and $C_2$ into a series configuration. This has the affect of doubling the input voltage (for the circuit configuration shown), hence performing a voltage step-up function. Switch S6 is closed as to provide a charge path for $C_\Sigma$ from the serial combination of $C_1$ and $C_2$.

As mentioned earlier, the length of the output conduction sequence is the primary factor in determining the amount of charge that is transferred from the capacitive transformer T2 to $C_{out}$ and the external load. So that by controlling the amount of charge transferred the output voltage at capacitor $C_{out}$ and the external load can be controlled. Hence, the output conduction sequence duration will be adjusted on a cycle-by-cycle basis as a direct result of the external load connected that it is connected too.

Output Transitional Dead Zone

The output transitional dead zone sequence separates the output conduction sequence from the input conduction sequence. During this period of time all switches are forced to their open state. In the VSDA section, this ensures that all connections to the output network and external load have been "broken"—"before" entering into the input conduction sequence. While in the VSUA section it ensures that all connections to the summation capacitor $C_\Sigma$, have been "broken"—"before" entering into the its input conduction sequence.

A summary of the switch states for the input and output conduction sequences in given in Table 5.

TABLE 5

HPSCVCR Switch States (ISUDA version)

| SWITCH # | INPUT SEQUENCE | OUTPUT SEQUENCE |
|---|---|---|
| S1 | C | |
| S2 | C | |
| S3 | C | |
| S4 | C | |
| S5 | | C |
| S6 | | C |
| S7 | C | |
| S8 | C | |
| S9 | C | |
| S10 | C | |
| S11 | | C |
| S12 | | C |
| S13 | | C |
| S14 | | C |
| S15 | | C |
| S16 | | C |

Legend:
C defined as closed.
If blanked then open state is assumed

As in the cases of both the VSUA and VSDA, the ISUDA variant also provides input-to-output isolation which is obtained through circuit and protocol implementation. In the case of the ISUDA variant designs, the operation of its VSUA and VSDA sections must be coordinated to maintain the input-to-output isolation and to reduce the system circuitry needed. Coordination of the VSUA and VSDA conversion processes is accomplished by linking the operational cycles of both sections via status and control signals. In this way the operation of the VSUA section is slaved to that of the VSDA. Other than maintaining input-to-output network isolation, the VSUA and VSDA sections tend to operate independently from each other. This is a benefit that allows for implementation of separate algorithms and protocols that achieve optimal system efficiency and performance.

HPSCVCR Conversion Efficiency

An aspect of both the VSDA and VSUA variants of the HPSCVCR architecture is that their operational efficiency is sensitive to value of the input DC source voltage. For a VSDA based design with a value of $N_{SD}$, the operational efficiency of the design is greatest at the minimal value of input voltage required. As the input voltage is increased beyond this point the efficiency of the system decreases. Operational efficiency increases once again when the minimal input voltage for the next higher value of $N_{SD}$ is reached. This results in a family of efficiency curves, given by equation EQ4 and shown in FIG. 6. The effects shown in FIG. 6 can be minimized in both the VSDA and VSUA design implementations. However, due the input time constants of either the step-up or step-down capacitive transformers these measures are minimal.

EQ 4:
$$\eta_{VSDA} = \frac{N_{SD} \cdot V_{out}}{V_{in}} \times 100\%$$

The ISUDA variant solves this problem with the inclusion of the VSUA section as a pre-converter stage. The purpose of this section is to develop an Intermediate System Voltage, or ISV, that is used as the input DC voltage source to the VSDA section. By developing a large constant ISV value, a greater number of capacitors sub-circuits or segments can be implemented in the capacitive transformer of the VSDA section. This greater number increases the efficiency of the VSDA section and the ISUDA variant as well. The efficiency of the ISUDA design is given by equation EQ5. Another advantage of the VSUA section is that it has a lower input voltage limit to its input DC voltage range.

EQ 5:
$$\eta_{sys} = \frac{N_{SD} V_{out}}{N_{SU} V_{in}} \; 100\%$$

$N_{SD}$—number of active segments in VSDA capacitive transformer $N_{SU}$—number of active segments in VSUA capacitive transformer To maintain a constant value of ISV over the entire input voltage range, the active number of capacitor sub-circuits or "segments" of the VSUA capacitive transformer is adjusted to change the step-up ratio $N_{SU}$. The input DC voltage is monitored and the adjustment to $N_{SU}$ is made on a cycle-by-cycle basis. This stepped-up output voltage appears across the summation capacitor $C_\Sigma$ which provides the ISV as input to the VSDA section.

The VSDA section is the second and final stage in this conversion process. The VSDA section provides three functions: 1) final conversion ratio, 2) electrical isolation and 3) output voltage regulation.

In the VSUA and VSDA variants it is the number of normally active segments that defines the step-up or step-down ratios or $N_{SD}$ and $N_{SU}$ values respectively. This is because the number of segments used is adjusted on a cycle-by-cycle basis. However, this is not the case in ISUDA based designs as explained below.

As a result of adding the VSUA section to provide a constant DC input voltage called the ISV, the VSDA section of the ISUDA design requires no adjustment to its step-down ratio, $N_{SD}$. In ISUDA variants, only the VSUA section will make adjustments to its step-up ratio $N_{SU}$ on a cycle-by-cycle basis in order to maintain a constant value of ISV. Additionally, the VSUA section also implements the DECT or Delayed Excess Charge Transfer protocol which further enhances its ability to maintain a constant ISV value over the entire input voltage range. (It is noted that the Delayed Excess Charge Transfer protocol will be discussed later.)

The final output voltage of the ISUDA variant is determined by the step-down ratio, $N_{SD}$ of its VSDA section.

As mentioned above, the VSDA section also provides the output voltage regulation function for the ISUDA variant. However, unlike the VSDA "designs", the step-down ratio for this section is fixed. Hence, the output voltage regulation is achieved through the adjustments to the output conduction sequence duration only. The conversion factor of the ISUDA variant is determined by the ratio of the VSUA and VSDA sections as described by equation EQ6b. So that the ISUDA variant can be classified as either a step-down or step-up voltage converter based on the ratio of the conversion ratios $N_{SU}$ and $N_{SD}$.

EQ 6a:
$$V_{out} = \frac{ISV}{N_{SD}} \; \text{with} \; ISV \leq V_{in} \cdot N_{SU}$$

EQ 6b:

$$V_{out} \leq V_{in} \frac{N_{SU}}{N_{SD}} \text{ Where } \begin{cases} \text{if: } \frac{N_{SU}}{N_{SD}} \geq 1 \text{ then step-up} \\ \text{if: } \frac{N_{SU}}{N_{SD}} < 1 \text{ then step-down} \end{cases}$$

NOTE:
Equations EQ6a,b assumes that the DECT protocol is in affect, hence these equation express the upper limit values. When the DECT protocol is not employed, the '≦' are replaced with the '=' sign.

HPSCVCR FUNCTIONAL BLOCKS

In terms of power conversion efficiency, available delivered output power, and wide input DC voltage range, the Integrated Step-Up/Down Architecture, or the ISUDA, variant of the HPSCVCR architecture offers the best overall performance. In addition, it can be configured to provide either a step-up or step-down function by selecting the appropriate step-up ($N_{SU}$) and step-down ($N_{SD}$) ratios with the minimal impact on the system's overall efficiency. For these reasons the ISUDA variant based designs will generally be the first choice for many of the HPSCVCR architecture DC-to-DC voltage converter designs.

Figure 4:
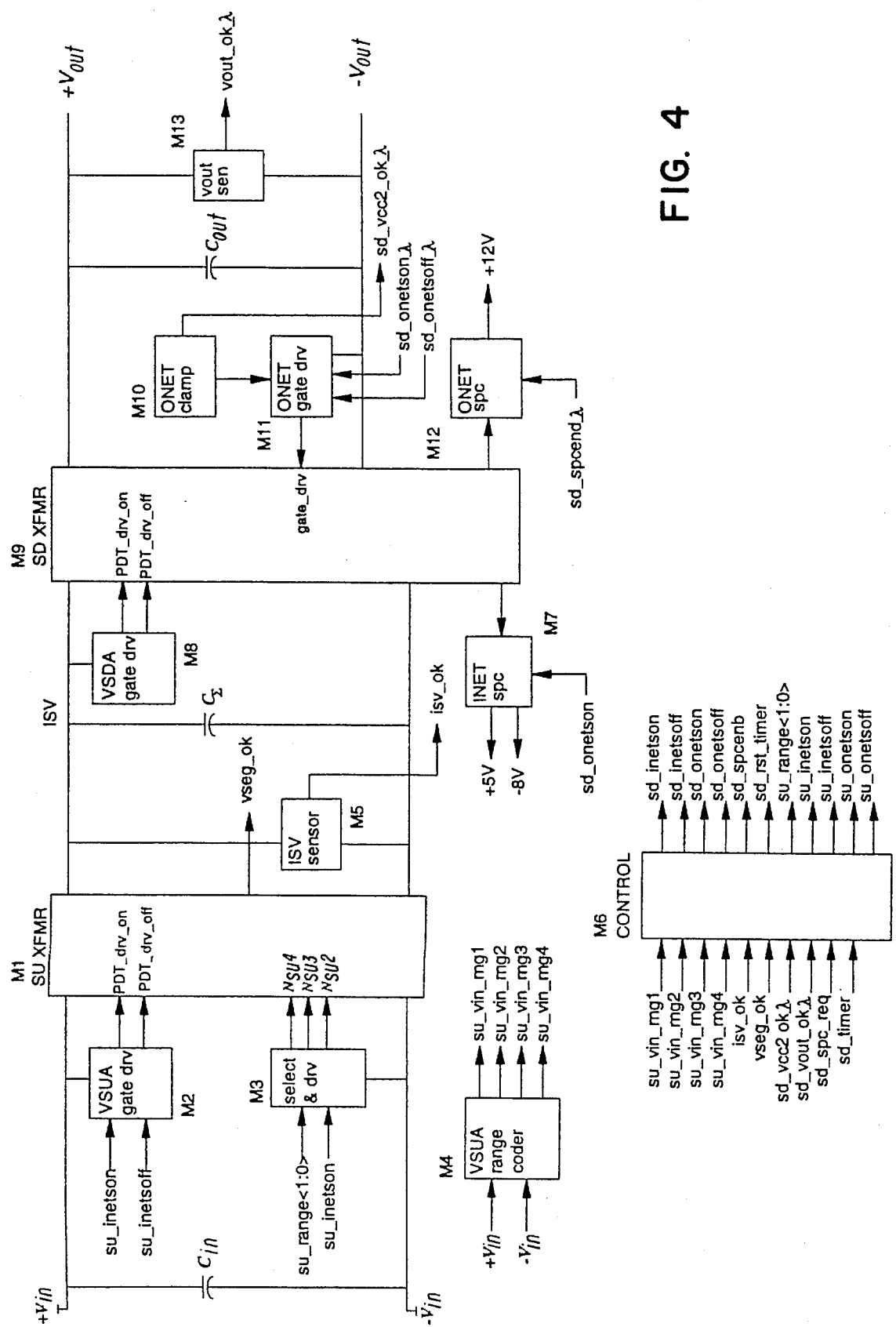
FIG. 4 shows a HPSCVCR architecture, ISUDA variant. This is a fully isolated DC-DC voltage converter with an auto-ranging feature on the input voltage port. It is important to note that the HPSCVCR control logic and circuits are resident to the INET or VSUA section of the converter. All status and control information between the ONET section of the converter and INET resident control is transferred via optocouplers.

A block diagram of the HPSCVCR architecture ISUDA variant is shown in FIG. 4. Shown are the major functional blocks described below in Table 6 and the inter-connecting hierarchical signals of this architecture. The input-to-output isolation feature of the HPSCVCR architecture particular to the ISUDA variant is also represented. The hierarchical signals that pass between the input and output networks (i.e. status and control signals) must remain electrically isolated from the output network. Presently in HPSCVCR architecture based designs this is accomplished through the use of optocouplers on a signal-by-signal basis. Those signals that are optically coupled are designated by the symbol "λ" which is affixed to the end of the signal name.

It is noted that optocouplers are used in place of opto-isolators due to response time and signal bandwidth requirements of the HPSCVCR architecture.

Figure 5A:
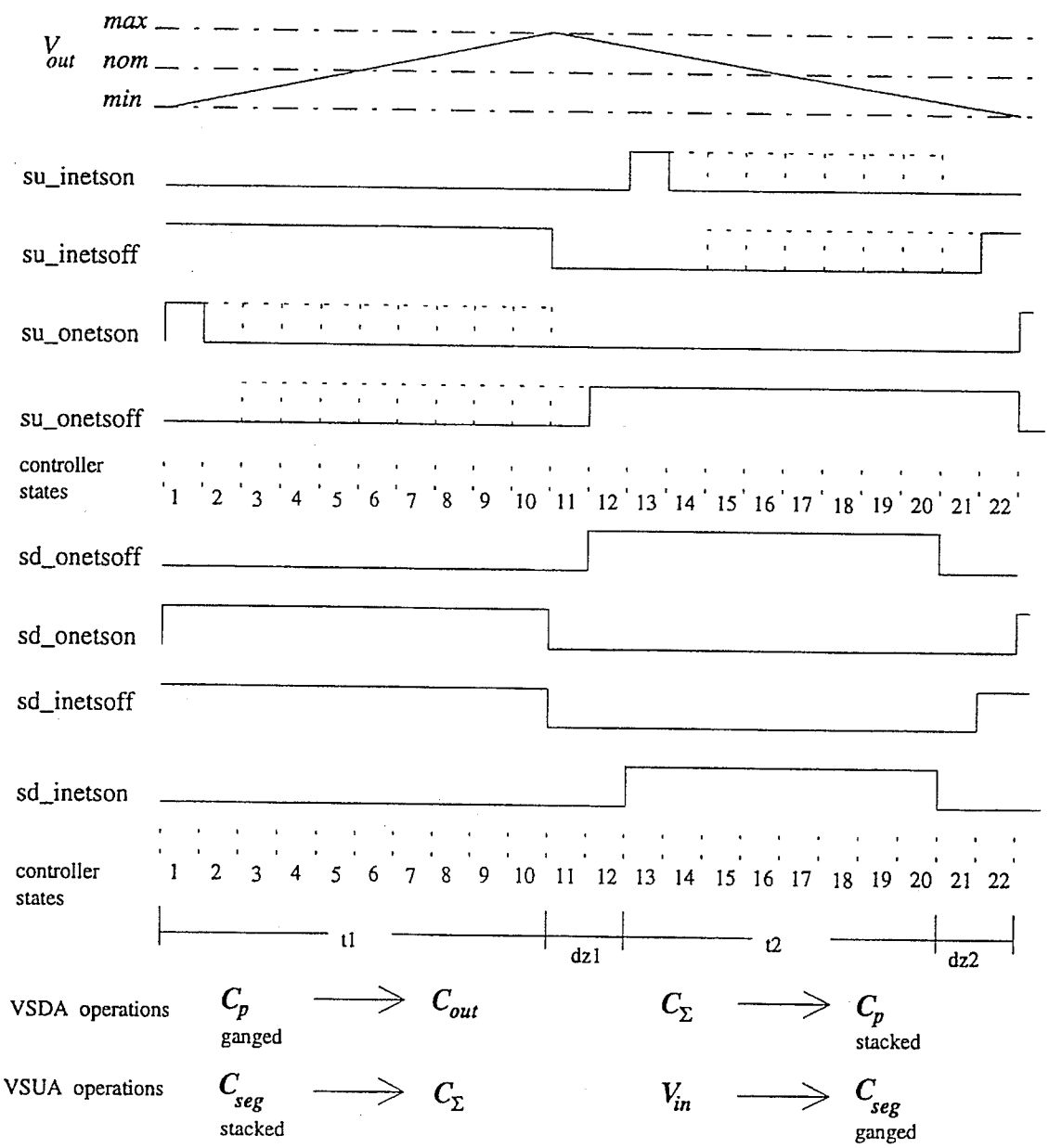
FIGS. 5a and 5b shows the output ripple voltage of the ISUDA variant and the major control signals of the VSUA and USDA sections. An "sd" prefix defines signals originating from the VSDA section and "su" prefix defines signals originating from the VSUA section.
Figure 5B:
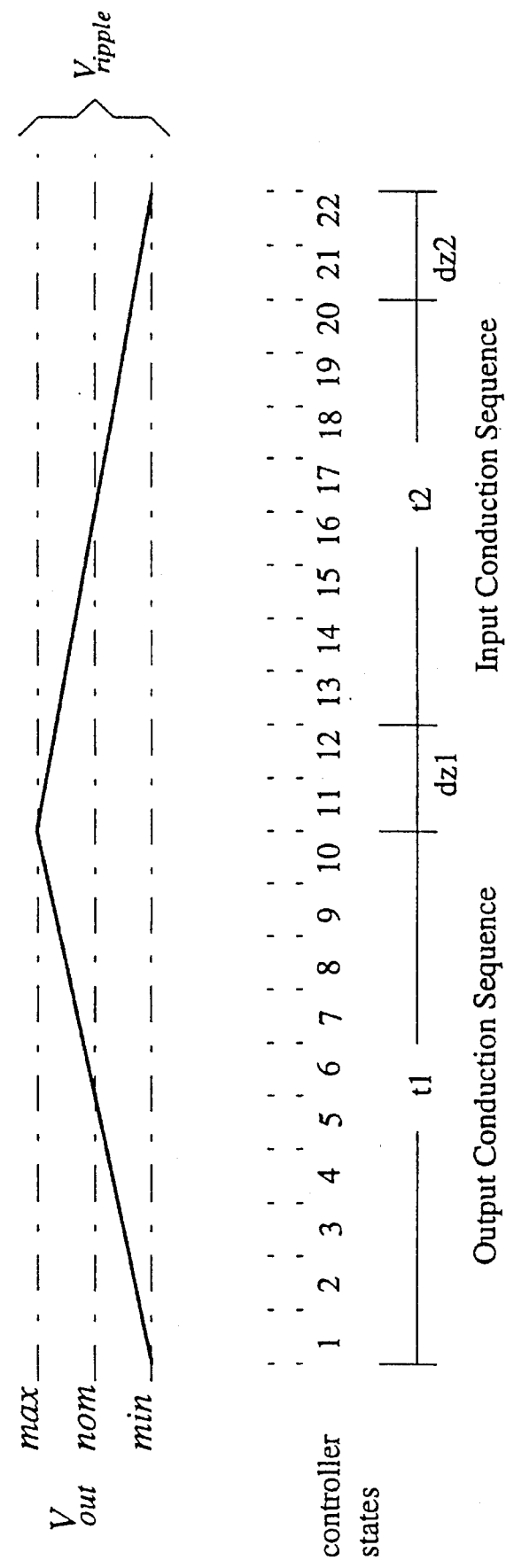

A representative system level timing diagram of the capacitive transformer used in the ISUDA variant is shown in FIG. 5. The system level timing for both the VSUA and VSDA section's capacitive transformers are represented in this diagram. The system timing is generated by a state machine based controller that is resident in the CONTROLLER functional block of the system block diagram along with other control support circuitry.

TABLE 6

| | Block Diagram Description | |
|---|---|---|
| Ref. | Mnemonic | Description |
| M1 | SU_XFMR | CMA Step-Up Capacitive Transformer |
| M2 | VSUA Gate Drv | Step-Up capacitive transformer PDT Gate Drive |
| M3 | Select & Drv | Step-up Power Mux Select |
| M4 | VSUA Range Encoder | Input voltage range encoder |
| M5 | ISV sensor | ISV voltage status sensor |
| M6 | Control | HPSCVCR control circuit and logic |
| M7 | INET SPC | INET Symbiotic power circuit and regulator |
| M8 | VSDA Gate Drv | Step-Down capacitive transformer PDT Gate Drive |
| M9 | SD_XFMR | CMA Step-Down capacitive transformer |

TABLE 6-continued

| | Block Diagram Description | |
|---|---|---|
| Ref. | Mnemonic | Description |
| M10 | ONET clamp | Output network MOSFET cold start gate drive clamp |
| M11 | ONET Gate Drv | Output network MOSFET Gate Drive |
| M12 | ONET SPC | Output Symbiotic power circuit and regulator |
| M13 | Vout sensor | Output voltage status sensor |

In general, timing for all HPSCVCR architecture variants is generated by a state machine based controller logic due to the tight timing requirements. The state machine based controller is used to implement all HPSCVCR protocols, algorithms, and overall system control functions. The actual implementation of the state machine, which is usually micro-sequencer based, will vary greatly for a particular HPSCVCR architecture based design. However, it is the implementation of the HPSCVCR algorithms and protocols by the state machine which is most important and essential in the definition of the HPSCVCR architecture.

Capacitive Transformer Theory and Operation

The capacitive transformer is defined as an array of capacitors that can be electronically switched into either a series or parallel configuration. By selecting a configuration to receive charge from the input DC voltage source and the other to transfer that charge to an output capacitor and external load, a voltage step-down or step-up function can be realized.

Figure 7B:
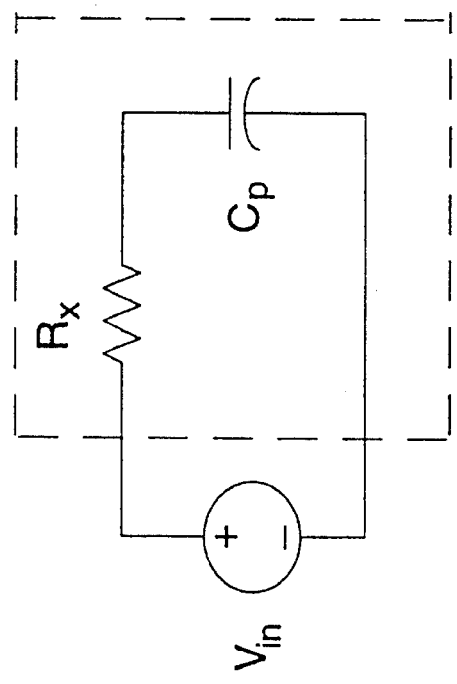
FIG. 7 shows an equivalent output (a) and input (b) circuits for the step-down and step-up capacitive transformers. Equivalent circuit (c) is of the output capacitor and external load during the period of time when the capacitive transformer in not connected (i.e. receiving charge from the input DC voltage source)
Figure 7A:
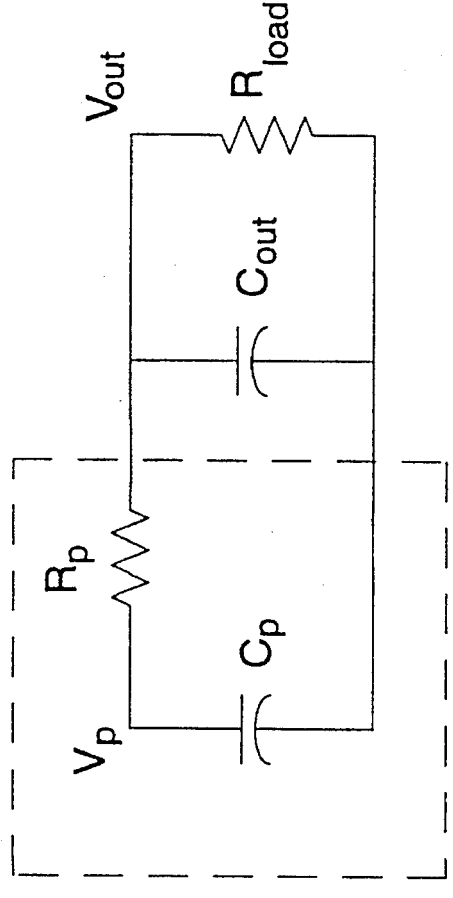
Figure 7C:
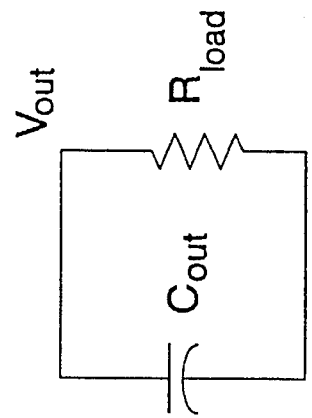

The equivalent input and output charge circuits for both the step-up and step-down capacitive transformers are shown in FIG. 7. The parameters $R_p$, $R_x$, and $C_p$ represent the major factors which influence the operation of the capacitive transformer. A definition for each is given below.

1. $R_p$—equivalent output charge path resistance. For the step-down capacitive transformer, $R_p$ is essentially the resistance of a single output charge path sub-circuit divided by $N_{SD}$. For the step-up capacitive transformer it is simply the total resistance in that path.

2. $R_x$—equivalent input charge path resistance. For the step-down capacitive transformer, $R_x$ is the total resistance of the input charge path. For the step-up capacitive transformer it is essentially the resistance of a single input charge path divided by $N_{SU}$.

3. $C_p$—equivalent charge pump capacitor value. The equivalent charge pump capacitor value is directly affected by the conversion ratios of both the step-up and step-down capacitive transformers as described in Table 7 below.

TABLE 7

| Transformer Type | Input configuration | Output Configuration |
|---|---|---|
| Step-Down | series → $\frac{C_p}{N_{SD}}$ | parallel → $N_{SD} \cdot C_p$ |
| Step-Up | parallel → $N_{SU} \cdot C_p$ | series → $\frac{C_p}{N_{SU}}$ |

During the output conduction sequence, the capacitive transformer is connected to the output capacitor $C_{out}$ and the external load. This is represented by the equivalent circuit of FIG. 7a. The output voltage during this period of time will increase as charge from the segment capacitors of the capacitive transformer is transferred to $C_{out}$ and the external load represented by $R_L$. The output voltage and the charge pump capacitor voltage $V_{out}$ are described by equations EQ7a, and EQ7b respectively.

$$V_{out}(t) = K_1 e^{m_1 t} + K_2 e^{m_2 t} \quad \text{EQ7a:}$$

$$V_p(t) = A_1 e^{m_1 t} + A_2 e^{m_2 t} \quad \text{EQ7b:}$$

Where: $m_1$, $m_2$ are the results of a quadratic equation based on the circuit parameters. The coefficients for the quadratic are:

$$a = 1, \ b = \frac{C_p(1 + R_p/R_L) + C_{out}}{C_{out} C_p R_p}, \ c = \frac{1}{C_{out} C_p R_p R_L}$$

To determine the constants $K_1, K_2$ expression EQ3a is evaluated at $t=0$ and $t=t_1$ where:

EQ 7c:
$$V_{out}(\min) = K_1 + K_2$$

EQ 7d:
$$V_{out}(\max) = g_1 K_1 + g_2 K_2 \text{ where } \begin{cases} g_1 = e^{m_1 t_1} \\ g_2 = e^{m_2 t_1} \end{cases}$$

The constants of both equations EQ7a and EQ7b (i.e. $K_1, K_2, A_1$ and $A_2$) are related by the following expressions:

EQ 7e:
$$A_1 = \left(1 + \frac{R_p}{R_L} + R_p C_{out} m_1\right) K_1$$

EQ 7f:
$$A_2 = \left(1 + \frac{R_p}{R_L} + R_p C_{out} m_2\right) K_2$$

EQ 7g:
$$V_{pMAX} = A_1 + A_2$$

During the input conduction sequence the capacitive transformer is isolated from the output capacitor and the external load. The resultant equivalent circuit is given in FIG. 7c, where its output voltage is now described by a simple exponential decay expression given in equation EQ8.

EQ 8:
$$V_o(t) = V_{MAX} e^{-\frac{t}{R_L C_{out}}}$$

The value t in equation EQ8 represents the minimum time between consecutive output conduction sequences. It is composed of the input conduction sequence duration, $t_2$, and both the total time of the input and output transitional dead zone sequences, $t_{DZ}$. The resultant output ripple voltage waveform due to the HPSCVCR architecture is shown in FIG. 5a and again in FIG. 5b. It is important to note that ripple voltage of the HPSCVCR architecture is a dual ramp instead of the traditional sawtooth waveform. The dual ramp ripple voltage has two significant advantage for the HPSCVCR architecture:

1. Increased delivered output power at lower operating frequency due to the frequency multiplication affect of the dual ramp ripple voltage.
2. The maximum peak currents are significantly reduced which lessen the stress on the components and removes the need to over specify certain component parameters. This also results in the increased reliability of the individual components and of the overall system as well.

For the HPSCVCR architecture the maximum output power delivered and the overall system efficiency is determined by the implementation and operation of the capacitive transformer. Estimated system performance of the maximum delivered output power, system timing, system efficiency, and input DC voltage for the various HPSCVCR architecture based designs are predicted by equations EQ9 through EQ12b. It is noted that these expressions are valid for both the capacitive step-down and step-up configurations and the particular implementation selected.

EQ 9:
$$P_{out} = -V_o^2 C_{out} f_{eff} \ln\left(1 - \frac{V_{rip}}{V_{oMAX}}\right)$$

EQ 10:
$$f_{eff} = \frac{1}{t_2 + t_{DZ} + t_1}\left(1 + \frac{t_1}{t_2 + t_{DZ}}\right)$$

$\dfrac{1}{+t_{DZ} + t_1}$ is the fundamental switching frequency where: $\dfrac{t_1}{t_2 + t_{DZ}}$ is the frequency multiplier The parameters are:
1. $V_{rip}$ is the maximum peak-to-peak output voltage ripple desired.
2. $V_o\text{MAX}$ is the maximum output voltage (i.e. $V_o\text{NOM} + \frac{1}{2} V_{rip}$)
3. $t_1$—is the output conduction sequence time duration, $t_2$—is the input conduction sequence time duration
5. $t_{DZ}$—is the total transitional dead zone sequence time duration
6. $C_p$—is the individual segment capacitor value EQ 11a:
$$P_{IN} = \frac{C_{OUT} V_{rip}}{T}\left(V_{pMAX} + \frac{2 C_{OUT}}{N C_P} V_{rip} \frac{\Psi}{1 - \Psi}\right)$$

EQ 11b:
where $\Psi = e^{-\frac{N t_2}{R_x C_p}}$

EQ 12a:
$$V_{in} = N \frac{V_{pMAX} - V_{pMIN} \cdot g(t_2)}{1 - g(t_2)}$$

EQ 12b:
where: $g(t_2) = e^{\frac{-N t_2}{R_x C_p}}$

1. $V_p\text{MAX}$—is the maximum segment capacitor voltage at the end of the input conduction sequence time period, $t_2$.
2. $V_p\text{MIN}$—is the absolute minimum segment capacitor voltage at the end of the output conduction sequence assuming a full time duration of $t_1$.
3. $R_x$—input charge path equivalent resistance.
4. N—capacitive transformer conversion ratio. For a step-up; N=1, and for a step-down: $N=N_{SD}$.

Capacitive Transformer Implementation

The general architecture of the capacitive transformer is that each capacitive element is configured into sub-circuit called a segment. Each segment consist of a minimum of three active devices which implement one of the three configuration switches. Two of these devices are used to form the parallel connection switches (i.e. input rail connection and return rail connection). The third active device switch element is the Pass Through Device or PTD and is used the form the serial connection. The active devices used in the implementation of the capacitive transformers can be either a two or three terminal devices. Using today's technology, diodes and power MOSFETs (Metal Oxide Semiconductor Field Effect Transistor) are used as the active devices. In practice, there are three basic capacitive transformer implementations based on the use of either diodes, power MOSFETs or a combination of both. The three basic implementations are listed in the Table 8 below.

TABLE 8

Capacitive Transformer Types

| NAME | | PTD | Output Network |
|------|---|-----|----------------|
| CDA | Capacitor Diode Array | Diode | Diode |
| CDMA | Capacitor Diode MOSFET Array | Diode | Power MOSFET |
| CMA | Capacitor MOSFET Array | Power MOSFET | Power MOSFET |

Assuming that ideal active devices where available, the CDA capacitive transformer implementation would be the selection of choice since it is the simplest of the three implementation. However, based on those active devices that are commercially available today, the CMA design offers the greatest performance, but also requires a complex gate drive and distribution circuit. Even though, the CDA and CDMA capacitive transformer designs can not match the performance of the CMA design, they do provide many cost-effective solutions for a number of different applications.

All three capacitive transformer designs will be discussed in this section, however, the CMA design is the implementation of choice. Hence, the CMA design will be used in all discussions concerning the capacitive transformer type used in HPSCVCR architecture based designs.

Capacitor—Diode Array (CDA) Capacitive Transformer design

The Capacitor Diode Array, or CDA, is the simplest of the three capacitor transformer types. Diodes, i.e. two port active devices, are used to implement the switching function for each of three electronic configuration switches. The CDA operates on the voltage difference between the fully charged segment capacitors and the lower output voltage for the output conduction sequence to transfer charge to the output network and external load. During the input conduction sequence, a voltage difference between the input DC voltage source and the stacked segment capacitors exist and allows for the re-charge of these capacitors. Additional electronic switches, implemented using three port devices, are needed in the input and output networks to "gate" the movement of charge and control the operation of the capacitive transformer. The number of electronic switches varies depending on the type of HPSCVCR design implemented and are listed below.

Two electronic switches are needed for designs with common returns (i.e. common input and output return).

Four electronic switches are needed for full electrical isolation.

Figure 8:
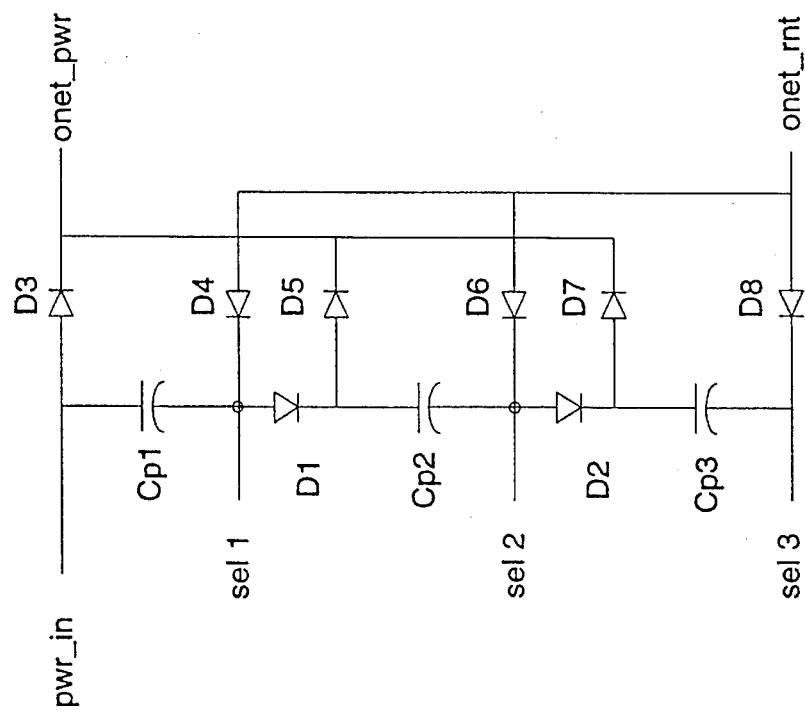
FIG. 8 shows three segment step-down capacitor diode array.

A generic schematic of the capacitor diode array (i.e. no part numbers are specified) is shown in FIG. 8. The CDA design shown is a three segment voltage step down design.

Another important feature is that this design has a selectable step-down ratio capability. Hence, values of $N_{SD}$ equal to 1, 2, and 3 are possible with this design.

CDA Operation Description

The input voltage to this circuit is applied between the PWR_IN terminal and one of the three select terminals; SEL1, SEL2, or SEL3. The selection terminals provide the input network, or "INET" return path. The secondary output voltage is always taken from the output network, or "ONET" power terminal ONET_PWR and the output network return terminal, ONET_RTN. Not shown in this schematic diagram are the input and output electronic switches.

During the input conduction sequence, the INET electronic switches are in their conductive or ON state while the ONET switches are forced into their non-conductive or OFF state. With the status of the electronic switches as such, diodes D3 through D8 are forced into their "cutoff" or OFF state, while, D1 and D2 are in their ON state or forward biased. This provides a closed loop circuit to the input voltage source where segment capacitors $C_{P1}$ through $C_{P3}$ are connected in a series configuration. The duration of the input conduction sequence is made long enough to ensure that the segment capacitors are charged to the proper values. The end of the input conduction sequence is followed by the input dead zone sequence, where both sets of network switches are forced to their non-conductive state. The input dead zone sequence is long enough to ensure that the INET electronic switches and diodes (D1 and D2) have reached their respective OFF state. Hence, the capacitive transformer is now electrically isolated from both the input and output networks.

When the output conduction sequence is entered, the ONET switches are moved into their conductive state. This action forward biases diodes D3, D5, and D7 on the ONET_PWR node, and D4, D6, and D8 on the ONET_RTN node. This switches segment capacitors $C_{P1}$ and $C_{P3}$ into a parallel configuration via the network of diodes D3–D8. Unlike the input conduction sequence where the duration is generally fixed, the output conduction sequence must be adjusted on a cycle by cycle basis in order to maintain the proper output voltage value. Once, the output sequence has completed, the output dead zone sequence is entered where both the ONET and INET switches are moved into their non-conductive states.

For the CDA, its value of the step-down ratio is directly dependent upon the "select return port" that is used. During the input conduction sequence, a set of switches in the INET return path is used to connect the desired select return port to the input DC voltage source return terminal. For the capacitive transformer circuit shown in FIG. 8, the selection of either select return path SEL1 or SEL2 electrically connects that select return path to the return of the DC voltage source, while it "bypasses" the remaining segments. This electrically removes the bypassed segments from the capacitive transformer operation and effectively reduces the step-down ratio. During the output conduction sequence, all segment capacitors are electronically switched such that they are connected in parallel across the output capacitor $C_{out}$. Those segment capacitors that were "bypassed" during the input conduction sequence are at reduced charge and hence a reduced capacitor voltage. Because of this the output charge path diodes for the "bypassed" segment capacitors will be reversed biased and no charge will be transferred from these capacitors. Hence, only the "active" segments that had received charge during the input conduction sequence are able to transfer charge at this time.

For the CDA implementation a number of the capacitive transformer parameters and equation must be modified. These modifications are listed in equations EQ13a through EQ13d.

EQ 13a:
$$R_x = (N_{SD} - 1)r_D + N_{SD}esr_p + r_{DS_p} + r_{DS_n}$$

EQ 13b:
$$R_p = \frac{(esr_p + 2r_D)}{N_{SD}} + ers_o + 2r_{DS_n}$$

EQ 13c:
$$V_p = \begin{cases} MAX = A_1 + A_2 + 2V_\gamma \\ MIN = A_1 g_1(t_1) + A_2 g_2(t_1) + 2V_\gamma \end{cases}$$

EQ 13d:
$$V_{in} = N_{SD} \frac{V_{pMAX} - V_{pMIN} \cdot \sigma(t_2)}{1 - \sigma(t_2)} + V_\gamma(N_{SD} - 1)$$

where: $\sigma(t_2) = e^{\frac{-N_{SD}t_2}{R_x C_p}}$ $esr_p$—the equivalent series resistance of the segment capacitor $C_P$.

$esr_o$—the equivalent series resistance of the output capacitor $C_{out}$.

$r_D$—forward resistance of the diode $r_{DS_p}$—P-channel power MOSFET drain-to-source 'ON' resistance.

$r_{DS_n}$—N-channel power MOSFET drain-to-source 'ON' resistance.

$V_\gamma$—intrinsic on voltage of the diode.

CDA Component Specification

DIODE Requirements:

$t_{rr}$ Reverse Recovery Time

In the CDA design, the selection of the diode or silicon rectifier is critical. The most essential parameter is the Reverse Recovery Time ($t_{rr}$) which states the length of time that the diode remains in its conductive state once the forward bias condition has been removed. During this length of time the diode appears as a short circuit, therefore enough time must be allocated for the diode to return to its non-conductive state.

$V_F$ Forward Voltage Drop

The forward voltage drop, which is due to the PN junction of the diode, is critical in the sense that it must be included in the calculation of the minimum input voltage value. The value of $V_F$ is comprised of the forward current $I_F$ times the on resistance of the diode, $r_D$, plus the intrinsic voltage, $V_\gamma$. The selection of this part would have $r_D$ and $V_\gamma$ be as low as possible.

SEGMENT CAPACITOR Requirements:

ESR and ESL

The equivalent series resistance (esr) and inductance (esl) ideally should be zero, and in practice these values should be a small as possible.

DC Leakage Current DC

DC leakage current is a critical factor in the selection of the actual capacitor since it decreases the efficiency of the DC-to-DC voltage converter. Hence, this value should be made as small as possible. In practice, this value should be less than 100 uA under worst case conditions.

Capacitor Diode MOSFET Array (CDMA) Capacitive Transformer

The Capacitive Diode MOSFET Array or CDMA capacitive transformer is a more complex design, than that of the CDA, and that takes advantage of the power MOSFET's low 'ON' resistance. This is done by integrating the parallel configuration switch function with that of the output electronic switches. A number of beneficial affects are realized with this design:

1. The elimination of the forward diode voltage drops. This reduces the maximum segment capacitor voltage required for the particular output voltage desired which also reduces the input DC voltage required and results in a net increase to the system's efficiency.

2. Because the ON resistance of the power MOSFET is much less than that of any diode, the output charge path resistance is greatly lowered. Again, this reduces the maximum segment capacitor voltage required for the particular output voltage desired and increases the overall system efficiency.

3. Another advantage of this design is that the switching times of the power MOSFETs (i.e. turn-on and turn-off times) are much shorter than $t_{rr}$ of the diodes used in the CDA designs. This allows for higher operating frequency which increases the output power capability of the design.

Figure 9:
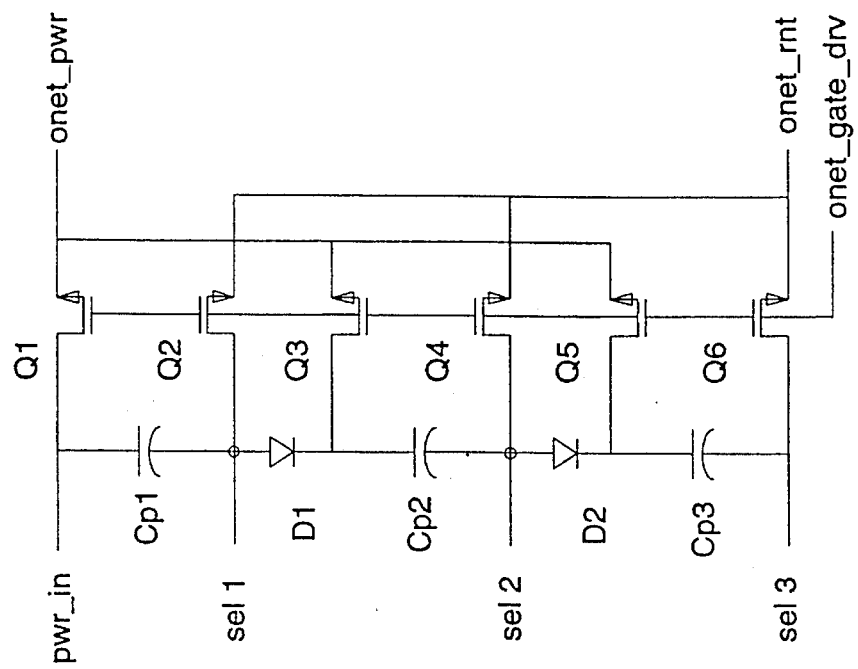
FIG. 9 shows a capacitor diode MOSFET array (CDMA) capacitive transformer design with three segments.

A three segment schematic of the CDMA design is shown in FIG. 9. Not shown in the schematic diagram are the input electronic switch and the output gate drive circuit.

CDMA Operation Description

The input voltage to this circuit is applied between the PWR_IN terminal and one of the three select return terminals (SEL1, SEL2, or SEL3). The select return terminals provide the input network, or "INET" a return path. The secondary output voltage is always taken from the output network, or "ONET" power terminal ONET_PWR and the output network return terminal, ONET_RTN.

During the input conduction sequence, the INET switches are in their conductive state while the ONET gate driver is set so that the power MOSFETs Q1 through Q6 are forced into their non-conductive state. With the status of the INET electronic switches and the ONET gate driver as such, the capacitive transformer is electrically isolated from the output network and external load while diodes, D1 and D2 are in their ON state. This provides a closed loop circuit to the input DC voltage source where capacitors $C_{P1}$ through $C_{P3}$ are connected in a series configuration. The duration of the input conduction sequence is made long enough to ensure that the capacitors are charged to the proper values. The end of the input conduction sequence is followed by the input transitional dead zone sequence, where both the INET electronic switches are moved into their non-conductive or open state, while the ONET gate driver ensures that the MOSFETs remain in their non-conductive state. The input transitional dead zone sequence is made long enough to ensure that the INET electronic switches and the diodes D1 and D2 have enough time to reached their respective non-conductive state. Hence, the capacitive transformer it now electrically isolated from both the input and output networks. When the output conduction sequence is entered, the ONET gate driver forces the power MOSFETs (Q1, Q3, and Q5 on the ONET_PWR node, and Q2, Q4, and Q6 on the ONET_RTN node) into their conductive states. Now, segment capacitors $C_{P1}$ through $C_{P3}$ have been switched into a parallel configuration via the network of power MOSFET devices Q1–Q6 and connected across the output network and external load. Unlike the input conduction sequence where the its duration is usually held at a fixed value, the output conduction sequence must be adjusted on a cycle by cycle basis in order to maintain the proper output voltage regulation. Once, the output sequence has been completed, the output transitional dead zone sequence is entered where the capacitive transformer is electrically isolated from the input and output networks. The INET electronic switches remain in their non-conductive state while the ONET gate driver forces the power MOSFETs into their non-conductive state. The output transitional dead zone sequence is made long enough to ensure that the MOSFETs have enough time to reached their non-conductive state. The value of the step-down ratio is directly dependent on the select return port that is used. During the input conduction sequence, a set of switches in the INET return path are used to connect the desired select return port to the return of the input DC voltage source. For the capacitive transformer circuit shown in FIG. 9, the selection of either select return path SEL1 or SEL2 electrically connects that select return path to the return of the DC voltage source, while it "bypasses" the remaining segments. This electrically removes the bypassed segments from the capacitive transformer's operation and effectively reduces its step-down ratio. During the output conduction sequence, all segment capacitors are electronically switched such that they are connected in parallel across the output capacitor $C_{out}$. Those segment capacitors that were "bypassed" during the input conduction sequence are at reduced charge and hence a reduced capacitor voltage. Unlike the CDA design, the power MOSFETs provide a DC path from the output network to the "bypassed" segment capacitors. This results in some of the charge provided by the "active" segments to be used to charge the "bypassed" segment capacitors during the output conduction sequence. However, the amount of charge diverted to the "bypassed" segment capacitor is small and its affect insignificant. Hence, the net effect is that only the "active" segments that had received charge during the input conduction sequence will transfer charge at this time.

For the CDMA implementation a number of the capacitive transformer parameters and equations must be modified. These modifications are listed in equations EQ14a through EQ14c.

EQ 14a:
$$R_p = \frac{(esr_p + 2r_{DS_n})}{N_{SD}} + ers_o$$

$R_x$—use equation EQ13   EQ14b $V_{in}$—use equation EQ13d   EQ14c $esr_p$—the equivalent series resistance of the segment capacitor $C_p$.

$esr_o$—the equivalent series resistance of the output capacitor $C_{out}$.

$r_D$—forward resistance of the diode $r_{DS_p}$—P-channel power MOSFET drain-to-source 'ON' resistance.

$r_{DS_n}$—N-channel power MOSFET drain-to-source 'ON' resistance.

CDMA Component Specification

Diode Parameter Criteria $t_{rr}$ Reverse Recovery Time

In the CDMA design, the selection of the diode or silicon rectifier is critical. The most essential parameter is the Reverse Recovery Time ($t_{rr}$) which states the length of time that the diode remains in its conductive state once the forward bias condition has been removed. During this length of time the diode appears as a short circuit, hence enough time must be allocated for the diode to return to its non-conductive state.

$V_F$ Forward Voltage Drop

The forward voltage drop, which is due to the PN junction of the diode, is critical in the sense that it must be included in the calculation of the minimum input voltage value. The value of $V_F$ is comprised of the forward current $I_F$ times the on resistance of the diode, $r_D$, plus the intrinsic voltage, $V_\gamma$. The selection of this part would have $r_D$ and $V_\gamma$ be as low as possible.

MOSFET Parameter Criteria

The charge path of the parallel output network for the segment capacitors is implemented using the N-channel power MOSFET for the reasons listed below:

1. The primary reason is because of their very low ON resistance as compared to any other currently available active devices. This also include P-channel MOSFET devices.

2. A number of "Logic Level" power MOSFET are becoming available. These are typically N-channel power MOSFET devices. With gate-to-source voltage of only 5 V required for the device to reach maximum drain current, it greatly reduces the constraint on HPSCVCR based designs. In addition, for low values of output voltage $\leq 5$ V the N-channel can also be used for the power rail device which offers greater efficiency.

3. The return path device, can be referred to ground, hence, a single gate drive circuit can be used for both the ONET_PWR node and the ONET_RTN devices at low output voltages.

$r_{DS(on)}$ Drain-to-Source ON resistance

This value is critical in determining the efficiency of the DC-to-DC voltage converter design, especially at low output voltages (e.g. $V_{out} \leq 5$) with delivered output power of 5 W or greater. An increase in the $r_{DS}$ values has one of two affects: 1) it forces a longer output conduction sequence in order to reach the desired output voltage level thus reducing the available output power, or 2) it eventually forces the value of the input DC voltage to increase, which reduces the efficiency of the conversion operation.

$V_{DS}$ Drain-to-Source Voltage

All variants of the HPSCVCR architecture will expose some of the power MOSFET devices to very high drain to source voltages during normal operation. Hence, the capacitive transformer design must ensure, that the maximum $V_{DS}$ of any device is not exceeded. This will usually occur on the ONET_PWR node of the output transformer. In the cases where this would occur, devices may be "stacked" (i.e. serial connected) to increase their maximum voltage handling capability.

$V_{gs(on)}$ Gate-to-Source Voltage

Although this value is not critical to the operation of the capacitive transformer it, however, may reduce the design constraints of the output network gate driver circuit. Power MOSFET devices are available with "logic level" gate voltages. These devices are guaranteed to reach the minimum $r_{DS}$ value with a maximum of 5 V applied to its gate. This is significant in terms of the ONET gate driver design, where the gate voltage of the MOSFET devices on the ONET_PWR node must be driven to a value of $V_{gs}=V_{out}+V_{gs(on)}$.

The maximum value of $V_{gs}$ is also a critical design parameter. The maximum rating for these power MOSFET parameters is ±20 V for most commercially available devices. Hence, care should be taken to ensure that ONET gate driver does not exceed this limit.

Capacitor MOSFET Array (CMA) Capacitive Transformer

The Capacitor MOSFET Array or CMA is the most complex of the three capacitive transformer designs reviewed thus far. The CMA design is unique in that it implements the serial configuration switch, i.e. the Pass Through Device or PTD, using P-channel power MOSFETs to take advantage of its very low 'ON' resistance. The parallel configuration switch function of each capacitor sub-circuit of the capacitive transformer is integrated with the output electronic switches. This is done to also take advantage of the very low 'ON' resistance offered by the power MOSFETs. The higher level of complexity of the CMA capacitive transformer design is offset by its high performance ability to supply high output power at low output voltages (i.e. $V_{out} \leq 5$ V) very efficiently (usually greater than 90% at 100 W or greater). Based on today's technologies the Capacitor MOSFET Array or, CMA, capacitive transformer design is the preferred design.

Capacitor MOSFET Array (CMA) Theory

The most significant difference between the CMA design as compared to both the CDA and CDMA capacitive transformer designs, is the P-channel power MOSFET implementation of the PTD. The benefit of this is the increase in the overall system efficiency which occurs for two reasons: 1) the elimination of the forward voltage drop offered by PN junction devices (i.e. diodes and BJTs), and 2) the low 'ON' resistance of the power MOSFET. However, when using the P-channel power MOSFET as a PTD, two major issues have to be addressed. These are driving the gates of the MOSFETs, and development of a method of dealing with the phenomenon of localized polarity reversal.

Capacitor MOSFET Array (CMA) Theory—Localized Polarity Reversal

During normal operation the components used to realize the PTD will experience a phenomenon called Localized Polarity Reversal. Localized polarity reversal is a phenomenon in which the voltage potential across the PTD during the input conduction sequence is reversed during the output conduction sequence. This phenomenon exist because the PTD is connected between segment nodes that during the output conduction sequence will electronically be connected to the output power and return rails. However, during the input conduction sequence a number of the segment power return nodes will have a higher voltage potential due to the serial configuration of the segment capacitors. For both the CDA and CDMA capacitive transformer designs this phenomenon has no affect on the design or its operation due to reverse blocking voltage of the diodes. For the CMA capacitive transformer designs this affect is significant due to the power MOSFET's parasitic body diode for two reasons: 1) the parasitic body diode provides a low impedance discharge path (i.e. short) for the segment capacitors, and 2) it limits the output voltage to the diode's turn-on voltage.

The CMA design addresses the localized polarity reversal issue by using the P-channel power MOSFET to implement the PTD, along with a technique called "diode shunting" (this technique was invented during the course of the CMA's development to address this issue). The diode shunting technique works by connecting the power MOSFET, in this case a P-channel device, such that the parasitic diode is forward biased in the desired direction of current flow. By connecting the power MOSFET is this way the drain and source terminal of the device are inter-changed. The Field Effect Transistor or FET family of devices will operate normally with the inter-change of their drain and source leads which is also true of the power MOSFET devices. So that when the power MOSFET is forward biased it provides a low resistance path "around" the parasitic body diode. Hence, the power MOSFET shunts its parasitic body diode with its ON resistance of $r_{DS}$.

Capacitor MOSFET Array (CMA) Theory—PTD Gate Drive

The PTDs of the CDA and CDMA capacitive transformers are implemented with diodes which does not require additional biasing. In the CMA capacitive transformer designs, however, the P-channel power MOSFET used to implement the PTD require a gate-to-source bias voltage to obtain the low on resistance $r_{DS}$. During the output conduction sequence the proper bias conditions must be maintained to ensure that PTDs remain in their non-conductive state. This is accomplished by the input network or INET gate drive distribution circuit which is designed to distributes the gate signal to all the PTDs and maintain the proper bias conditions for the PTDs during all phases of the CMA's operation. A detailed discussion of the gate drive distribution follows later.

CMA Operation Description—Charge Path

Figure 10:
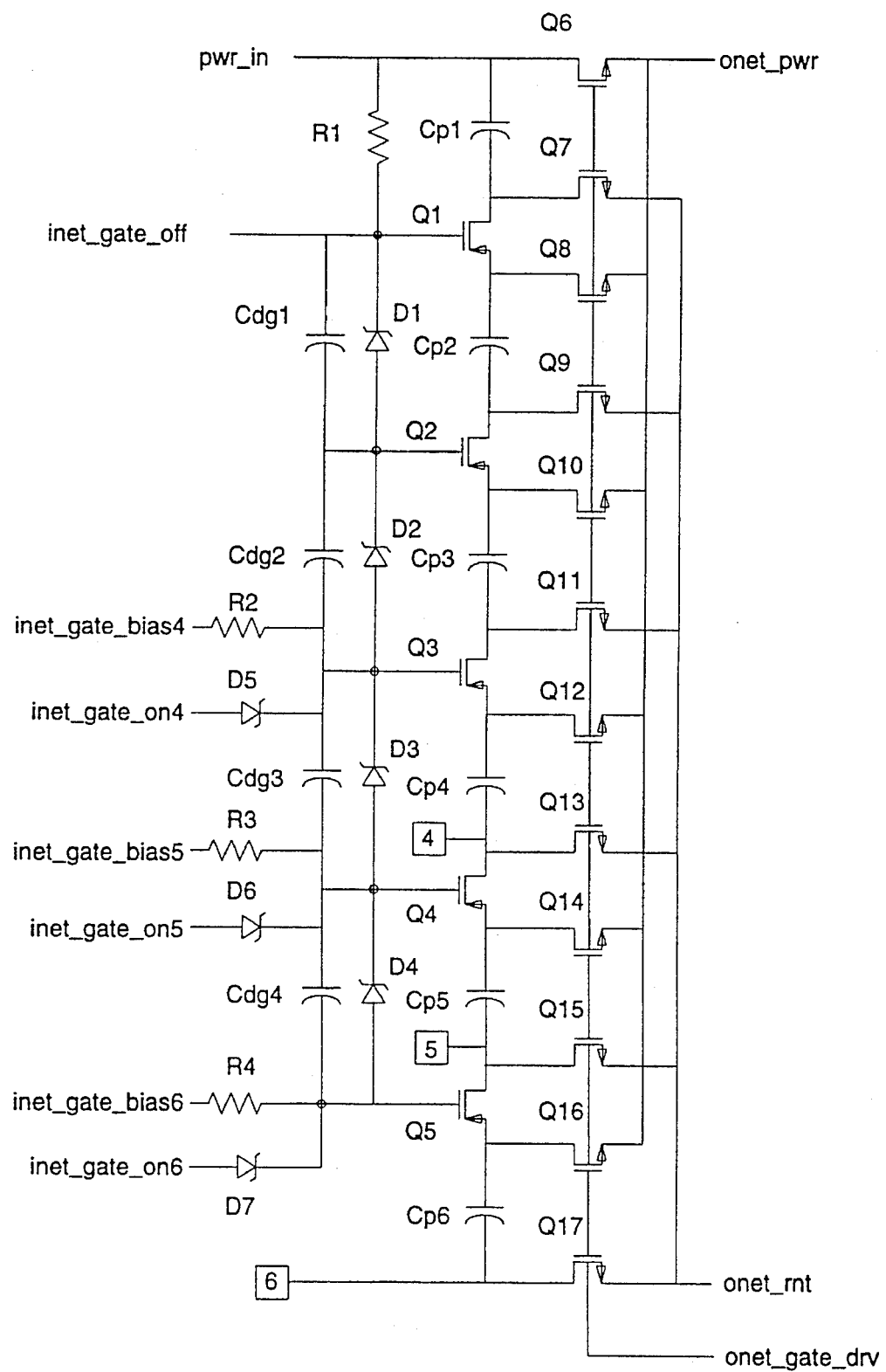
FIG. 10 shows six segment capacitor MOSFET array (CMA) capacitive transformer with gate drive distribution.

The schematic diagram of the CMA capacitive transformer shown in FIG. 10 has a total of six segments, this was done to easier illustrate some of the design principals. Also included in the schematic diagram is the gate drive distribution network for the Pass Through Devices. The gate drive distribution network which includes resistors R1–R4, zener diodes D1–D7, and capacitors Cdg1–Cdg5, is driven by a sub-circuit of the input network electronic switch. Not shown in FIG. 10 are the, INET electronic switch and gate drive, ONET gate drive, segment selection logic, and gate bias circuits. A detailed description of the gate drive distribution network will be given later.

The input DC voltage for this circuit is applied between the PWR_IN terminal and one of the three select return terminals (e.g. SEL4_RTN, [4], SEL5_RTN, [5], or SEL6_RTN, [6]). The select return terminals provide the input network, or "INET" return path to the DC input voltage source. As with the CDA and CDMA capacitive transformer designs, the secondary output voltage is always taken from the output network, or "ONET" power terminal ONET_PWR and the output network return terminal, ONET_RTN.

It is noted that when the step-down capacitive transformer is incorporated into the ISUDA variant of the HPSCVCR architecture the number of active segments is usually fixed. This reduces the CMA capacitive transformer circuit complexity and the need for a segment select logic and circuitry in the controller circuit.

Prior to the start of the input conduction sequence, the CMA capacitive transformer must be "set-up" for the number of active segments to be used during the next output conduction sequence. This involves the selection of the; select return terminal, gate drive signal and setting the proper PTD bias for the number of "active" segments to be used during the next output conduction sequence. The gate drive distribution network is "set-up" during the current output conduction sequence which ensures enough time for the gate distribution network to settle. The "set-up" operation of the gate drive distribution network is completed by connecting the selected INET_GATE_BIAS signal to the gate bias voltage source.

At start of the input conduction sequence the INET_GATE_ON signal corresponding to the number of active segments is driven by a sub-circuit of the INET electronic switch. This forces power MOSFETs Q1 through Q5 (which implement the PTDs) to enter their conductive state connecting the capacitors of the active segments into a serial configuration. In the schematic diagram of FIG. 10, the segment capacitors are $C_{P1}$ through $C_{P6}$. The selected SEL#_RTN terminal is connected to the return terminal of the input DC voltage source by a portion of the INET electronic switch to complete the input network charge path. Those segments that are not included within this path are "bypassed" which effectively reduces the step-down ratio $N_{SD}$ for both the input and output conduction sequences.

Once the input conduction sequence has completed, the input transitional dead zone sequence is entered. The INET_GATE_ON, and SEL#_RTN signals are moved to their inactive states while the INET_GATE_OFF signal is asserted forcing the PTD's power MOSFETs of the previously active segments into their non-conductive states. The duration of the input transitional dead zone sequence is made long enough to ensure that the input network electronic switches, gate drives, and PTDs have reached their respective non-conductive states. Hence, the capacitive transformer is now electrically isolated from both the input and output networks as well as the external load.

When the output conduction sequence is entered, the ONET_GATE_DRV signal is asserted (via an optocoupler) to activate the output network gate drive circuit. Once active, the output network gate driver forces power MOSFETs Q6, Q8, Q10, Q12, Q14, and Q16 on the ONET_PWR node, and Q7, Q9, Q11, Q13, Q15, and Q17 on the ONET_RTN node into their conductive state. The results is that all segment capacitors ($C_{P1}$ through $C_{P6}$) are now connected in parallel across the output capacitor $C_{out}$ and external load whether they were active during the input conduction sequence or not. Those segment capacitors that were "bypassed" during the input conduction sequence are at reduced charge and hence a reduced capacitor voltage. Unlike the CDA capacitive transformer design, the power MOSFETs provide a DC path from the output network to the "bypassed" segment capacitors. This results in some of the charge provided by the "active" segments to be used to charge the "bypassed" segment capacitors during the output conduction sequence. However, the amount of charge diverted to the "bypassed" segment capacitors is very small and their affect insignificant. Hence, the net effect is that only those segment capacitors that had received charge during the input conduction sequence will transfer charge at this time.

Output voltage regulation is maintained by controlling the amount of charged transferred from the segment capacitors to the output capacitor $C_{out}$ and the external load. In the HPSCVCR architecture the amount of charge transferred is controlled by changing the duration of the output conduction sequence (i.e. the amount of time that the ONET_GATE_DRV signal is asserted). Hence the duration of the output conduction sequence is usually different for every output conduction sequence. Once the output conduction sequence has completed, the output transitional dead zone sequence is entered and the ONET_GATE_DRV signal is de-asserted via the optocoupler. This electrically isolates the capacitive transformer from the input and output networks. The output transitional dead zone sequence, as with the input transitional dead zone sequence, is made long enough to ensure that the power MOSFETs of the output network have enough time to reach their non-conductive state.

For the CMA implementation a number of the capacitive transformer parameters and equation must be modified. These modifications are listed in equations EQ15a through EQ15d.

EQ 15:
$R_{p-}$ use equation EQ 14

EQ 15b:
$$R_x = N_{SD}(esr_p + r_{DS_p}) + r_{DS_n}$$

EQ 15c:
$$V_{in} = N_{SD} \frac{V_{pMAX} - V_{pMIN} \cdot \sigma(t_2)}{1 - \sigma(t_2)}$$

where: $\sigma(t_2) = e^{\frac{-N_{SD}t_2}{R_x C_p}}$

EQ 15d:
$$V_p = \begin{cases} MAX = A_1 + A_2 \\ MIN = A_1 g_1(t_1) + A_2 g_2(t_1) \end{cases}$$

$esr_p$—the equivalent series resistance of the segment capacitor $C_p$.

$esr_o$—the equivalent series resistance of the output capacitor $C_{out}$.

$r_D$—forward resistance of the diode $r_{DS_p}$—P-channel power MOSFET drain-to-source 'ON' resistance.

$r_{DS_n}$—N-channel power MOSFET drain-to-source 'ON' resistance.

CMA Gate Drive Distribution—Theory

A method was needed to drive a large number of the PTD contected power MOSFETs at high speeds which resides at a number of different voltage potentials. This method must also insure that the P-channel power MOSFETs did not enter into an inadvertent conduction state caused by localized polarity reversal during the output conduction sequence. In summary the selected method must address the following issues of:

1. Driving the large capacitive load offered by the power MOSFET's input capacitance at high switching speeds.
2. Driving a large number of power MOSFETs which resides at different voltage potentials.
3. Must ensure that inadvertent conduction is avoided due to localized polarity reversal during the output conduction sequence.

4. Insure that the maximum gate-to-source voltage is not violated during all phases of operation.

A capacitor-zener diode distribution network solution, which is shown in FIG. 10, is used to address the issues listed above. The distribution network operates on the simple principle of series capacitor circuits. An equivalent circuit switching model of the gate distribution network and representative MOS capacitors are shown in FIG. 11a (the equivalent MOSFET on resistance, $r_{DS}$ is not shown in this diagram). In practice, both the $C_p$ and $C_{dn1}$ capacitors are selected such their values are much greater than the input capacitance $C_{iss}$ of the power MOSFETs. Hence, the voltage divider rule for capacitive circuits essentially has all of the gate signal voltage being developed across the input gate-to-source capacitor of the power MOSFETs. So that in the simplest equivalent circuit model, the input capacitance of the power MOSFETs appear as an array of parallel connected capacitors. The total gate switching current that must be supplied by the gate drive sub-circuit is described by equation EQ16.

EQ 16:
$$I_{gate} = \frac{(N_{SD} - 1)Q_g}{\Delta t}$$

where:

$\Delta t$ is the switching time $Q_g$ is the change in gate charge during switching In operation the majority of the power MOSFET gate switching current passes through the gate distribution capacitors $C_{dn}$ with essentially zero current passing through the zener diodes. This has a number of benefits: 1) the response time of the capacitors is faster than that of the zener diodes or any other active device, and 2) since a very small percentage of the gate switching current is carried by the zener diodes, these devices can be sized much smaller.

All of the gate switching current enters the gate distribution network from a single node before it is distributed to the input capacitance $C_{iss}$ of the power MOSFETs. This allows a single gate driver source to be used for the input network gate driver circuit. However, in this scheme the gate switching current seen by each distribution capacitors $C_{dn1}-C_{dn4}$ varies with the capacitors relative location along the distribution path, so that each of the capacitors conduct a different amount of the switching current. The magnitude of the gate switching current decreases by the amount of $Q_g/\Delta t$ for each power MOSFET gate node encountered along the distribution path. Equation EQ17 describes the magnitude of the gate switching current seen by each of the distribution capacitors $C_{dn1}-C_{dn4}$ based on the capacitors relative position along the distribution path for the charging of the power MOSFET's input capacitance $C_{iss}$.

EQ 17:
$$I_{gate}(j) = \frac{(N_{SD} - 1 - j)Q_g}{\Delta t}$$

$j = 1, 2, \ldots, N_{SD} - 2$ $\quad C_{iss}$ Charging

During the $C_{iss}$ discharge operation the gate distribution network is driven from a single point in much the same way as during the charging operation. Equation EQ18 describes the magnitude of the gate switching current seen by each of the distribution capacitors during $C_{iss}$ discharge operation.

EQ 18:
$$I_{gate}(j) = \frac{jQ_g}{\Delta t}$$

$j = 1, 2, \ldots, N_{SD} - 2$ $\quad C_{iss}$ Discharging

NOTE:

In each of the equations EQ17 and EQ18 the "j" terms represents the relative location of the individual distribution capacitor to the "charging" driving node.

It is important to note that the gate switching current for both $C_{iss}$ charge and discharge operation passes through the gate distribution capacitors $C_{dn1}-C_{dn4}$ in the same direction. Additionally, the magnitude of the switching current seen by a particular distribution capacitor is different for each of the operation due to its relative position during each of the operations. This will result in a net increase of the gate-to-gate voltage across the distribution capacitors $C_{dn1}-C_{dn4}$, and over time this net increase would cause the improper operation of the capacitive transformer. For the circuit shown in FIG. 10, the gate distribution network is implemented using the capacitor-zener configuration. The zener diodes connected across each of the gate distribution capacitors is used to establish and maintain a constant gate-to-gate voltage for each of the P-channel power MOSFETs. When enough charge has accumulated across the gate distribution capacitor to increase its voltage the zener diode provides a local discharge path to return the capacitor voltage to its nominal value. In practice, a small DC current is introduced into the gate distribution network which biases the zener diodes to the proper DC voltage desired for the gate-to-gate voltage of the P-channel power MOSFETs. This current is established via resistor R1 with the assertion of any one of the INET_GATE_ON# signals, or when the INET_GATE_OFF signal is asserted via the assertion of any one of the INET_GATE_BIAS# signal assertions.

For a number of the PTDs the voltage potential developed across the gate-to-source junction during the output conduction sequence will exceed the ±20 V maximum for most commercially available power MOSFETs. The link function is designed to "float" the gates of the PTD configured MOSFETs by isolating them from the gate distribution network during the output conduction sequence. During this period of isolation, the bias condition of the power MOSFET is maintained by a residual static gate charge that had been developed prior to entering the isolation period. While in isolation, the residual static gate charge is only affected by the net change of its drain-to-source voltage caused by transition to the parallel output configuration of segment capacitor. The affect is that the residual static gate charge is decreased by an amount equal to the voltage divider of the power MOSFETs junction capacitors; $C_{iss}$, $C_{rss}$, and the change in its drain-to-source voltage during this period. The affects of the drain-to-gate charge on the junction capacitor $C_{iss}$ residual charge can be reduce by placing a resistor between the gate and source terminals of the PTD configured power MOSFETs.

CMA Gate Drive Distribution—Capacitor-Zener Operation

In the description of the gate distribution network's operation six segments will be used in which the active signals are: INET_GATE_OFF, INET_GATE_BIAS6, and INET_GATE_ON6.

During normal operation the input DC voltage is monitored and the proper bias point selected. In this example it is determined that the INET_GATE_BIAS6 should be asserted to achieve the proper bias point. The selection task is done during the output conduction sequence or a symbiotic refresh cycle. The INET_GATE_OFF signal which had been asserted at the end of the input conduction sequence is also asserted during this time and maintains the PTDs in their non-conductive state. The gate-to-gate voltage is established by the zener voltage, which also determines the voltage across the gate distribution capacitors $C_{dn1}$–$C_{dn4}$.

Before entering the input conduction sequence, the output transitional dead zone sequence is entered. It is during this period of time that the INET_GATE_OFF signal is deasserted. The deassertion of the INET_GATE_OFF is maintained for the duration of the input conduction sequence. When the input conduction sequence is entered, the INET_GATE_ON6 signal is asserted which pulls the anode terminal of zener diode D7 to the potential of the gate bias voltage. The voltage value of the gate bias voltage is selected to provide an absolute gate-to-source voltage, $V_{GS}$, of between 10 V to 12 V. This value of $V_{GS}$ ensure that the power MOSFETs are fully on and will achieve their minimum on resistance for $r_{DS}$. Any increase in the gate-to-gate voltage across the gate distribution capacitors, $C_{dn1}$–$C_{dn4}$ will be reduced back to the nominal value by the "local" discharge path provided by the individual zener diodes D1–D4. At the end of the input conduction sequence, the INET_GATE_ON6 is deasserted when the input transitional dead zone sequence is entered. During the this sequence (the input transitional dead zone) the INET_GATE_OFF is asserted to return the PTDs to their non-conductive state. Once again, any net change in the gate-to-gate voltage is returned back to the nominal value via the local discharge path provided by the zener diodes.

Figure 11B:
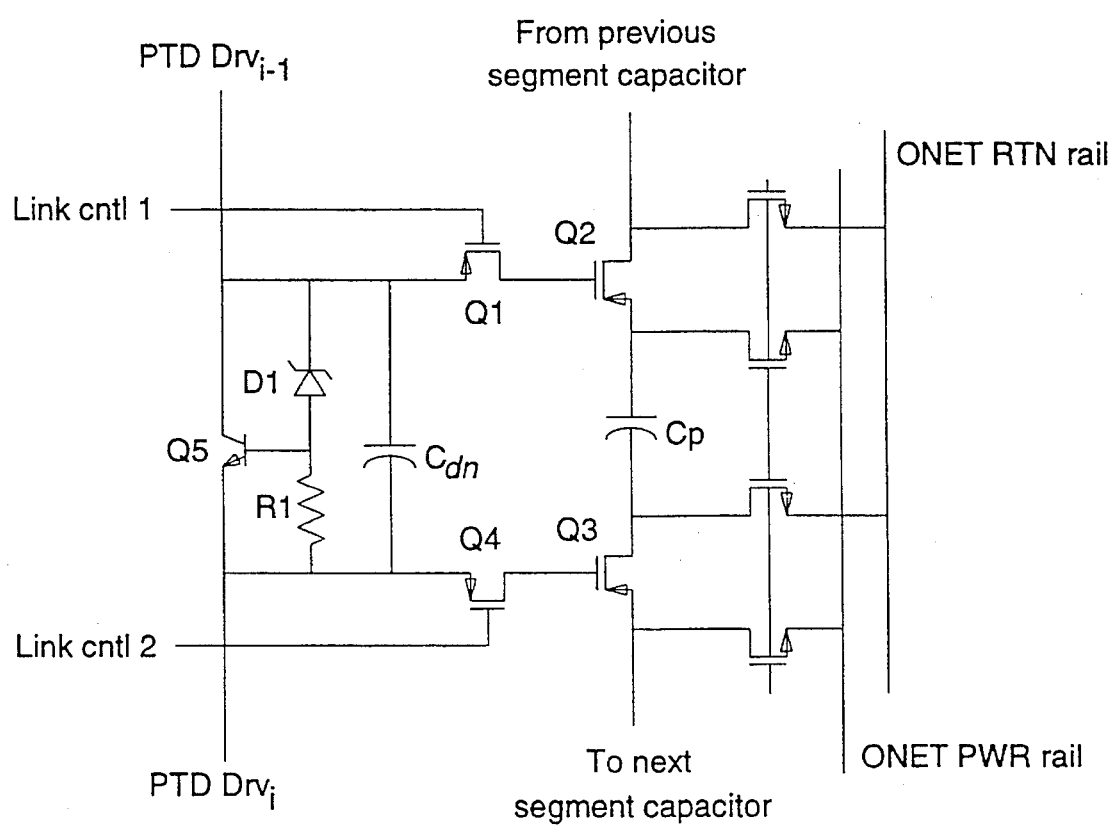
FIG. 11b shows a partial section of a step-down capacitive transformer with a capacitor-transistor-link gate drive distribution current.

FIG. 11b is a partial schematic of a VSDA capacitive transformer with a capacitor-transistor-link gate distribution network. The p-channel power MOSFETs Q1 and Q4 are used to implement the "link" transistors which isolate the PTD configured MOSFETs (Q2 and Q3) from the PTD drive gate distribution network during the output conduction sequence. When MOSFETs are biased in their "ohmic" region they operated as a voltage controlled resistor and conduct current in both directions. Hence, the use of power MOSFETs to implement the "link" function requires the use of a single device. However the use of these devices requires that the parasitic diode of the power MOSFET is arranged such that it blocks current flow during the output conduction sequence. The nominal gate-to-gate voltage between the PTD configured power MOSFETs Q2 and Q3 is maintained by the voltage regulation circuit formed by Q5, R1 and D1 which replaces the zener diode used in the capacitor-zener distribution network.

Before entering the INET conduction sequence, the ONET transitional dead zone sequence is entered. It is during this period of time that the INET_GATE_OFF signal is deasserted. The deassertion of the INET_GATE_OFF is maintained for the duration of the input conduction sequence. When the input conduction sequence is entered, the INET_GATE_ON signal is asserted which pulls the PTD_DRV$_i$ signal line to a voltage value that forces the PTDs into their "on" state. This voltage value is selected to provide an absolute gate-to-source voltage, $V_{GS}$, of between 10 V to 12 V. This value of $V_{GS}$ ensures that the power MOSFETs are fully "on" and will achieve their minimum on resistance value for $r_{DS}$. As charge from the gate-to-source capacitor of the power MOSFET is removed a gate switching current is established, the majority of which flows through the gate distribution capacitor, $C_{dn}$. This current flow will increase the gate-to-gate voltage across the distribution capacitors, $C_{dn}$, and over time if left unchecked, will cause the improper operation of the VSDA capacitive transformer. To compensate for this, the nominal gate-to-gate voltage is maintained by the transistor regulator circuit formed by Q5, D1 and R1 which provides a "local" discharge path for the distribution capacitor. At the end of the input conduction sequence, the INET_GATE_ON is deasserted when the input transitional dead zone sequence is entered. During the dead zone sequence the INET_GATE_OFF is asserted to return the PTDs to their non-conductive state. Once again, any net increase in the gate-to-gate voltage across the distribution capacitor is returned to its nominal value via the local discharge path provided by the transistor regulating circuit.

In the partial circuit shown in FIG. 11b, the PTD_DRV$_i$ signal is used to control the operation of the PTD configured power MOSFETs, Q2 and Q3. During the input conduction sequence the PTD_DRV$_i$ signal is pulled to a value of the negative voltage. The LINK power MOSFETs of Q1 and Q4, are used during this time to establish a low impedance path between the PTD configured power MOSFETs and the PTD_DRV$_i$ gate distribution signal. The conduction state of the LINK power MOSFETs, or LINKs, are controlled by their respective drive signals, LINK_CNTL_1 and LINK_CNTL_2. The LINK_CNTL drive signals are asserted at the start of the input conduction sequence with the SD_INETSON signal assertion. At the end of the input conduction sequence LINK_CNTL_1 and LINK_CNTL_2 are deasserted with the assertion of the SD_INETSOFF signal forcing the LINKs into their "off" state.

It should be noted that with of the link circuit topology, the parasitic diode of the link power MOSFETs are normally forward biased during the early portion of the INET conduction sequence. This allows gate switching current to flow during early portion of the INET conduction sequence while the power MOSFETs are reaching their "on" state "ohmic" value. The net affect is that faster PTDs switching speeds are realized.

Protection of the LINK power MOSFETs are ensured by the link circuit topology and its operation. The source terminal of the LINK power MOSFETs of Q1 and Q4 are connected to the gate distribution network signal PTD_DRV$_i$ and their gates to the drive signals LINK_CNTL_I and LINK_CNTL_2 respectively. Knowing the PTD_DRV$_i$ signal's timing and voltage range, the LINK_CNTL_1 and LINK_CNTL_2 are operated accordingly to ensure that the gate-to-source voltage of the LINKs remain within the manufacture's specifications.

CMA Component Specification

MOSFET Parameter Criteria

The CMA capacitive transformer is implemented with both P-channel and N-channel power MOSFET devices. The P-channel devices are used to implement the LINK and PTDs, while the N-channel devices are used to implement the parallel output network for the segment capacitors. These devices are selected for the reasons are given below.

1. N-channel devices are used to implement the parallel output network primarily for their very low ON resistance, $r_{DS}$, and high break down voltage, $V_{DS}$.

2. A number of "Logic Level" power MOSFET are becoming available. These are typically N-channel power MOSFET devices, requiring gate-to-source voltages of only 5 V for the device to reach their maximum drain current, and minimum "on" resistance, $r_{DS}$. The use of these devices will greatly reduce the constraints on designs based on the HPSCVCR architecture.

3. The return path devices can be referenced to allow a single gate driver circuit to be used for both the power and return path devices at low converter output voltages.

4. The P-channel devices selected to implement the PTDs of the CMA capacitive transformer are chosen primarily for their low "on" resistance, $r_{DS}$. During normal operation of the step-down capacitive transformers, the drain-to-source voltage is never greater than the maximum segment capacitor voltage. Hence, for low output voltage converter designs high values of $V_{DS}$ is not required.

5. The P-channel devices selected to implement the LINK function of the capacitor-transistor-link distribution network are selected for their high values of $V_{DS}$ and current handling capacity. Low "on" resistance values are not critical, since these devices do not carry charge to the output network.

$r_{DS(on)}$ Drain-to-Source ON resistance

This value is critical in determining the efficiency of the DC-to-DC voltage converter design, especially at low output voltages (e.g. $V_{out} \leq 5$) with delivered output power of 5 W or greater. An increase in the $r_{DS}$ values has one of two affects: 1) it forces a longer output conduction sequence in order to reach the desired output voltage level thus reducing the available output power, or 2) it forces the value of the input DC voltage to increase, which reduces the efficiency of the conversion operation. The low values of $r_{DS}$ are critical for the PTDs and output network devices. However, for the LINK power MOSFETs, this is not a critical parameter.

$V_{DS}$ Drain-to-Source Voltage

All variants of the HPSCVCR architecture will expose some of the power MOSFET devices to very high drain to source voltages during normal operation. Hence, the capacitive transformer design must ensure, that the maximum $V_{DS}$ of any device is not exceeded. This will usually occur on the ONET_PWR and ONET_RTN nodes of the output transformer. In the cases where this would occur, devices may be "stacked" (i.e. serial connected) to increase their maximum voltage handling capability. However, for the PTDs used in the step-down capacitive transformer with low output voltages $\leq 5$ V, high values of $V_{DS}$ are not critical.

Gate-to-Source Voltage

Although this value is not critical to the operation of the capacitive transformer it, however, may reduce the design constraints of the output network gate driver circuit. Power MOSFET devices are available with "logic level" gate voltages. These devices are guaranteed to reach the minimum $r_{DS}$ value with a maximum of 5 V applied to its gate. This is significant in terms of the ONET gate driver design, where the gate voltage of the MOSFET devices on the ONET_PWR node must be driven to a value of $V_{gs} = V_{out} + V_{gs(on)}$.

The maximum value of $V_{gs}$ is also a critical design parameter. The maximum rating for this power MOSFET parameter is ±20 V for most commercially available devices. Hence, care should be taken to ensure that ONET gate driver does not exceed this limit.

Step-Up Capacitive Transformer Overview

Figure 12:
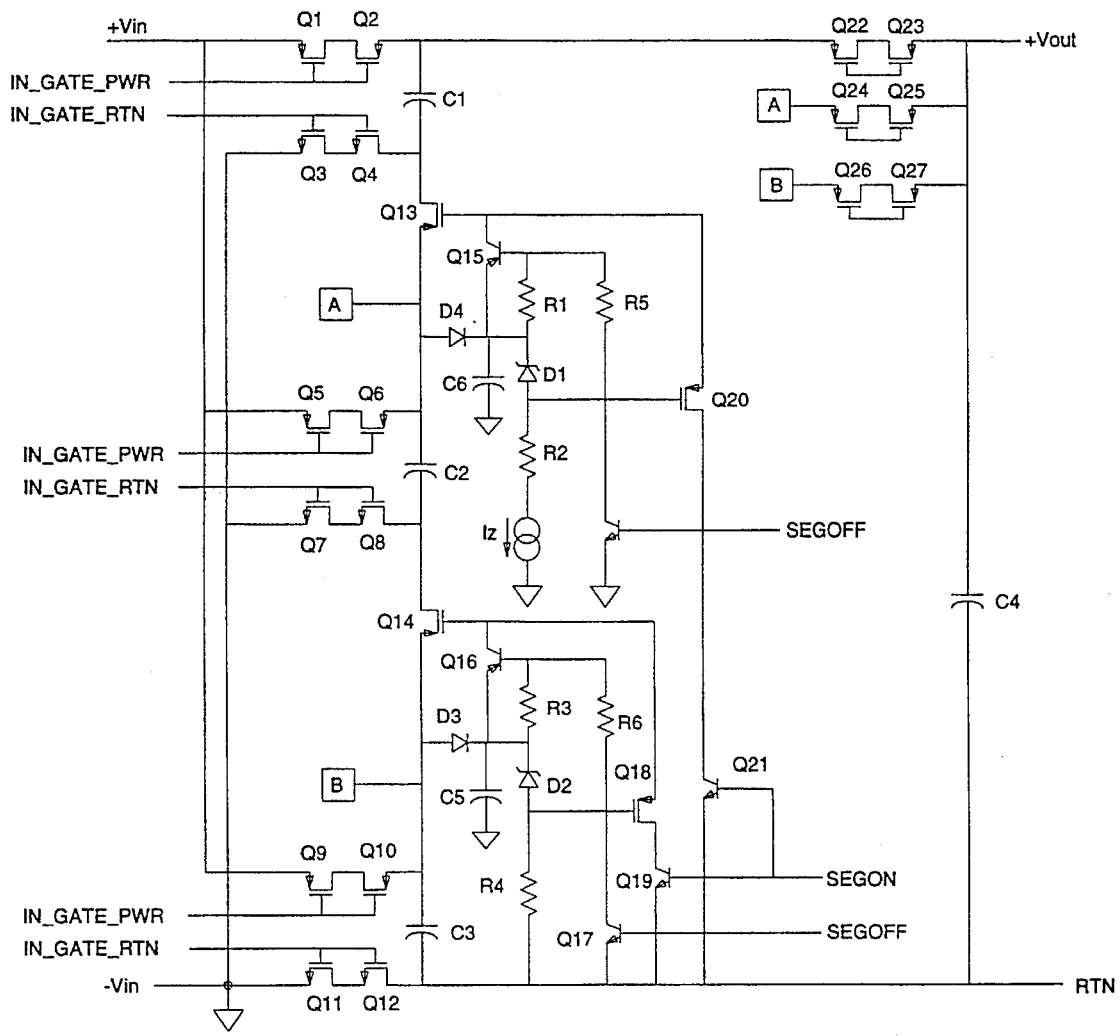
FIG. 12 shows a schematic diagram of a three segment step-up capacitive transformer.

The operation of the step-up capacitive transformer is similar to that of the step-down version of the capacitive transformer. The major difference being the segment capacitor configurations used during the input and output conduction sequences. The step-up capacitive transformer operates by having each of its segment capacitors connected in parallel across the input DC voltage source during the input conduction sequence. During the output conduction sequence electronic switches connect the segment capacitors into a series configuration so that its output voltage is now $V_{OUT} = V_{SU} \cdot V_C$ which is approximately $V_{OUT} = V_{SU} \cdot V_{in}$. The step-up radio of this capacitive transformer version is equal the average number of active segments during the output conduction sequence. During normal operations the number of active segments varies on a cycle-by-cycle basis as part of the output voltage regulation. A schematic diagram of a three segment, e.g. $N_{SU}=3$, step-up capacitive transformer is shown in FIG. 12 which also includes the output gate drive for its PTDs.

Although the concept of the step-up capacitive transformer is simple its realization is not. This is due to the localized polarity reversal phenomenon that is inherent in the implementation of a positive-to-positive (i.e. positive input voltage to positive output voltage) step-up capacitive transformer. The way in which the phenomenon occurs in the step-up capacitive transformer topology prevents the use of diodes as a PTDs. Hence, P-channel power MOSFETs are used to implement the PTDs which allows for precise control over when the device becomes conductive. Unlike the step-down capacitive transformer with CDA and CDMA designs, the step-up capacitive transformer is realized using the Capacitor MOSFET Array or CMA version only.

Step-Up Capacitive Transformer Operation

During the input conduction sequence, the IN_GATE_PWR and IN_GATE_RTN drive signals are asserted forcing power MOSFETs Q1 through Q12 into their "on" states. The P-channel device pairs of Q1–Q2, Q5–Q6, and Q9–Q10 connects the positive plate of the segment capacitors to the $+V_{in}$ terminal of the input DC voltage source. The N-channel device pairs of Q3–Q4, Q7–Q8, and Q11–Q12 connects the negative plate of the segment capacitors to the $-V_{in}$ terminal of the input DC voltage source.

It should be noted that P-channel power MOSFETs Q2, Q6, Q10 and N-channel power MOSFETs Q4, Q8, Q12, of these pairs are used implement a "Low Impedance, Low Threshold" (LILT) diode to block reverse current flow from the segment capacitors. Reverse current flow for the step-up capacitive transformer occurs during the output conduction sequence when the stacked voltage of the series connected segment capacitors is much greater than the DC input voltage. The efficiency of the step-up capacitive transformer is greatly improved with the use of power MOSFETs is this way over the used of actual diodes. This is due to the absence of any PN junction voltage and the low "on" resistance offered by the power MOSFETs.

At the end of the input conduction sequence the IN_GATE_PWR and IN_GATE_RTN drive signals places power MOSFETs Q1–Q12 into their "off" state. Before the output conduction sequence is executed, the input transitional dead zone sequence is entered where the SIGOFF signal is deasserted. At the start of the output conduction sequence the SIGON signal is asserted driving the PTD configured power MOSFETs Q13 and Q14 into their "on" state which connects the segment capacitors into a series configuration. The number of segments used during the output conduction sequence is determined by the output power MUX selection. The output power MUX of the step-up capacitive transformer is formed by power MOSFETs Q22–Q27 (note, the selection and drive circuitry for the output power MUX is not shown). The power MOSFET pairs of the output power MUX are in place to prevent reverse current flow from the summation capacitor to the segment capacitors during the input conduction sequence. The step-up capacitive transformer output voltage regulation is controlled by the number of segment capacitors selected during the output conduction sequence, and the duration of the output conduction sequence. At the end of the output conduction sequence, the SEGON signal is deasserted to turn-off the drive to the PTDs. When the output transitional dead zone sequence is entered the SEGOFF signal is asserted driving the PTD's into their "off" state.

The characteristic equations and their parameters developed to predict the performance of the capacitive transformer were based on the VSDA variant. For the CMA step-up implementation of the VSUA variant all of the capacitive transformer parameters and equation are modified. These modifications are listed in equations EQ19a through EQ19e.

EQ 19a:
$$R_p = (N_{SU} - 1)r_{DS_{p1}} + N_{SU}esr_p + r_{DS_{p2}}$$

EQ 19b:
$$R_x = \frac{esr_p + 2r_{DS_p} + 2r_{DS_n}}{N_{SU}}$$

EQ 19c:
$$V_p = \begin{cases} MAX = \frac{A_1 + A_2}{N_{SU}} \\ MIN = \frac{A_1 g_1(t_1) + A_2 g_2(t_1)}{N_{SU}} \end{cases}$$

EQ 19d:
$$V_{in} = \frac{V_p MAX - V_p MIN \cdot \sigma(t_2)}{(1 - \sigma(t_2))}$$

where: $\sigma(t_2) = e^{\frac{-N_{SD}t_2}{R_x C_p}}$

EQ 19e:
$$\eta = \frac{V_{out}}{V_{in}N_{SU}} \times 100\%$$

$esr_p$—the equivalent series resistance of the segment capacitor $C_p$.

$esr_o$—the equivalent series resistance of the output capacitor $C_{out}$.

$r_{DS_{p1}}$—PTD P-channel power MOSFET drain-to-source 'ON' resistance.

$r_{DS_{p2}}$—power MUX P-channel power MOSFET drain-to-source 'ON' resistance.

$r_{DS_n}$—N-channel power MOSFET drain-to-source 'ON' resistance.

PTD Gate Drive Circuit Overview

In developing the gate drive required for the PTD configured P-channel power MOSFETs used in the step-up capacitive transformer a number of issues had to be addressed. Of most concern is that fact that during normal operation the PTDs will experience large voltage swings due to the voltage multiplication of the step-up capacitive transformer. Secondly, there is no voltage source for the gate drive circuit with a potential as large as the expected output voltage of the capacitive transformer. Hence a technique which did not require such a bias voltage had to be developed.

A distributed semi-active gate drive technique was developed that receives its bias power directly from the segment capacitor it is associated with. Each of these PTD gate drive sub-circuits is design to 'float' so that it can be referenced directly to its associated segment capacitor. Hence, as the segment capacitors are switched between the serial and parallel configurations, the bias conditions of the power MOSFET can track the changes in voltage potentials between the configurations.

PTD Gate Drive Circuit Theory

Figure 1:
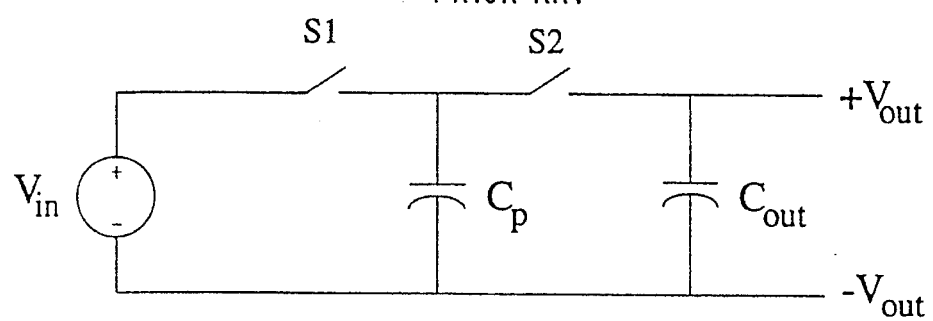
FIG. 1 shows a simplified switching capacitor voltage regulator.
Figure 13:
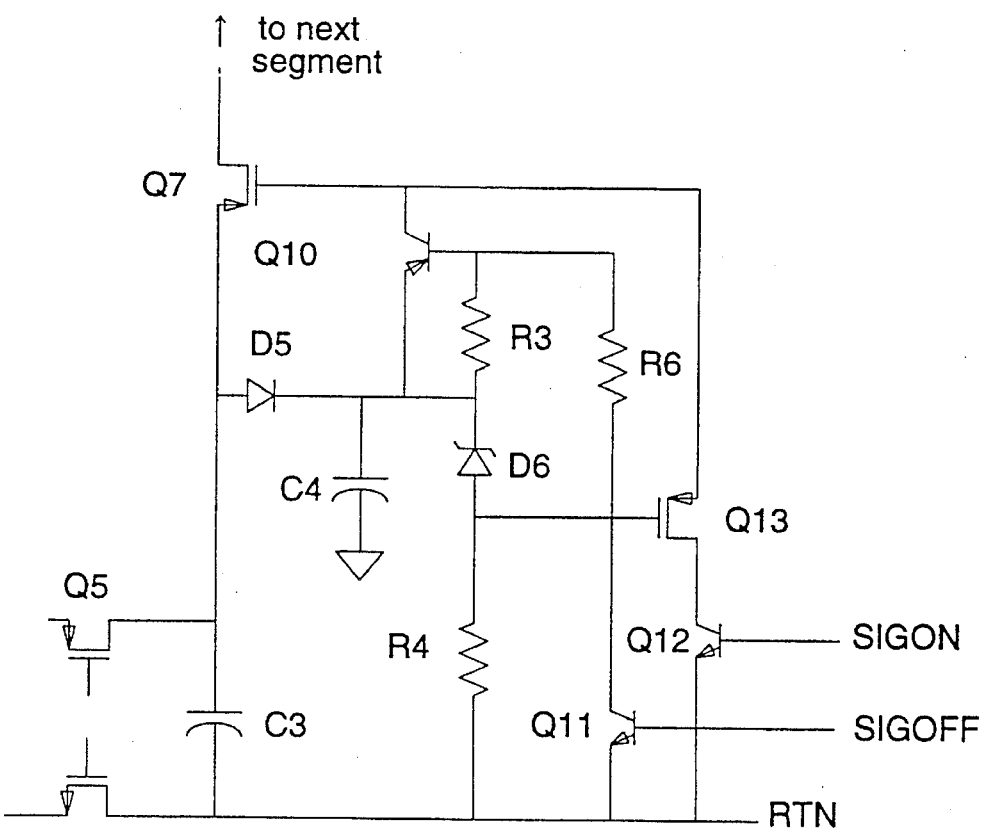
FIG. 13 shows a VSUA PTD gate drive circuit portion.

The gate drive circuit operates by biasing the power MOSFET relative to its source lead potential. In this way the gate drive signal is unaffected by the change in the power MOSFET source voltage as its transitions between the serial and parallel configurations. Hence, to maintain the P-channel power MOSFET (or any MOSFET device) in its cutoff region its gate voltage must be held at the value of its source lead potential. When the P-channel power MOSFET is in its saturation region (i.e. conductive or 'on' state) its gate voltage is at a value of $V_{GS}$(on) below the value of the source lead voltage. The actual values of the gate "on" and "off" voltages are dependent on the position of the PTD power MOSFET in the step-up capacitive transformer and the value of the input voltage. For convenience a portion of the PTD gate drive is redrawn below in FIG. 13.

PTD Gate Drive Circuit Operation—Off condition

To ensure that the power MOSFET is biased in its cutoff region, its gate voltage is forced to track its source lead voltage. This is accomplished when PNP transistor Q10 is forward biased which provides a discharge path for the gate-to-source capacitance of the power MOSFET forcing this voltage to near zero. When the gate and source leads of the power MOSFET is connected in this way, the source lead voltage can experience large swings without affecting the non-conductive state of the power MOSFET. Transistor Q10 is forward biased when drive signal SIGOFF is asserted pulling its base node toward the return potential via resistor R6.

Ideally, transistor Q10 is bipolar to take advantage of the low turn-on voltage of $V_{BE}$. This is extremely advantageous for low Vin voltages designs.

PTD Gate Drive Circuit Operation—On condition

The PTD configured P-channel power MOSFET enters its saturation region (i.e. conductive state) when its gate voltage is pulled to a value of $V_{GS}$(on) below that of its source lead voltage. This relationship of the PTDs lead voltage must be maintained during the step up capacitive transformer's transition from its parallel to serial configuration. This is made more difficult for two reasons: 1) the turn-on times and turn-on order of each PTD is unknown so that the exact source voltage of any PTD power MOSFETs during this period of time is also unknown. 2) Because the source voltage is not known during this period, it is very important to ensure that $V_{GS}$ does not exceed the maximum device limit.

When the output conduction sequenced is entered a number of the PTDs are moved into their conductive state to form a series capacitor configuration. In the PTD gate drive circuit shown in FIG. 13, the P-channel power MOSFET Q7 becomes conductive with the assertion of the SIGON drive signal. The P-channel power MOSFET Q13 is used to implement a gate voltage clamp for transistor Q7. So that when transistor Q12 is forward biased with the assertion of drive signal SIGN0, it pulls the gate node of Q7 to the output network return potential via transistor Q13. When the gate voltage of Q7 is within Q13's threshold gate voltage transistor Q13 will have entered into its cutoff region. The affective gate-to-source voltage of Q7 is now given by $V_{GS}=V_Z-V_{thres}$ which is maintained for the entire output conduction sequence. The bias current for zener diode D6 is supplied by capacitor C4. The actual drain of the zener bias current and its affect on the voltage of capacitor C4 voltage is minimal. The expected voltage drop experienced by the segment capacitor is given by the following expression:

$$\Delta V = 1/C_4 I_Z T \qquad \text{EQ20:}$$

where T is the total cycle time of the system.

For example, assuming the following: $C_4=1.0$ µF, $I_Z=0.5$ mA, T=22 mS Then a 11.0 mV drop in capacitor's C4 voltage would be expected.

The PTD gate drive circuit receives all its bias current from the diode capacitor circuit of D5 and C4. Capacitor C4 receives its charge during the output conduction sequence via diode D5, which is used to block reverse current flow from capacitor C4 during the input conduction sequence of the step-up capacitive transformer.

INET Switch and Gate Drive Overview: M2 and M8

The input network or INET switch is designed to implement a SPST (Single Pole Single Through) switch function that is controlled directly by the state machine. The INET switch, which uses a P-channel power MOSFET as the current carrying path device, is designed to operate at very high speeds efficiently requiring little more than the power needed during switching. The INET switch automatically maintains the proper gate signal voltage swing over the full input DC voltage range of the HPSCVCR based design to obtain the maximum performance of the switch (i.e. the low $r_{DS}$ of the power MOSFET).

A sub-circuit included in the INET switch is use to generate the actuating gate drive signal required for the PTD gate distribution network of the CMA capacitive transformer. The INET switch and the gate drive sub-circuit are combined for convenience since they share all of the same requirements and circuits.

Below is a complete list of issues concerning the INET switch and gate drive circuit that must be addressed by the design.

1. HPSCVCR based converters are designed to have a wide input DC voltage range. Because of this the power MOSFETs used in these designs are subjected to large voltage swings during normal operation. Of particular concern is the gate-to-source voltage of the power MOSFET which typically has an absolute maximum of: $V_{gs(max)} \pm 20$ V. Hence, the generation of the gate drive signal must ensure that the gate-to-source voltage limits are not exceeded.

2. The high operational frequencies of designs based on the HPSCVCR architecture is required to obtain high output power levels. This also requires that the power MOSFETs be switched at these high rates which is made difficult by the inherently large input capacitance, $C_{iss}$ and the Miller effect capacitance, $C_{rss}$ of the devices. At same time, the overall power consumption by the INET gate drive circuit must be kept close to only the energy that is required for switching to maintain a high operational efficiency.

3. Due to the number of segments that would be implemented in a high efficiency, high power design, it is very desirable to keep the number of components needed to a minimum. This allows for an overall smaller design at any level of integration selected.

4. Designs based on the HPSCVCR architecture are controlled by a state machine implemented using low voltage logic (with supply voltages of 3.0 V to 12 V max.). Hence, an efficient and fast level translation is required to interface the state machine to the INET electronic switch which operates at much higher voltages (i.e. ISV values from 80 V to 120 V).

5. The INET electronic switch must not breech the input to output network isolation of the HPSCVCR architecture based designs.

INET Switch and Gate Drive Theory

Figure 14:
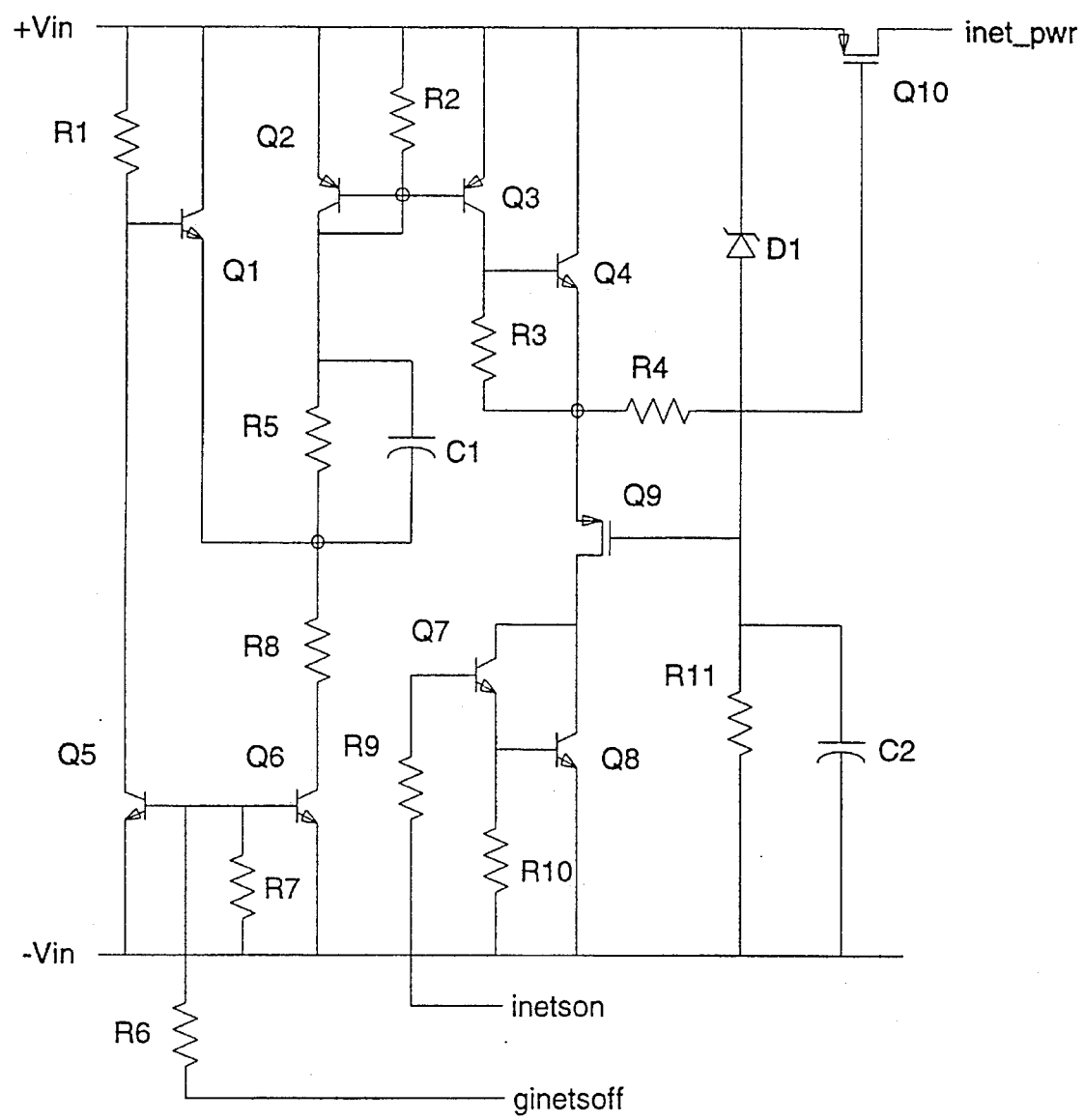
FIG. 14 shows an INET switch circuit without the gate drive sub-circuit.

It is important to note that the INET switch and gate drive circuits are connected to what is essentially a large capacitive load and will supply very little DC currents while at steady state conditions. To take advantage of this, the INET gate drivers are designed using "self cutoff" techniques (i.e. once the desired load voltage has been reached, the bipolar transistor drive devices enter into their respective cutoff modes). Therefore, the only significant current flow is designed to occur during switching, otherwise the current is essentially zero. The front-end of the INET switch is implemented using bipolar transistors which provides a low input capacitive interface to the state machine control logic. The high power gain and switching speeds of the small signal bipolar transistors achieves the high transient switching currents needed while using fewer stages. The fewer stages that are used directly translates to a lower propagation time delay from control input to switch response. A schematic of the INET switch circuit is shown in FIG. 14.

INET Switch and Gate Drive Operation

The INET switch and gate driver circuit is comprised of three functional sections: 1) the Pull-down driver, 2) Pull-down voltage clamp, and 3) Pull-up level shift and drive. The INET switch circuit is interfaced to a state machine based controller via the INETSON (INET switch ON) and GINETSOFF (Gated INET switch OFF) signals. The state machine ensures that these two signals are never asserted at the same time and also inserts a "time gap" between the assertion and deassertion of these two signals to eliminate contention within the switching circuit.

The "Pull-down driver" formed by bipolar transistors Q7 and Q8 is a Darlington connected transistor pair that shares a common collector node. Transistor Q8 is sized large enough to handle a significant amount of the current flow resulting from the gate discharge of P-channel power MOSFET Q10 (note transistor Q10 is used as the charge path device). Transistor Q7 is sized for fast response times and to reduce the loading affects on the state machine logic output. Once the initial gate charge of MOSFET Q10 has been removed the collector current of Q8 will reduce to near zero. Hence, the only current flow in the pull-down portion of the switch circuit is the base current of Q7.

The "Pull-down voltage clamp" is static circuit which is used to limit the gate-to-source voltage swing of power MOSFET Q10 during the operation of the switch circuit. This sub-circuit operates by referencing the gate of the P-channel power MOSFET Q9 to a voltage that maintains a fixed relationship with the $+V_{in}$ power rail. The clamp reference voltage is established by zener diode D1 which has its cathod reference to $+V_{in}$ while resistor R11 is used to set the zener bias current. Capacitor C2 provides an AC bypass which eliminates switching noise on the clamp reference voltage encountered during normal operation.

The pull-down sub-circuit is activated with the assertion of the INETSON signal. The gate-source charge of power MOSFET Q10 passes through the pull-down voltage clamp transistor Q9 and transistors Q7 and Q8 of the pull-down driver. As charge is removed from Q10's gate-source input capacitor, its voltage and the source voltage of Q9 will approach Q9's gate voltage (i.e., the reference clamp voltage). When this occurs, Q9 is driven into cutoff, halting any further removal of gate-source charge from Q10 and preventing any further change in its gate-source voltage. It is important to note that the gate-to-source voltage swing of transistor Q10 is defined by zener diode D1 and power MOSFET Q9. Hence, the gate voltage swing of Q10 is independent of $+V_{in}$.

The "Pull-up level shift and drive" is based on a PNP current mirror that is referenced to the $+V_{in}$ power rail. This current mirror is designed to be switched ON and OFF at very high speeds. Hence, transistors Q2 and Q3 are specified as high speed switching transistors. It is important to note, that one of the benefit of the current mirror circuits is that the bases of Q2 and Q3 are directly tied together which forces both transistors to switch at exactly the same speed. Hence, only one a "one" transistor time delay is realized during the voltage level shift operation. To further enhance the speed of the current mirror a base discharge resistor, R2, is included in the base-emitter circuit of the current mirror. Transistor Q2 is the reference port of the current mirror and is driven by an NPN transistor Q6 via a resistors—capacitor network of R5, R8, and C1. An interface node to the state machine logic is also provided by the base circuit of Q6. The series combination of R5 and R8 limit the DC current under steady state condition (i.e. signal GINETSOFF asserted) to a maintenance value. Capacitor C1 is used to momentarily increase the value of the reference current into Q2, by bypassing R5 for a short period of time. This extra current is used to increase the switching speed of the gate drive sub-circuit by increasing the gate drive current into the power MOSFET Q10. Once C1 has charged to the voltage divider value of R5 and R8, the DC current is reduce to the maintenance level value. This reduces the overhead bias power needed by this circuit.

Transistors Q1 and Q5 are used to turn-off the "pull-up level shift and drive" circuit. When signal GINETSOFF is deasserted, both transistors Q5 and Q6 are forced into cutoff, while Q1 is biased on. Because of the large voltage difference between Q1's emitter and the $+V_{in}$ power rail, Q1 will experience a large base drive current. This supplies the R5, R8, and C1 node with a large current flow from Q1's emitter. This current flow charge the parasitic capacitors at this node which increases the rate at which the node voltage approaches the value of the $+V_{in}$ rail. In this way the current mirror is forced into its non-conductive state even quicker. This scheme allows the "time gap" inserted by the state machine to be kept as short as possible. The result is that the input and output transitional dead zone sequences can also be kept short which will yield higher output power. When the GINETSOFF signal is asserted, it forward bias Q5 and Q6, with Q6 pulling the base of Q1 to the $-V_{in}$ rail driving Q1 cut-off.

INET Gate Drive Sub-circuit Operation:
Blocks M2 and M8

Figure 15:
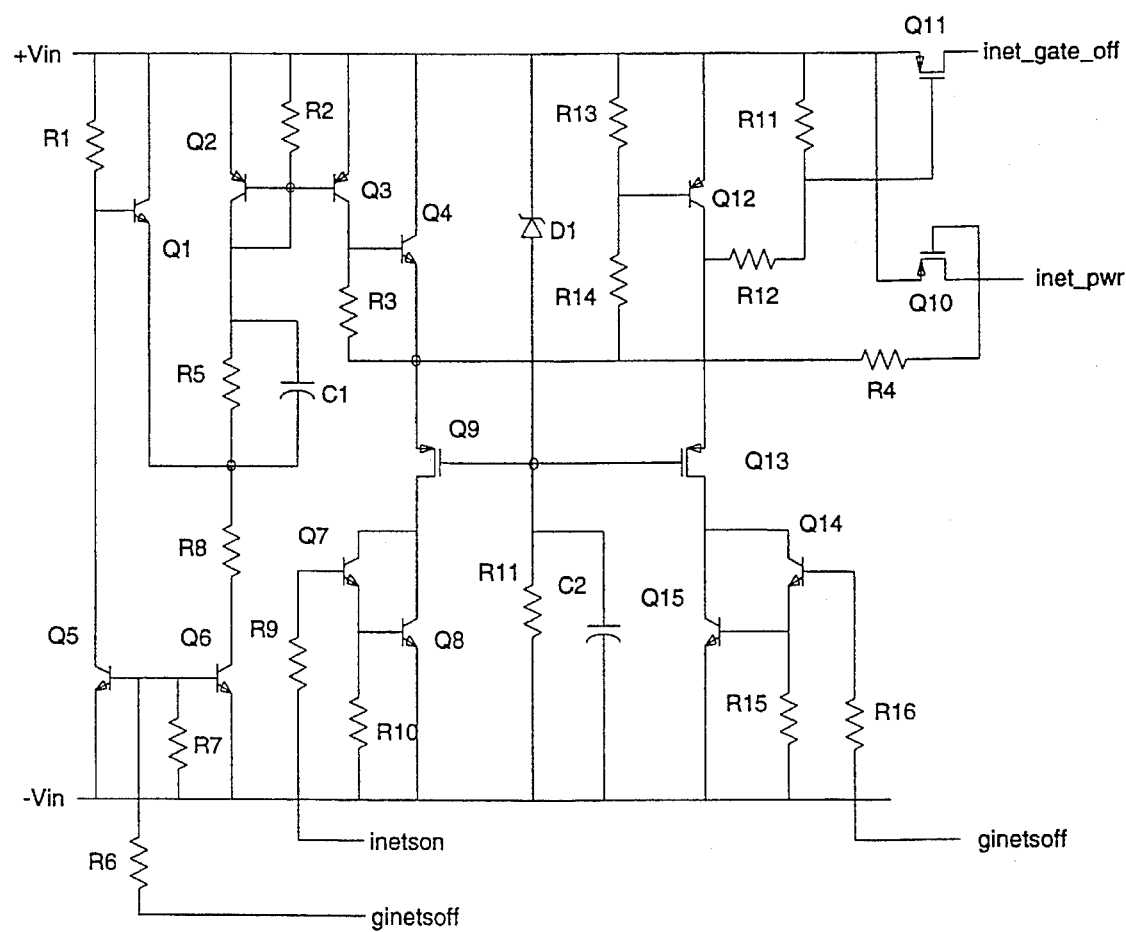
FIG. 15 shows an INET switch and a gate drive sub-circuit.

The function of the gate drive sub-circuit of the INET switch is to supply the drive for the gate distribution network of the CMA capacitive transformer with a limited voltage swing gate signal. The operation of this sub-circuit is very similar to that of the INET switch, however, it operates 180 degrees out of phase with that to the INET switch due to the use of P-channel power MOSFETs to implement the PTDs. The gate drive sub-circuit adds three additional sub-circuits to the INET switch which are the: pull-down drive, pull-down voltage clamp, and an inverter stage. The operation of the additional sub-circuits is design to "piggy back" on the operation of the INET switch circuit. A schematic diagram of the INET switch and the gate drive sub-circuit is shown in FIG. 15.

The P-channel power MOSFET Q11 is used to drive the gate distribution network signal INET_GATE_OFF which forces the PTD power MOSFETs of the CMA capacitive transformer into cutoff. Transistor Q11 drives the INET_GATE_OFF signal when its gate is pulled to a value of $V_{GS}$ below the $+V_{in}$ rail voltage. $V_{GS}$ is equal to a value that will guarantee Q11's minimum on resistance, $r_{DS}$ value (this is typically between 10 V and 12 V). The gate voltage of Q11 is pulled down when the GINETSOFF signal is asserted forward biasing transistors Q14 and Q15 of the pull down sub-circuit. Transistors Q14 and Q15 form a Darlington connected pair that shares a common collector node. The gate-source charge of power MOSFET Q11 passes through the pull-down voltage clamp transistor Q13 and transistors Q14 and Q15 of the pull-down driver. As charge is removed from Q11's gate-source junction capacitor, its voltage and the source voltage of Q13 will approach Q13's gate voltage. When this occurs, Q13 is driven into cutoff, halting any further removal of the gate-source charge from Q11 and to prevent any further change in its gate-to-source voltage. It is important to note that the gate-to-source voltage swing of transistor Q11 is defined by zener diode D1 and power MOSFET Q13. Hence, the gate voltage swing of Q11 is independent of $+V_{in}$.

The gate of the power MOSFET Q11 is pulled to the $+V_{in}$ voltage rail by the PNP transistor Q12 when the INETSON signal is asserted. The base of transistor Q12 is tied to the Q4, Q9 node where it is driven via resistor R14. When the INETSON signal is asserted during the input conduction sequence, the sub-circuit of transistors Q7 and Q8 pulls the gate voltage of Q10 towards the $-V_{in}$ rail until it is clamped at the source terminal of Q9. This drives PNP transistor Q12 into its 'ON' state and pulls the gate terminal of Q11 to the $+V_{in}$ rail, turning Q11 off. Resistor R11 is a large valued resistor and is used to pull the gate voltage of Q11 to a known state during HPSCVCR reset or fault condition. During normal operation R11 has essentially no affect on the operation of the gate drive sub-circuit.

ONET Gate Drive Overview:

Block M11

Figure 16:
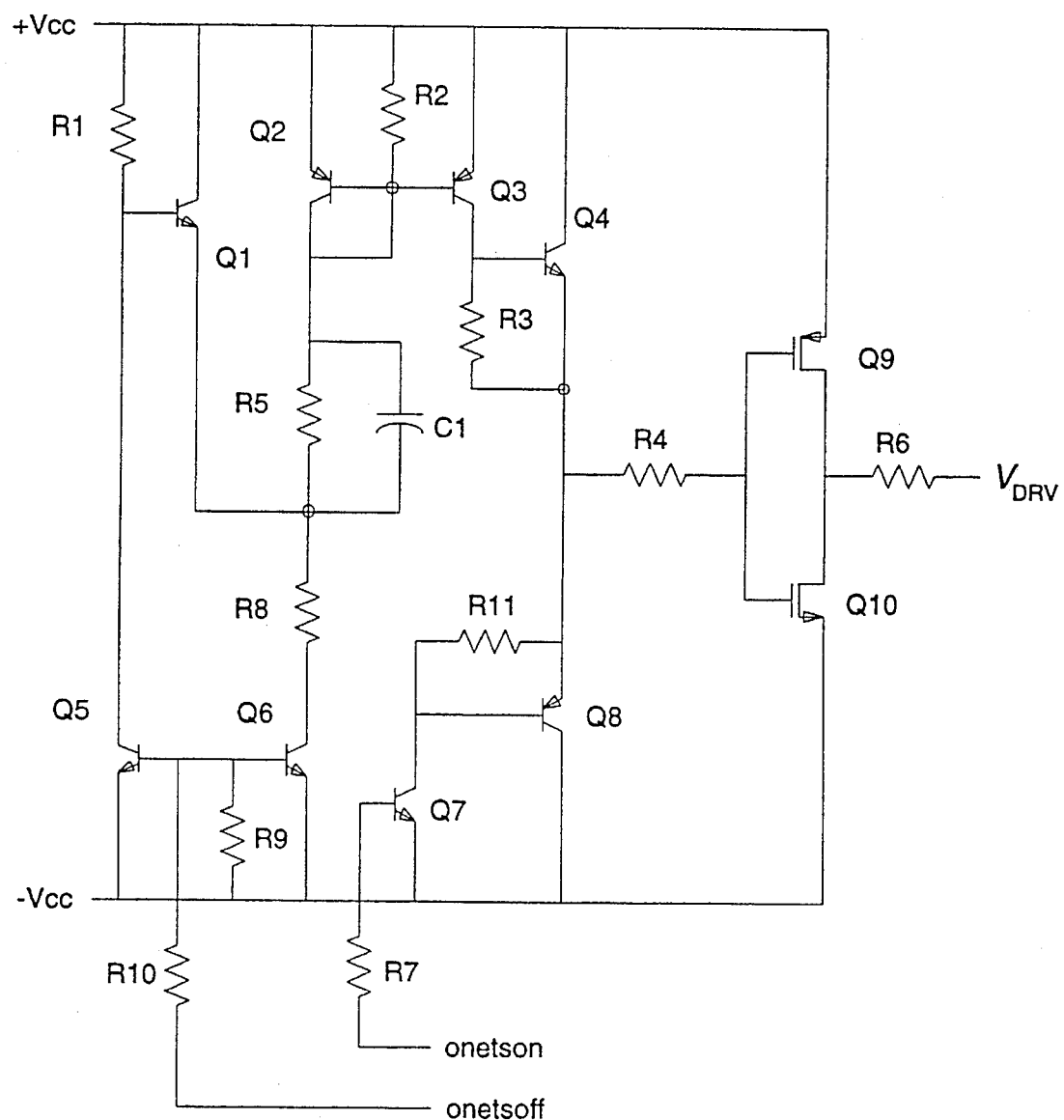
FIG. 16 shows an output network (ONET) gate drive circuit.

The ONET Gate Drive circuit is resident in the output networks in all variants of the HPSCVCR architecture and is designed to drive very large capacitive loads at high switching speeds. Because the ONET gate drive circuit is connected to a purely capacitive it supplies very little DC current to the load while at steady state conditions. To take advantage of this, the ONET gate drive is of a Reverse BiCMOS topology that is designed using "self cutoff" biasing techniques (i.e. once the desired load voltage has been reached, the bipolar transistor drive devices enter into their respective cutoff modes). Therefore, the only significant current flow occurs during switching, otherwise its supply current is essentially zero. The Reverse BiCMOS topology employs a front-end that is implemented using bipolar transistors and an output of N-channel and P-channel power MOSFET devices. The power MOSFETs form the final CMOS inverter drive stage. The bipolar transistor front-end implements the control-interface, pre-drive, and level shift circuit to drive the power MOSFET final stage. The bipolar front end of the INET drive provides the interface to the optocoupler state machine control logic. The high power gain and switching speeds of the small signal bipolar transistors achieves the high levels of transient switching currents needed using fewer stages. The control signals for the ONET Gate Drive are received from the input network resident control circuitry via high speed optocouplers which ensures input to output network isolation. A schematic diagram of the ONET Gate Drive circuit is shown in FIG. 16.

ONET Gate Drive Operation:

The initial starting condition for the ONET gate drive operation description assumes that the ONETSOFF signal had been deasserted at the start of the input transitional dead zone sequence. At the start of the output conduction sequence the ONETSON signal is asserted by the input network resident controller logic.

When signal ONETSON is asserted NPN transistor Q7 is biased ON and pulls the base of PNP transistor Q8 to the output network return potential driving to its ON state. Both transistors Q7 and Q8 are used to pull the gate node of output power MOSFETs Q9 and Q10 to the output network return potential. During this transition, Q8 will conduct the vastly greater amount of the initial gate switching current while transistor Q7 primary function is to supply base current drive to Q8. The ability of the PNP transistor Q8 to pull the gate node of the MOSFETs to output return potential will diminish as the gate node voltage, which is approximately equals QS's emitter voltage, approaches it base voltage and Q8 enters into cutoff. At this point transistor Q7 will begin to conduct the majority of Q9 and Q10's gate switching current via resistor R11 which limits the amount of current conducted (R11 also provides a base-emitter discharge path for transistor Q8). Once the gate voltage transition has been completed, the gate switching current goes to zero and transistor Q8 has fully entered into its cutoff state. At this point the only DC current flow in the ONET Gate Drive circuit is Q7's base current which remain constant during the output conduction sequence. With its gate voltage pulled to output network return potential the N-channel power MOSFET Q10 is in its cutoff state while the P-channel MOSFET Q9 is fully "ON". While in this state, Q9 will pull the output signal $V_{DRV}$ to the value of its positive voltage supply rail.

The high-to-low transition of the ONET Gate Drive circuit output signal, $V_{DRV}$, begins with the deassertion of the ONETSON signal. The deassertion of signal ONETSON places transistors Q7 and Q8 into their respective cutoff states (note that Q8 is already in cut-off). Signal ONETSON deassertion occurs during at the start of the output transitional dead zone sequence prior to the assertion of the ONETSOFF signal. The assertion of the ONETSOFF signal, forward biases the NPN transistor pair of Q5 and Q6. Transistor Q5 is used to pull the base node of Q1 down to output network return potential forcing Q1 into cutoff. Transistor Q6 is used to pull the collector-base node of Q2 to return potential via a resistor capacitor network of R8, R5 and C1, driving PNP transistors Q2 and Q3 of the current mirror into their conductive states. The collector of Q3 is the output of the current mirror and provides base current drive to NPN transistor Q4. Transistor Q4 is configured as an emitter follower which supplies switching current to the gate node of power MOSFETs Q9 and Q10 via resistor R4. The gate node of Q9 and Q10 is capacitive so that as the gate node voltage increases the emitter voltage of Q4 also increases eventually forcing Q4 into its cutoff state. At this point the gate switching current is zero. The P-channel MOSFET Q9 is in its cutoff state with the gate node voltage pulled to positive supply rail. The N-channel power MOSFET Q10 is ON pulls the output, $V_{DRV}$, to output return potential.

It is noted that the resistor capacitor network servers a dual purpose during the switching operation. During the initial portion of the transition, capacitor C1 provide a bypass around resistor R5, so that the current is limited only by resistor R8. This higher level of current provides extra drive current during the initial portion of the switching operation. Once, capacitor C 1 has been charged, the reference current for the current mirror is now limited by the series value of R8 and R5. The advantage of this resistor capacitor network is that it allows for a greater amount of drive current to be provided during the early portion of the switching operation, and then limits the current to very low values once the transition has been made.

The assertion and deassertion of the ONETSON and ONETSOFF signals that control the operation of the ONET Gate Drive circuit are generated by the input network resident state machine. Because the state machine logic is resident in the input network, direct drive of these signals is not possible. Control of these signals is achieved using high speed optocouplers which provides the input to output network isolation required. An example of this component is the Hewlett Packard HCPL-2232 dual logic gate optocoupler which couples switching information to the ONET Gate Drive circuit.

Output Voltage Sensor:

Block M13

This covers a large number of topics. In general, these circuits monitors output network performance and status and transfers this information back to the input network resident control logic and circuits. The factors monitored are:

1. Low Output voltage level

2. Very Low output voltage level (short circuit condition)

3. Output device temperature

FIG. 17 is a general schematic of a typical output network sense circuit and optocoupler LED driver. The monitor circuit is designed such that the LED will remain OFF for the greater percentage of the time in an effort to reduce the power overhead. The response times of the voltage detector is critical in the operation of the HPSCVCR architecture based design.

Figure 17A:
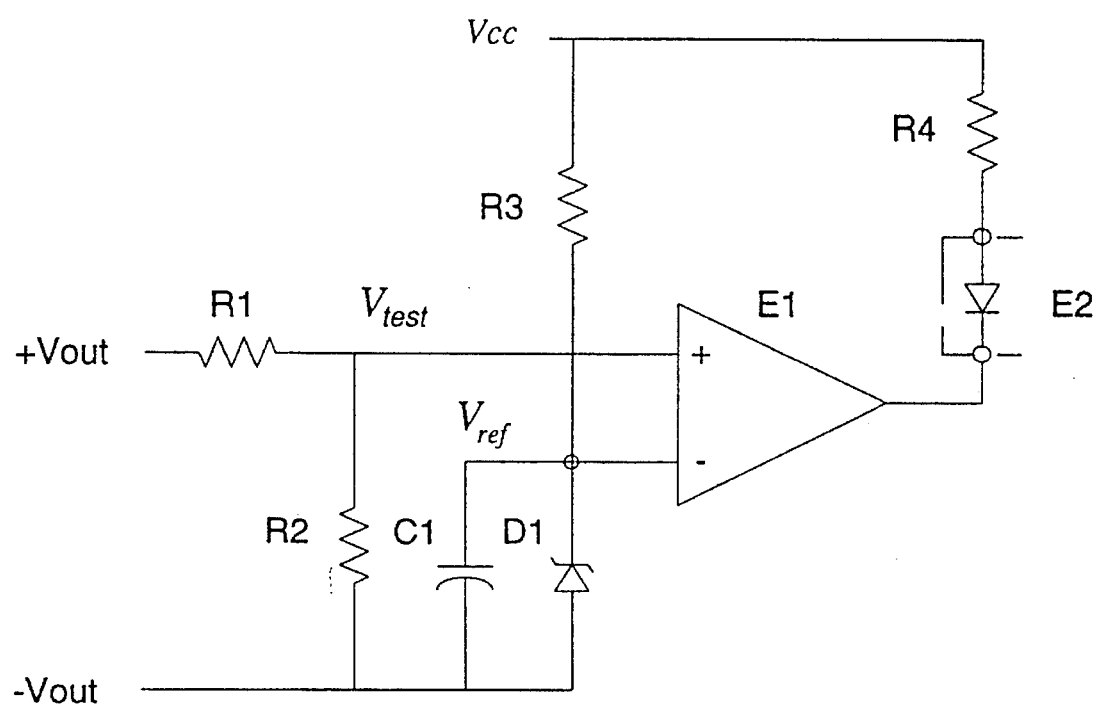
FIG. 17a shows a low output voltage detector. The ratio of R1 and R2 determines the voltage value that triggers the voltage detector. For over voltage detection, the reference voltage is connected to the positive terminal and the input test voltage is applied to the negative terminal.

Output Voltage Sensor Theory:

The output voltage regulation of HPSCVCR based converters is determined by its ability to accurately regulate the amount of charge that is transferred to the output capacitor under various loading conditions. For these converters, the amount of charge that is transferred to the output capacitor is proportional to the duration of the output conduction sequence. When the output voltage has dropped below its nominal value, the output conduction sequence is started and will continue until the output voltage has reached a value equal to or greater than its nominal value. Once, the output voltage has reached this value the output conduction sequence is ended. For HPSCVCR based converter designs a fast "loop" response time of the sensor, control logic, and capacitive transformer, is required to achieve acceptable output voltage regulation. Hence, a key parameter is the response time and bandwidth of the output voltage sensor which consist of a high speed comparitor and optocoupler devices as shown in FIG. 17a.

Output Voltage Sensor Theory—Excessive Current Detection

The detection of excessive or short circuit current conditions would normally require the implementation of a low voltage detector in addition to the existing voltage sensor circuit that is already present. A Pulse Count Load Analysis (PCLA) which is performed on the output voltage sensor signal, VOUT_OK can determine the loading condition present at the converters output and does not require the additional comparator circuit.

The basic operation of the sensor circuit deasserts the VOUT_OK status signal when the output voltage drops below its nominal value and asserts it when the output voltage is equal to or greater than its nominal value. The PCLA technique measures the amount of time that the VOUT_OK signal is asserted and compares it to one of four basic conditions that would be encounter during the operation of the converter.

1. NO LOAD OPERATION: under this condition, a very light or no load is connected to the converter's output and as a result the output voltage remains above its nominal for very long periods of time. Hence, the signal VOUT_OK remains asserted for long periods of time.

2. MODERATELY LOADED OPERATION: under these conditions a moderate load is connected to the converter's output which causes the output voltage drop below the its nominal voltage. The result is that the VOUT_OK signal switches in what appears as a pesudo-ramdom pattern. The amount of time spent in either state is dependent and proportional to the loading conditions.

3. FULLY LOADED OPERATION: when operating at or near maximum output load current, the output voltage will vary between the specified minimum and maximum values, at a specified rate (i.e. the ripple voltage and ripple frequency). The amount of time that the output voltage is above its nominal output voltage is equal to the amount of time that it is below the nominal value. The cycling of the output voltage is reflected in the VOUT_OK signal.

4. EXCESSIVE LOAD OPERATION: when the maximum output load current of the converter is exceeded the average output voltage of the converter is reduced. The excessive load current also affects the ripple voltage present on the output voltage causing a shift in the amount of time that the output voltage is above and below the nominal output value. At excessive output current levels the output voltage will remain below the nominal voltage value for longer periods of time. Under extreme or short circuit conditions, the output voltage is never above its nominal value. Hence, the VOUT_OK remains deasserted for the period of time that the short circuit is in place.

Figure 17B:
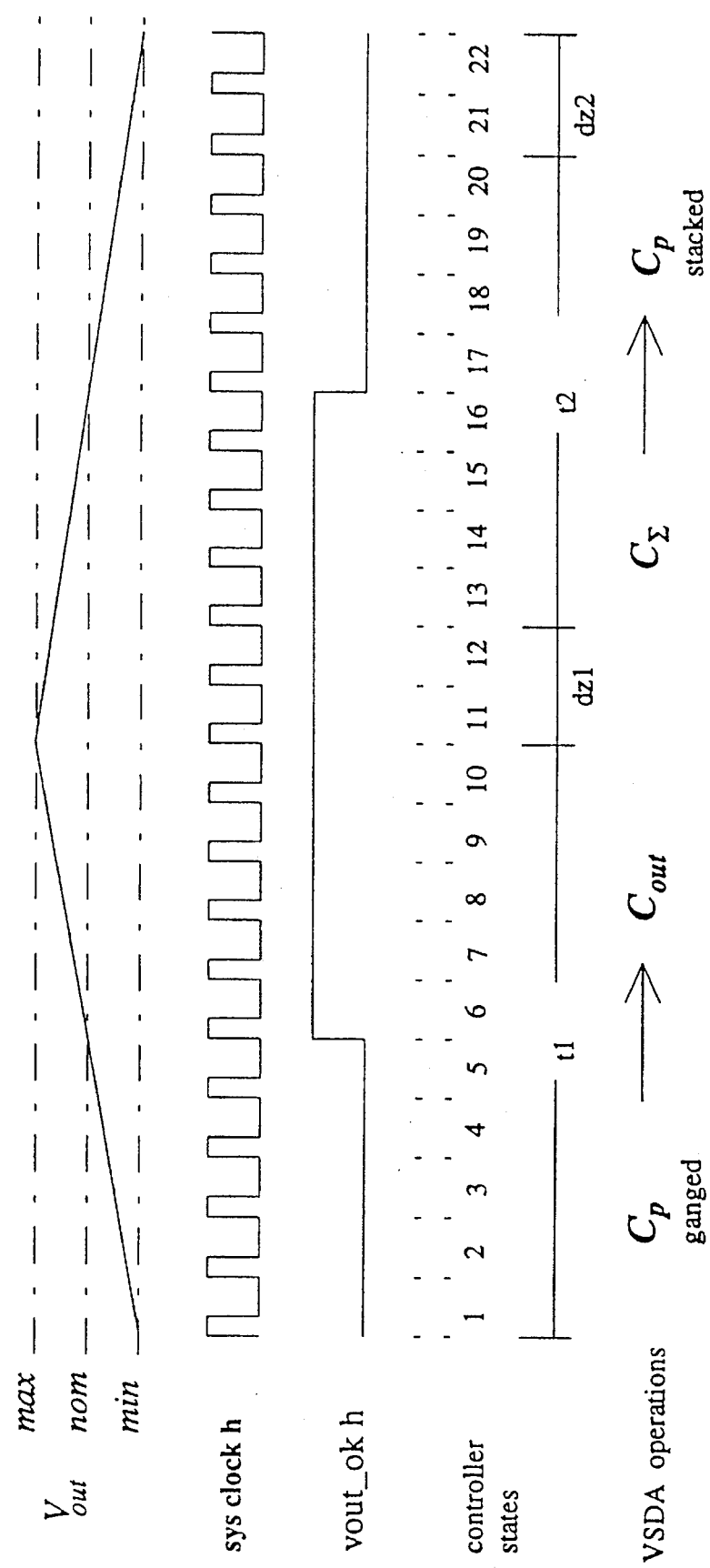
FIG. 17b shows the relationship of the VOUT_OK signal to the output ripple voltage and the system clock. The ripple voltage period is has a total of 22 system clock cycles, and the amount of time the output voltage is equal or greater than the nominal output voltage value is approximately 11 clock cycles, FIG. 18. shows an ONET cold start gate clamp circuit.

The Pulse Count Load Analysis (PCLA) protocol detects excessive and short circuit load conditions in the output network by monitoring the transitions of the VOUT_OK signal of the output voltage sensor. By simple measurement the VOUT_OK signal's pulse width, the loading condition that is present on the output of the converter can be determined. Under full load conditions the maximum ripple voltage will be present on the output voltage and centered about the nominal output value. If the comparator response is fast enough, its output signal will be accurately reflect the percentage of the time the output voltage is above and below the nominal output voltage value. The amount of time that the output voltage value is greater than the nominal output voltage is approximately equal to half the period of the ripple voltage frequency. Hence, by measuring the pulse width of the VOUT_OK signal and comparing to the half period value of the output ripple voltage, the amount of output loading can be determined. This will be in terms of the maximum output current conditions. The PCLA measurement of the ripple voltage at full loading conditions is shown in FIG. 17b.

Using a simple ratio calculation, the output current can be estimated based on the 'sample' count compared to the known full load current count as given below:

EQ 21:

$$I_{Output} = I_{Full} \frac{N_{Sample}}{N_{Full}}$$

In practice, the deasserted time of the VOUT_OK signal is measured due to the ease of the actual circuit implementation. The measurement of the VOUT_OK signal begins at the start of the output conduction sequence and terminates with either the assertion of the VOUT_OK signal or the end of the output conduction sequence.

Output Voltage Sensor Operation:

Resistors R1 and R2 performs a voltage divider which generates the $V_{Test}$ voltage which is proportional to the output voltage $V_{OUT}$ and is the input to the positive terminal of the comparitor. The reference voltage $V_{REF}$ is generated by reference zener diode D1 and resistor R3. Resistor R3 is connected to the output network supply voltage and is used to establish the bias current for the zener D1. The reference voltage $V_{REF}$ is developed across the zener diode D1 and is the input to the negative terminal of the comparitor. Capacitor C1 provides a bypass for any noise voltage that may develop across the zener and prevents it from entering the negative input of the comparitor. The output of the comparitor drives the LED input of the optocoupler which transmits the status of the output voltage via the signal VOUT_OK to the control logic and circuit.

In operation, when the output voltage of the converter is at or above its nominal value the measure voltage, $V_{TEST}$, will be equal or greater than $V_{REF}$ which forces the output of the comparitor high. This drives the LED input of the optocoupler off which asserts the VOUT_OK signal to the control logic. When the output voltage of the converter is below its nominal value, the measure voltage, $V_{TEST}$, is proportionally below the reference voltage, $V_{REF}$ which forces the comparitor output low. The low output of the comparitor drives the LED into its on state deasserting the VOUT_OK.

ONET Cold Start Circuit Overview: M10 (ONET clamp)

Upon the application of power all DC-to-DC voltage converter designs based on the HPSCVCR architecture must establish internal operational conditions. This is done during the execution of the Cold-Start Power-Up sequence where the internal control and driver circuit supply voltages are established. The Cold-Start Power-Up sequence is the orderly establishment of critical internal systems to ensure reliability, input-to-output isolation integrity, and overall system operation. As part of this orderly procedure it is important that certain systems and or functions remain "OFF" until other functions have first been established. This is the case for the output network MOSFET circuits of the capacitive transformers. During power-up, the segment capacitors of the capacitive transformer are charged in order to enable the symbiotic power circuits. However, the MOSFETs in the output network must remain in their OFF state during this time to prevent or inadvertent conduction conditions which would short circuit to the capacitive transformer's input network.

There are two cases where the capacitive transformer's output power MOSFETs can enter into an unintended conductive state, these are:

1. As the capacitive transformer is being charged, the MOSFET'S junction capacitor $C_{dg}$ can couple energy into the gate-source junction and forward bias the power MOSFET device. This condition would last until the output supply voltage has been established and the ONET Gate Drive has forced the MOSFET devices of the output network into cutoff.

2. As the output supply voltage is being established the operation of the ONET Gate Drive circuit is undetermined and could inadvertently forward bias the power MOSFET devices for a short period of time.

Figure 18:
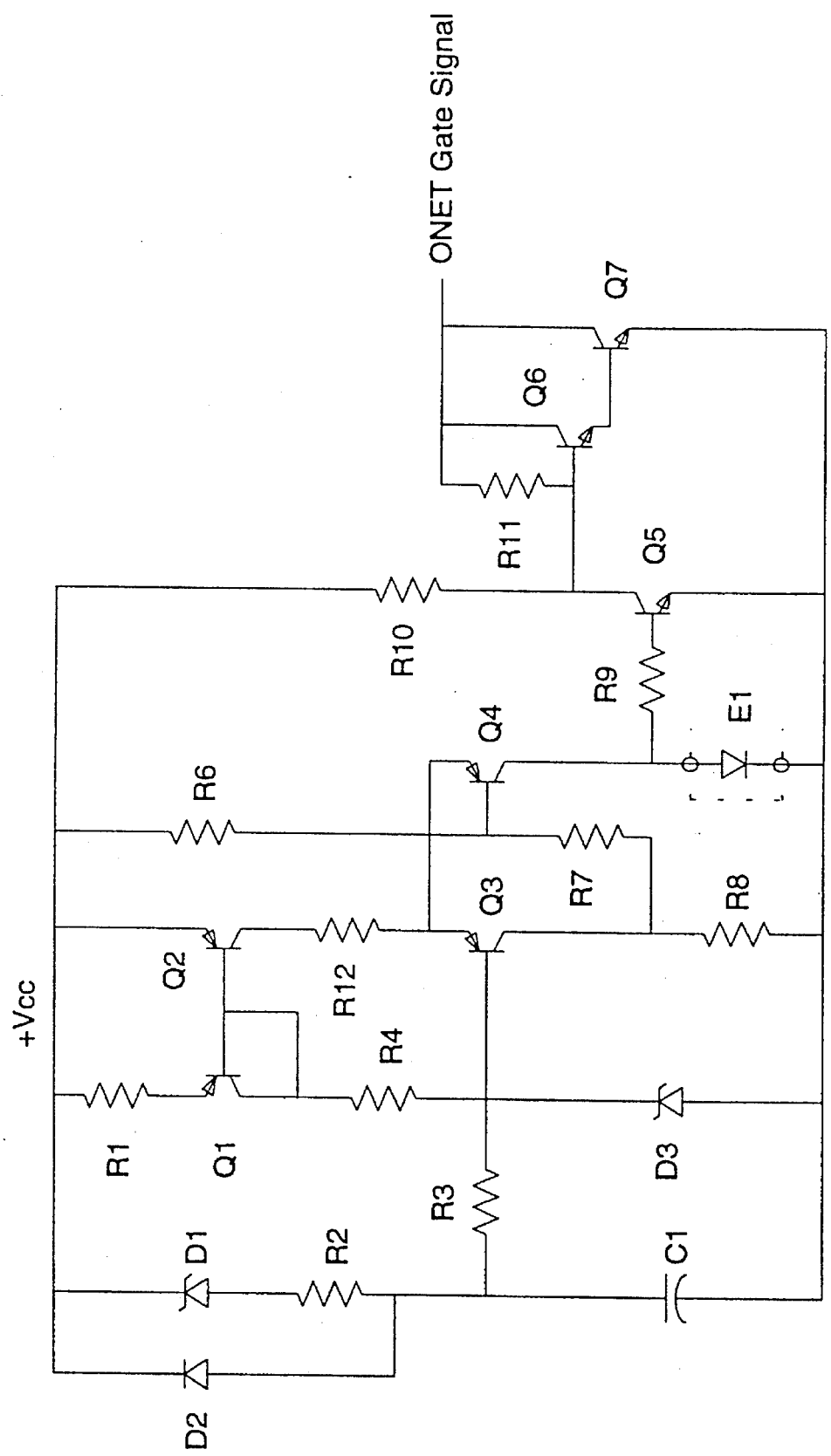

To prevent this, a cold start ONET circuit clamp is used to hold the gate node voltage of the power MOSFETs of the capacitive transformer's output network at output return potential. This prevents the power MOSFETs from entering into their conductive state during the early phases of the power-up sequence. Once the output network supply voltage has been established the gate voltage clamp is removed and normal operation can begin. The schematic diagram for the basic circuit is shown in FIG. 18. In this implementation, bipolar devices are used because of their low input voltage requirements as opposed to the threshold voltage of the available discrete MOSFET devices.

ONET Cold Start Circuit Operation:

Block M10

A sub-circuit of the Darlington connected transistor pair of Q6, Q7, and resistor R11 is designed to be semi-independent of the rest of the ONET cold start circuit. This allows the sub-circuit to better handle the coupled charge case mentioned above. As the ONET Gate Signal voltage increases due to the coupling of charge from the 'drain-to-gate' capacitance $C_{dg}$, to the 'gate-to-source' capacitance $C_{gs}$, transistors Q6 and Q7 will become forward biased when the gate-to-source voltage is about $2V_{BE}$.

The ONET Gate Signal voltage will be clamped at the $2V_{BE}$ value which is usually less than the threshold voltage of the power MOSFET devices available today. Additionally, as the output network supply voltage becomes established additional base current drive is supplied to transistor Q6 via resistor R10 which helps to provide a stronger pull down clamp. The clamping action of Q6 and Q7 is removed when transistor Q5 becomes forward biased and shunts the base drive current from Q6 forcing the Darlington sub-circuit into cutoff.

The sub-circuit of transistors Q1–Q5 is designed to release the ONET Gate Signal once the output network supply voltage as been established and transmit that status back to the input network resident state machine controller. This portion of the ONET Cold Start circuit is based on the Schmitt trigger which performs the voltage detection and a RC timing circuit. The RC timing circuit ensures that the output network supply voltage as been established for a minimum period of time before full operation of the DC-to-DC voltage converter can begin. The Schmitt trigger circuit has a dual role; 1) it is used to detect a predetermined capacitor voltage representative of the minimum time required, and 2) to transmit the output network supply voltage ready status back to the input network resident state machine controller via an optoisolator.

RC Timing Circuit

The RC timing circuit used in the ONET Cold Start circuit is modified with the addition of zener diode D1. The zener diode D1 is used to ensure that a minimum value of the output network supply voltage value is maintained during the power-up phase of the DC-to-DC voltage converter. If the supply voltage is below this value, the charging current for capacitor C1 essentially goes to zero. When the supply voltage is above this value, resistor R2 sets the maximum value for this current and hence, minimum time for the capacitor voltage to reach its predetermined value.

Schmitt Trigger Circuit

The Schmitt trigger circuit is formed by PNP transistors Q3 and Q4, and biased by a Collins current mirror implemented using PNP transistors Q1 and Q2. The Collins current mirror is modified with the addition of zener diode D3 placed in its reference current circuit. Zener diode D3, ensures that a minimum value of the output network supply voltage is maintained during the power-up phase of the DC-to-DC voltage converter. If the supply voltage is below this value, the bias current for Schmitt trigger circuit will essentially goes to zero. When the supply voltage is above this value, resistor R4 sets the maximum value for the bias current.

The base of transistor Q3 is the input of the Schmitt trigger and is connected to the R2, C1 node. When the capacitor voltage is below the value of approximately $V_{cc} - (I_{C2} \cdot R12 + V_{BE})$, transistor Q3 is forward biased which forces Q4 into cutoff. With Q4 in cutoff, there is no current flow through the LED of the optoisolator which indicates a "NOT OKAY" condition to the state machine controller logic, and maintains the clamp function on the ONET Gate Signal. Once the capacitor voltage is either equal to or greater than the value of $V_{cc} - (I_{C2} \cdot R12 + V_{BE})$, transistor Q3 goes into cutoff and Q4 becomes forward biased. When this occurs, current flow through the LED of the optoisolator is established which signals an "OUTPUT OKAY" condition to the input network state machine logic. The collector of Q4 also drives the base circuit of NPN transistor Q5. When transistor Q5 becomes active, it pulls the base node of Q6 to near output return potential inhibiting the clamp function of the ONET Gate Signal.

It is noted that the current mirror design in use today has its input current (usually call the reference current, $I_{REF}$) that flows into the 'diode connected' transistor (the base of the transistor is directly connected to the collector). This transistor is used to set the operating point of the output transistor. When identical transistors are used, and the current gain, $h_{FE}$, of the transistors is large enough then $I_{out} \approx I_{REF}$. In other current mirror designs the relationship of the input and output currents can be adjusted so that $I_{out} < I_{REF}$. However, in the Collins current mirror a relationship of $I_{out} > I_{REF}$ is achieved. This is accomplished by inclusion of a resistor in the base circuit of the diode connected transistor.

Symbiotic Power Circuits Overview:

Blocks: M7 and M12

Figure 19:
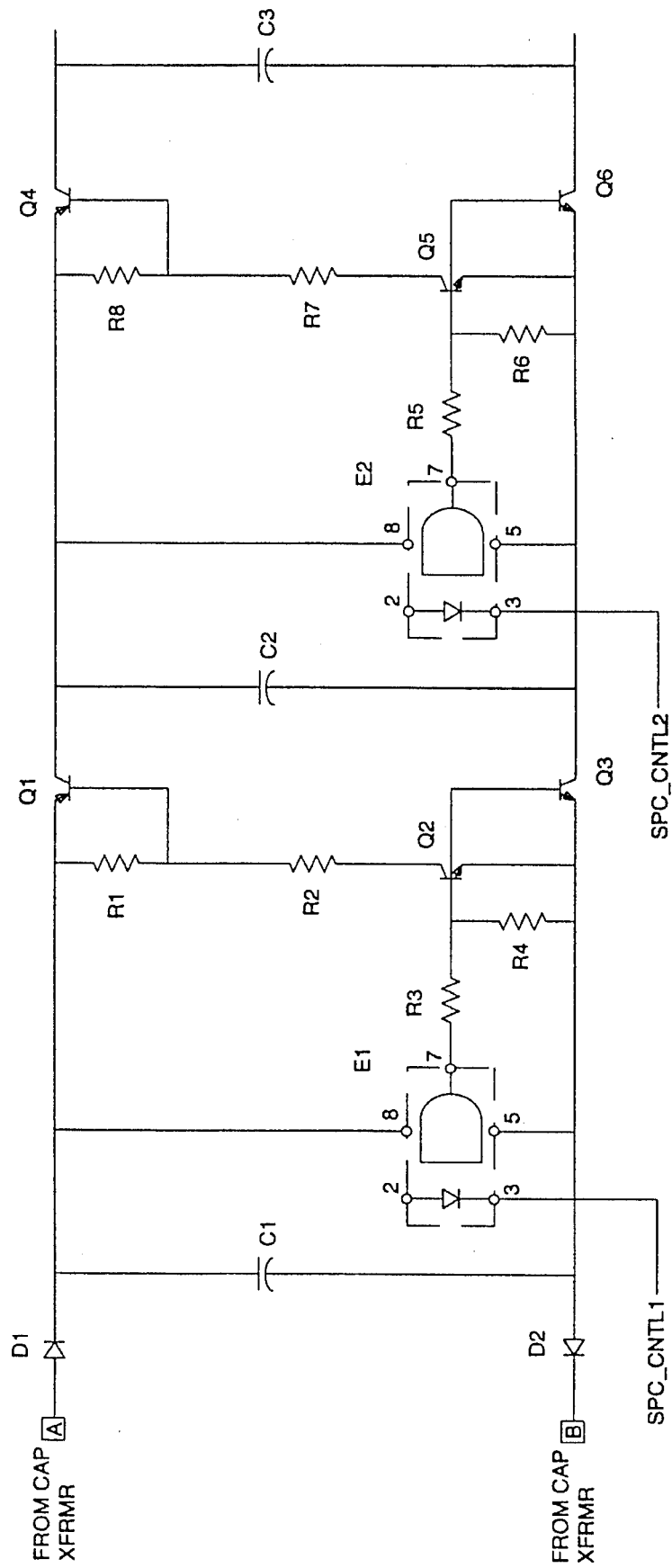
FIG. 19 shows two stage isolated symbiotic power circuit.

The symbiotic power circuits of the HPSCVCR architecture supplies internal power for use by the input and output networks gate drives, monitoring, and control logic circuits. The symbiotic power circuits operate in conjunction with the step-down capacitive transformer circuits. The symbiotic power circuits "piggy-backs" its charging cycle with that of the step-down capacitive transformer where it can take advantage of the transformer's step-down ratio $N_{SD}$. Once the charging cycle has completed, the acquired charge is transferred to the appropriate voltage regulator circuits for the input and output networks under the control of the input network resident state machine. FIG. 19 shows a schematic diagram for a two stage isolated symbiotic power circuit which would be used for the ONET and INET Symbiotic Power circuits. The two stage symbiotic power circuits provides an additional level of isolation which eliminats any ground loop current between input and output networks during their operation.

Symbiotic Power and INET Circuit Theory

The symbiotic power circuit or SPC, is designed to be operated in conjunction with the step-down version of the capacitive transformer. This allows the SPC to take advantage of the step-down ratio, $N_{SD}$, of the transformer and provide internal power at greater efficiency. The preferred SPC topology is a two-stage configuration that operate such that both stages are never on (i.e. transferring charge) at the same time. This is to prevent the creation of ground loop currents between the input and output networks resident circuits. The operation of the SPC is coordinated with that of the step-down capacitive transformer which are both under the direct control to the state machine.

The symbiotic power circuit operates by stealing charge from the step-down capacitive transformer during its input conduction sequence. This charge is stored in the SPC input capacitors which is connected across a number of segment capacitors to obtain the desired input voltage required for it to achieve its final output voltage value. Charge from the input capacitor is first transferred to a interim capacitor during the output conduction sequence by the first stage of the SPC. The following input conduction sequence, charge is transferred from the interim capacitor to the SPC output capacitor. For the most part, the operation of the SPC's will be transparent to the overall operation of the HPSCVCR based converter designs. However, under light or no load conditions an SPC refresh sequence is required to maintain the internal supply voltages. This is due to the decrease in the amount of charge required by the output capacitor and under these conditions results in the infrequent and sporadic number of input and output conduction sequences. The SPC refresh sequence is initiated when an idle time limit, which is a design specific parameter, has been exceeded. An SPC refresh sequence consist of an input conduction sequence which is followed by an output conduction sequence, where no charge is transferred to the output capacitor and external load.

Symbiotic Power Circuit Operation

The input terminals of the SPC are connected across any number of segment capacitors on the capacitive transformer to obtain the desired input voltage. During the input conduction sequence, capacitor C1 will be charged to a value of $M \cdot V_P(max)$, where M is the number of segment capacitors that the SPC input capacitor is connected across. Capacitor C1 receives charge when its voltage is less than the value of $M \cdot V_P(max) - 2V_D$ allowing diodes D1 and D2 to be forward biased. Diodes D1 and D2 block the reverse current flow from the SPC to the capacitive transformer during the output conduction sequence.

At the start of the output conduction sequence the state machine asserts the SPC_CNTL1 signal which drives the LED input of the optocoupler E1 of the SPC first stage. When the SPC_CNTL1 signal is asserted the output of the optocoupler is driven to its high output voltage which drives the bases of NPN transistors Q2 and Q3 forcing these devices into their saturation state. Transistor Q2 is used to invert the output of the optocoupler and drive the base of PNP transistor Q1. Transistors Q1 and Q3 are used to conduct charge from the input capacitor C1 to interim capacitor C2. The SPC_CNTL1 signal is deasserted at the end of the output conduction sequence to force the conduction path transistors of Q1 and Q3 into their respective cutoff states. To aid the turn-off response times of Q1–Q3, resistors R1 and R4 provide a discharge path for the base-emitter junctions of these devices. At the start of the following input conduction sequence the state machine asserts the SPC_CNTL2 signal which drives the LED input of the optocoupler, E2, of the SPC's second stage. When the SPC_CNTL2 signal is asserted the output of the optocoupler is driven to its high output voltage which drives the bases of NPN transistors Q5 and Q6 forcing these devices into their saturation state. Transistor Q5 is used to invert the output of the optocoupler and drive the base of PNP transistor Q4. Transistors Q4 and Q6 are used to conduct charge from the interim capacitor C2 to output capacitor C3. The SPC_CNTL2 signal is deasserted at the end of the input conduction sequence to force the conduction path transistors of Q4 and Q6 into their respective cutoff states. To aid the turn-off response times of Q4–Q6, resistors R8 and R6 provide a discharge path for the base-emitter junctions of these devices.

Control Logic and Circuits:

Block M6

All members of the HPSCVCR architecture described in this disclosure implement a state machine based controller. The state machine controller design is used due to the requirements set by the tight timing needed to obtain the HPSCVCR architecture's high performance and output power levels. Implementation of the state machine is typically one or more micro-sequencers which controls all primary functions of these DC-to-DC voltage converters. This also includes the generation of the system level timing for the capacitive transformers. However, the actual implementation of the state machine is not specified since it is both technology and application dependent. This also the case for the micro-code, programmable or hardwired, generated for the particular state machine implementation. Hence, the focus in this section is on the algorithms and protocols to be implemented in the state machines of all HPSCVCR architecture variants. As with other circuits described in this disclosure, the hardware realization of the state machine should be of a low power design to minimize the internal overhead power budget.

HPSCVCR PROTOCOLS OVERVIEW

As stated above, the actual micro-code used in HPSCVCR designs is not specified by this document since it is technology and design specific. However what is specified by this document are the various protocols that define the HPSCVCR architecture's operation under various conditions. The micro-code generated for a particular design must implement a minimum set of these protocols. The flowchart representation of the algorithms used to implement the protocols described in the following section are given in FIGS. 20–24b. These protocols are:
- System Charge Transfer Protocol
- SPC Internal Power Generation
- System Cold Start
- Delayed Excess Charge Transfer (DECT)
- Failure and Fault Detection and Handling
- Over Temperature
- Short Circuit
- Isolation Breach

System Charge Transfer Protocol

The primary protocol for all variants of the HPSCVCR architecture is the System Charge Transfer Protocol which defines the charge transfer operation for the converters. It is the micro-code implementation of this protocol that determines the maximum delivered output power, output voltage regulation, and the overall efficiency of a particular converter design. Those primary functions that are the responsibility of the System Charge Transfer Protocol are the:
- Input to output network charge transfer
- Output voltage regulation, and
- Maintaining input to output network isolation.

The System Charge Transfer Protocol is comprised of four sequences which controls the operation of the capacitive transformers for the VSDA, VSUA, ISUDA, and ISDUA variants of the HPSCVCR architecture. For all variants these sequences are the:
1. Input conduction sequence
2. Input transitional dead zone sequence
3. Output conduction sequence
4. Output transitional dead zone sequence The execution order of the sequences is critical in achieving the input to output network electrical isolation of the capacitive transformer and the fast response time of the converter to any output load change. The isolation between the input and output networks of the capacitive transformer is achieved through circuit design and strict ordering of these sequences. The input or output conduction sequences are always followed by their respective input or output transitional dead zone sequence. As described earlier, the transitional dead zone sequences implement a "break-before-make" function between the input and output conduction sequences. This ensures that the electronic configuration switches have enough time to reach their nonconductive state before the next conduction sequence is started.

The converters response time performance (i.e. the time required by the converter to respond to a change in the output load) is decreased with the preferred sequence execution order given below. In normal operation the state machine enters and remains in the input transitional dead zone sequence after the input conduction sequence completion if the VOUT_OK status signal is asserted. Hence, upon the deassertion of the VOUT_OK status signal, the state machine enters directly into the output conduction sequence which allows the immediate transfer of charge to the output capacitor and external load. The net affect is the reduction in the amount of time for a HPSCVCR based voltage converter to respond to any change in the output load. A key factor of the System Charge Transfer Protocol fast response time is that the segment capacitors are fully charged from the input DC voltage source (in the case of the ISUDA variant the DC voltage source is the summation capacitor, $C_\Sigma$) after every output conduction sequence. This allows the System Charge Transfer Protocol to bypass the input conduction sequence and enter directly into the output conduction sequence with the segment capacitors being fully charged.

Figure 20:
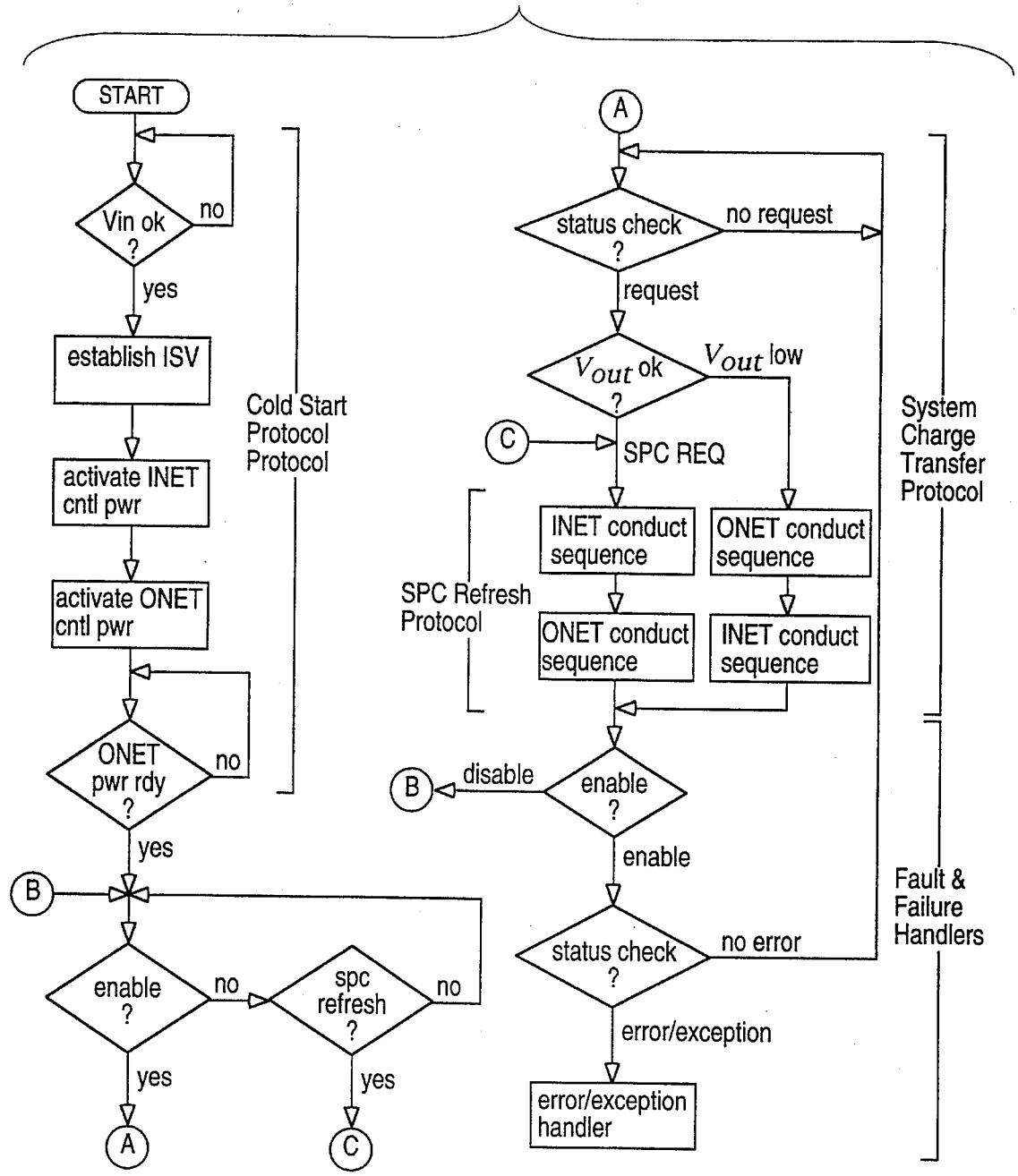
FIG. 20 shows a HPSCVCR system flowchart which implement the four base protocols for the VSDA, VSUA, ISUDA and ISDUA variants of the HPSCVCR architecture.
Figure 21:
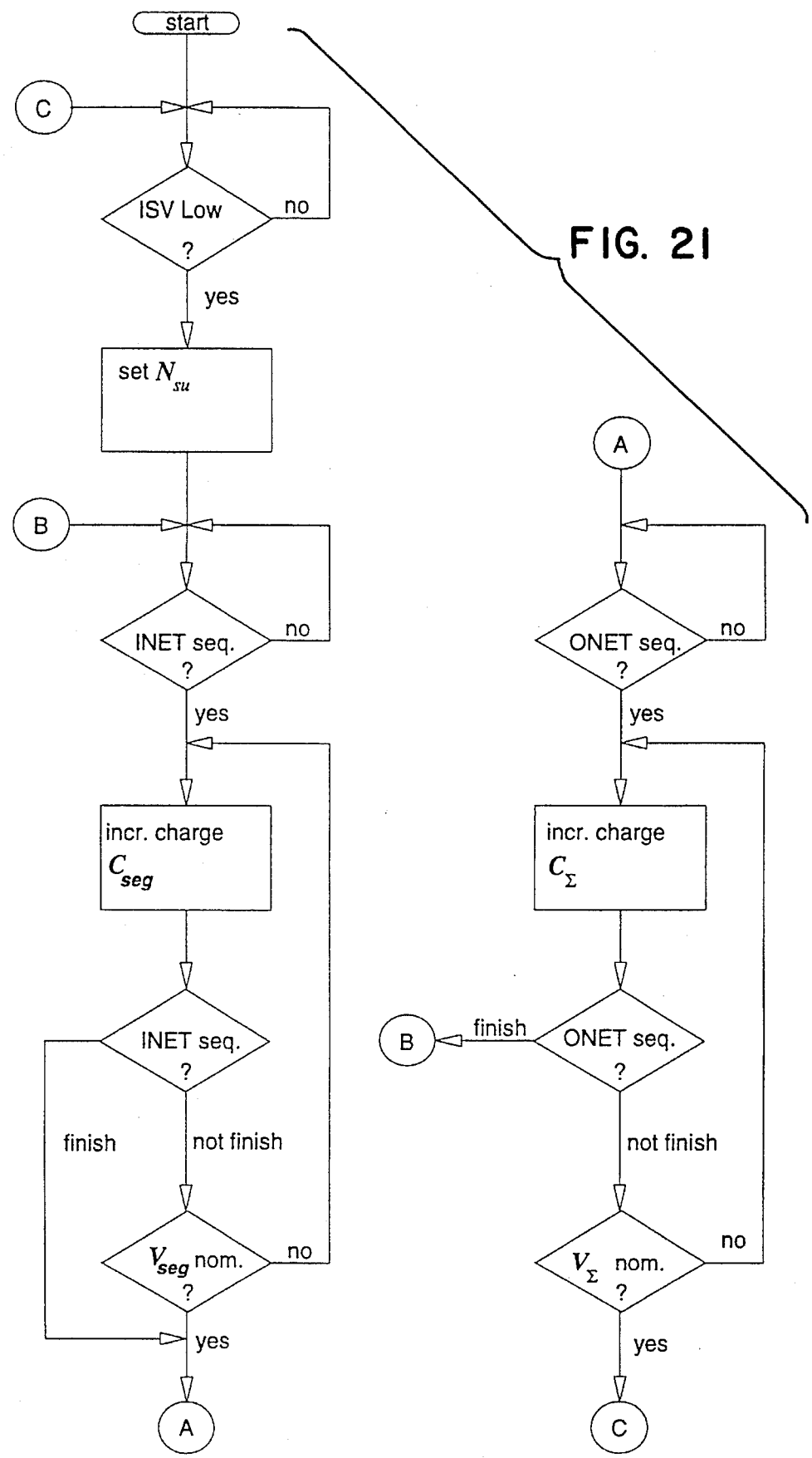
FIG. 21 shows a delayed excess charge transfer protocol of ISUDA variant of the HPSCVCR architecture.
Figure 22A:
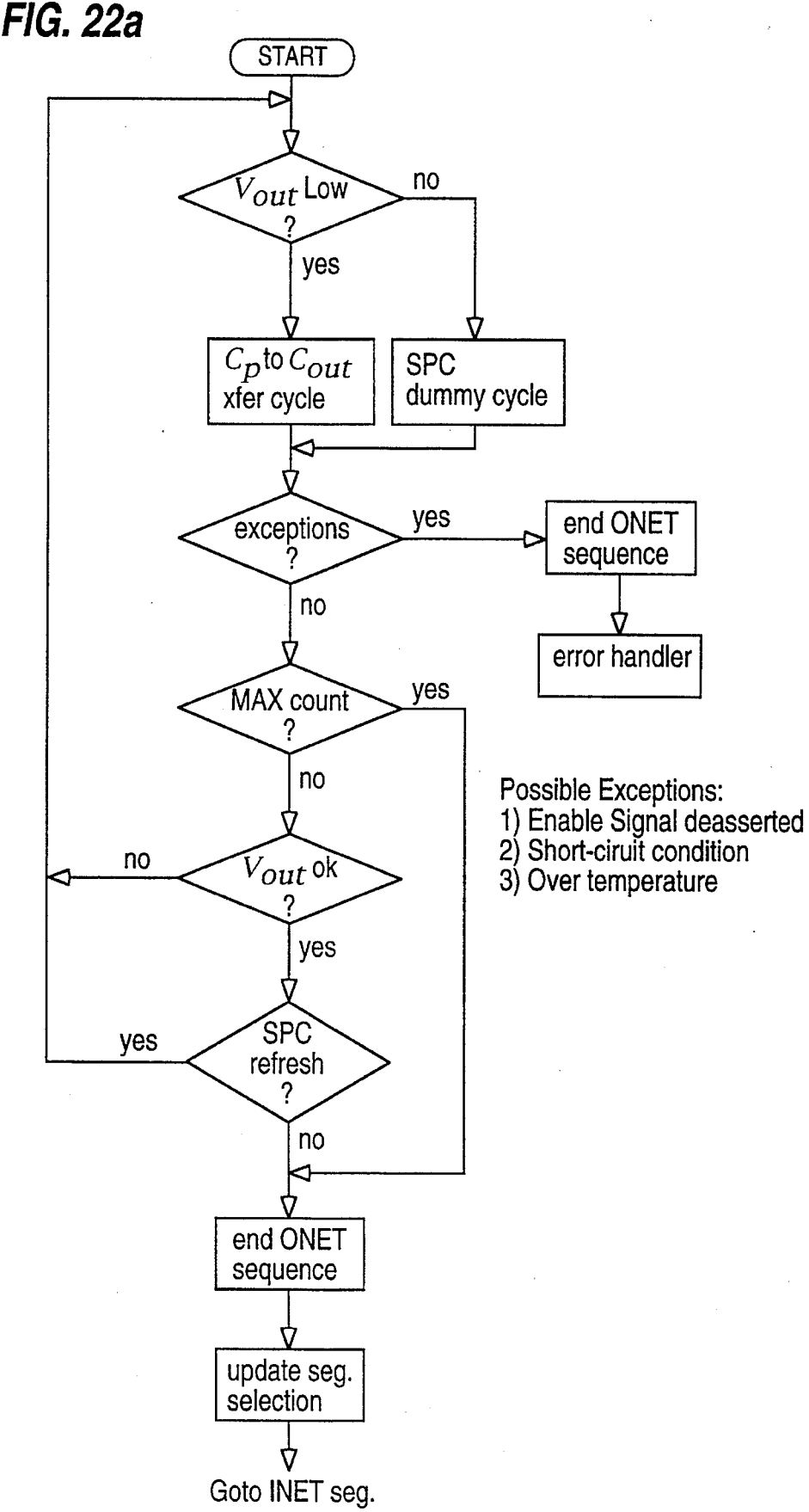
FIG. 22a shows a detailed output conduction sequence VSDA section.
Figure 22B:
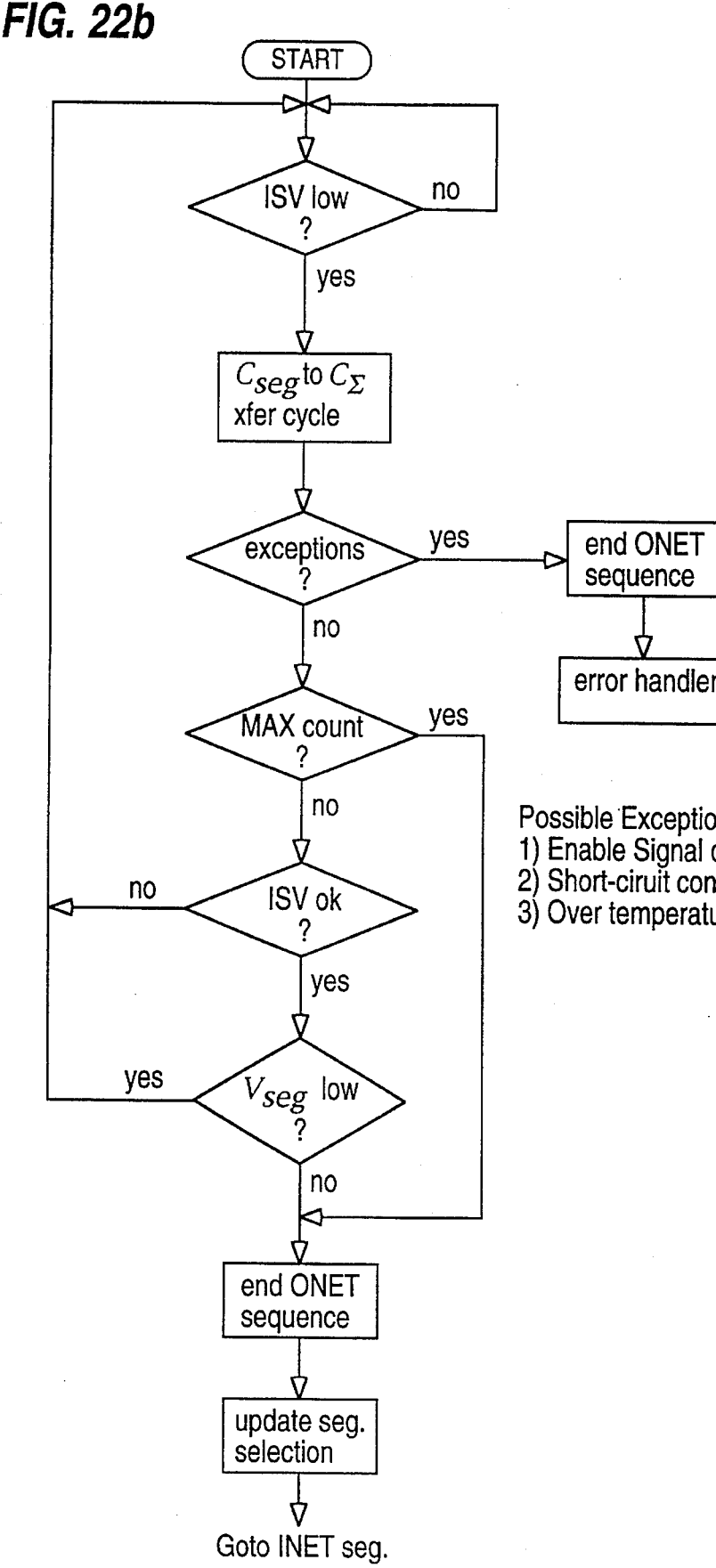
FIG. 22b shows a detailed output conduction sequence VSUA section.
Figure 23:
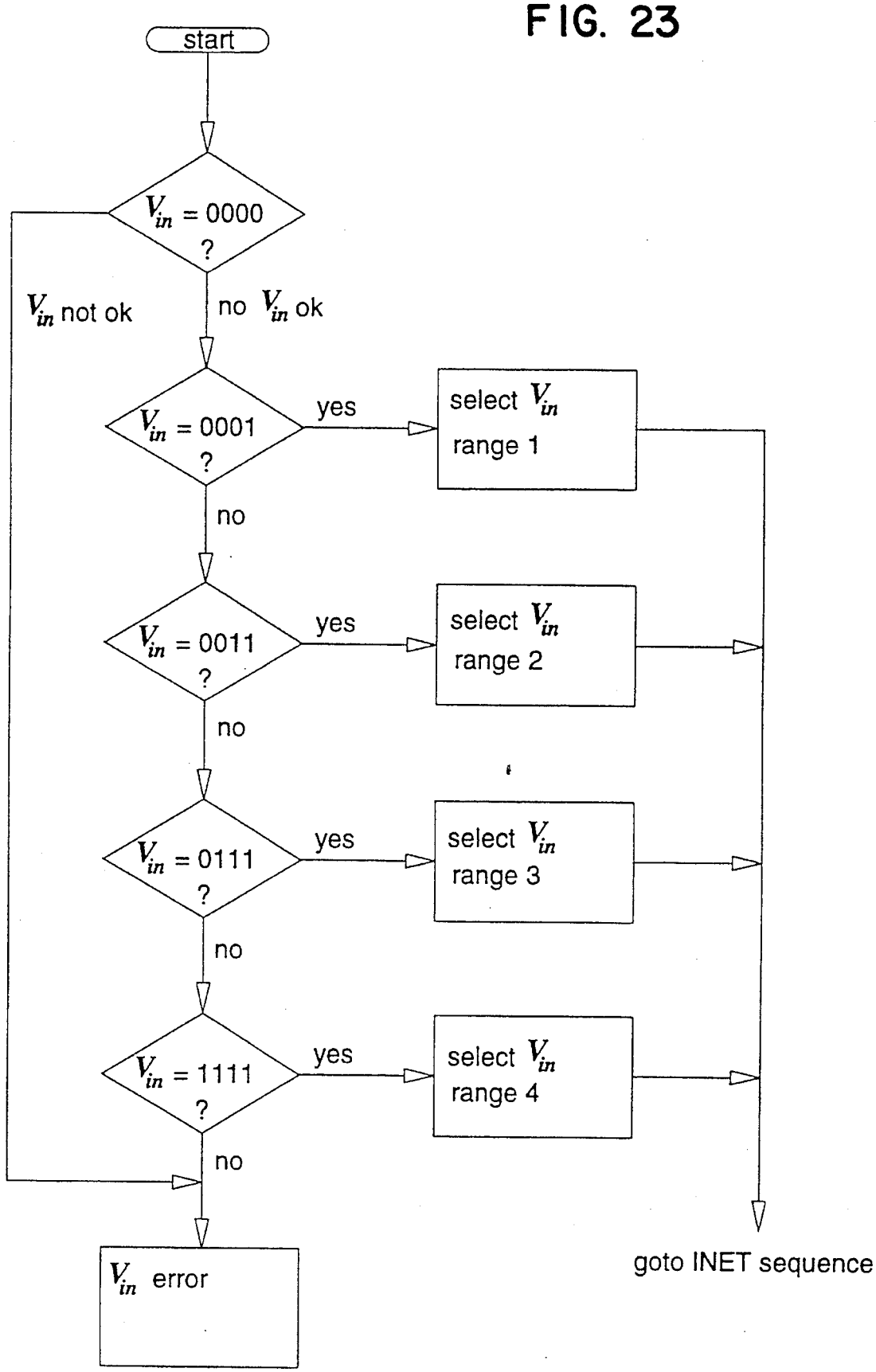
FIG. 23 shows an input voltage range selection protocol for all HPSCVCR architecture.
Figure 24A:
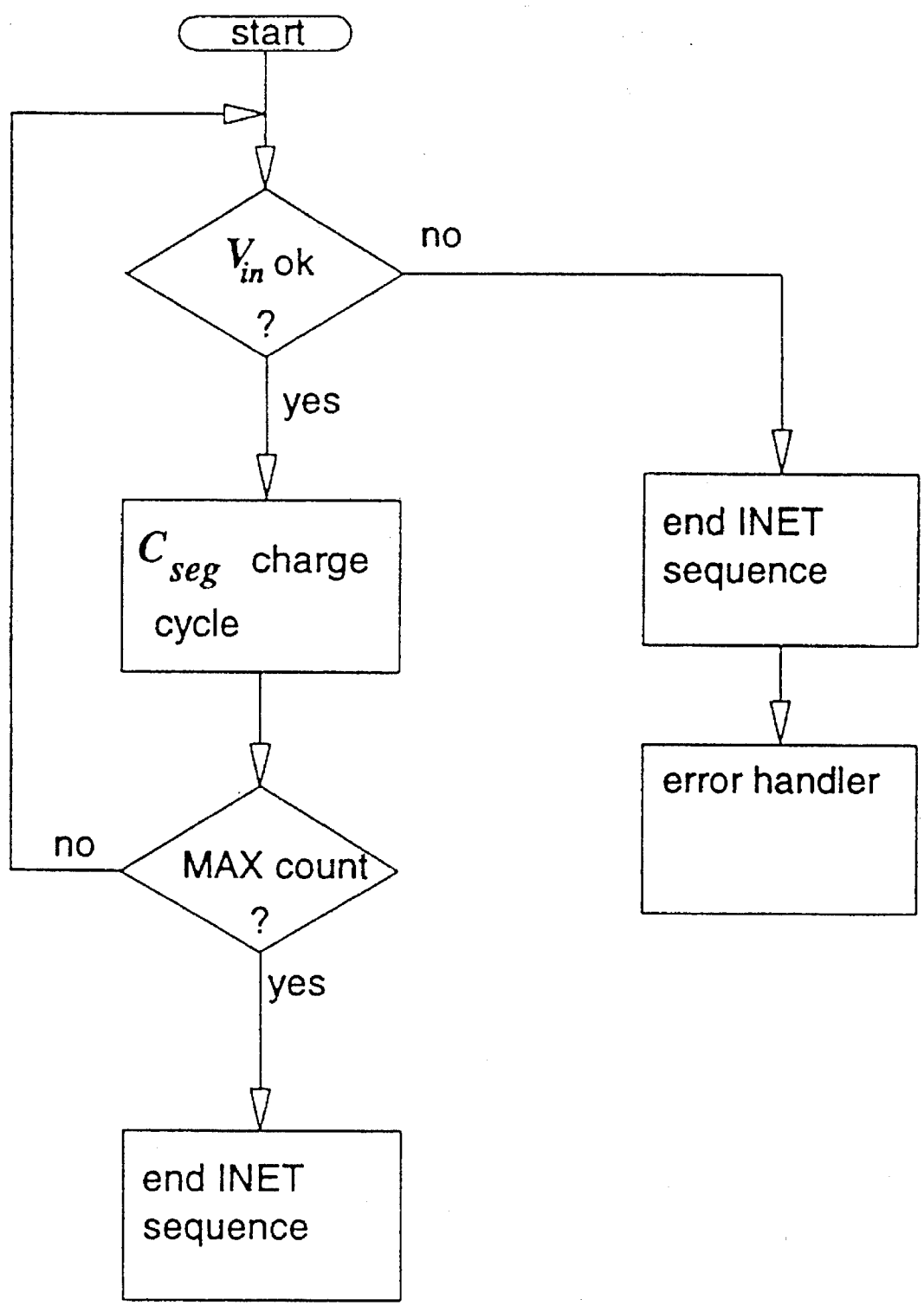
FIGS. 24a and 24b shows an input conduction sequence VSUA section. Flowchart (a) represents the VSUA section without DECT protocol implementation support. Flowchart (b) represents the VSUA section with DECT protocol support.
Figure 24B:
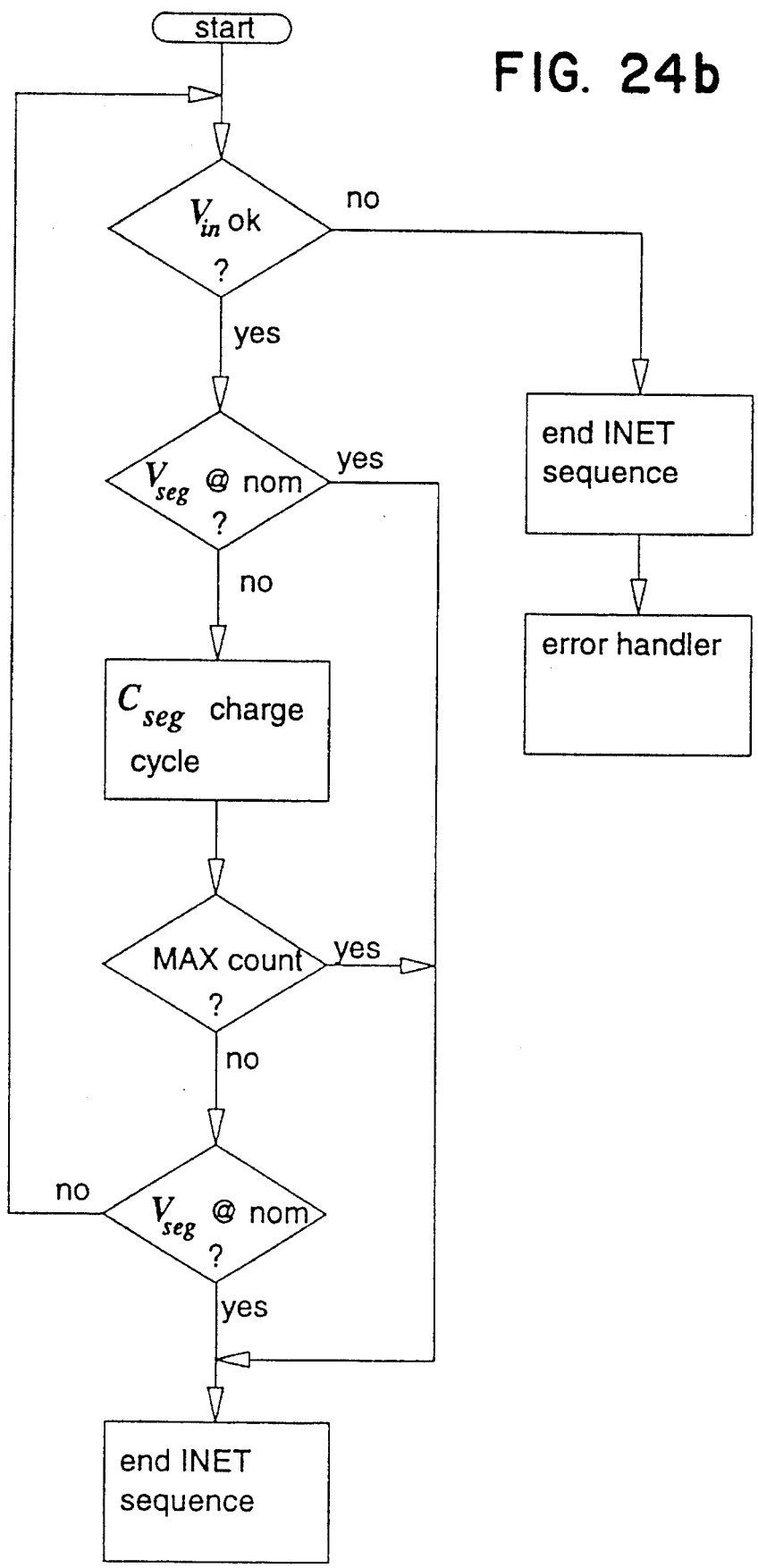
Figure 24C:
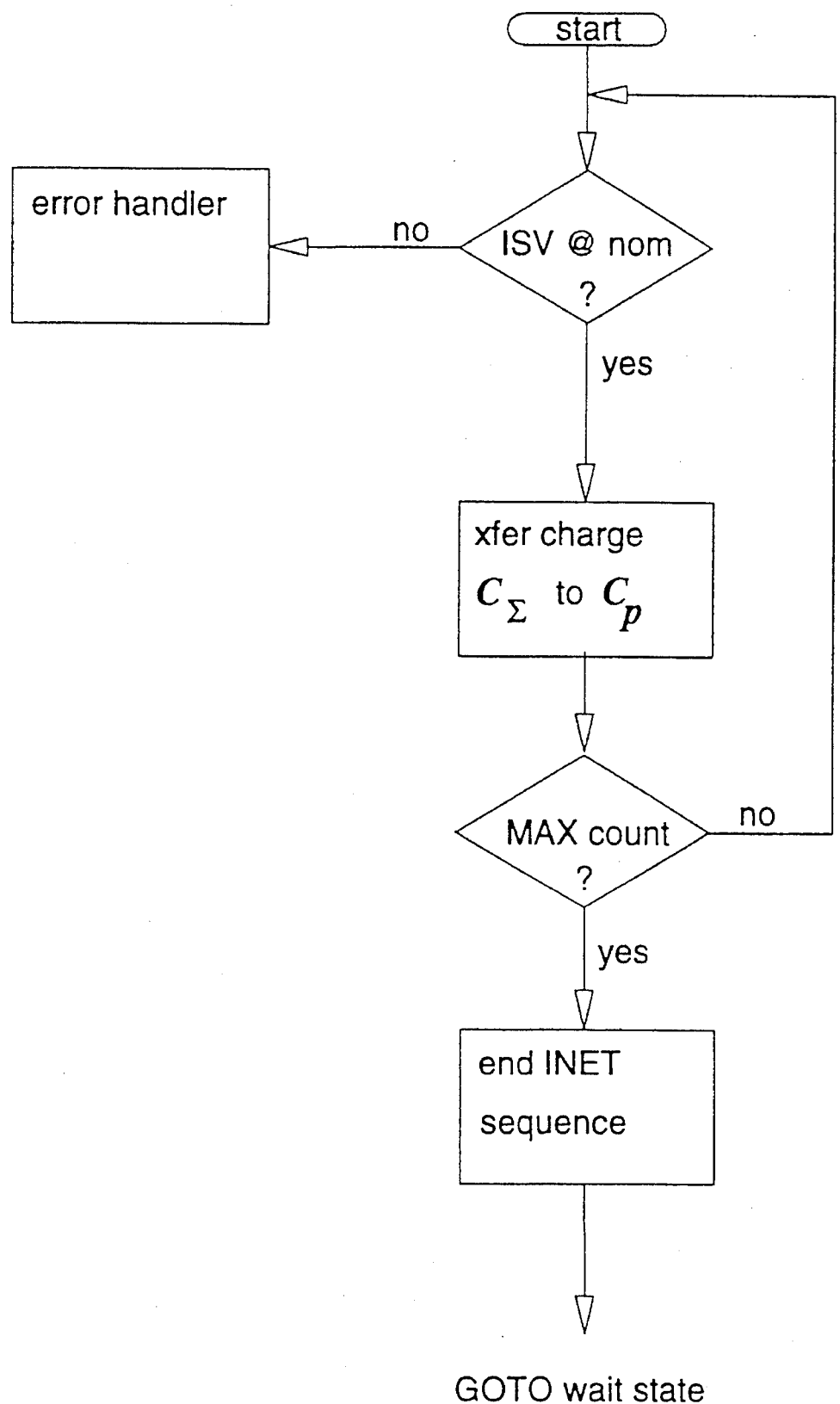
FIG. 24c shows an input conduction sequence protocol VSDA section.

1. Input transitional dead zone sequence (normal idle state)
2. Output conduction sequence
3. Output transitional dead zone sequence
4. Input conduction sequence A flowchart representing the implementation of the four base protocols; System Charge Transfer Protocol, SPC Refresh Protocol, Cold Start Protocol, the Failure and Fault Detection and Handling Protocols is shown in FIG. 20.

Symbiotic Power Circuit Internal Power Protocols

The generation of internal supply power for both the input network resident and output network resident control and driver circuits is provided by the symbiotic power circuits or SPC. As mentioned earlier, the SPC requires the operation of the step-down capacitive transformer so that only the VSDA and ISUDA variants of the HPSCVCR architecture employ these circuits.

The micro-code needed to generate the timing for the symbiotic power circuits is part of the step-down capacitive transformer micro-code. When implemented in this way the operation of the SPC is transparent to the operation of the HPSCVCR based converter designs. However, under "no-load" or lightly loaded conditions the number of input and output conduction sequences are insufficient to maintain the internal supply voltage levels. Under these conditions a SPC refresh sequence is initiated. The SPC refresh sequence consist of an input conduction and transitional dead zone sequences are followed by a "dummy" output conduction sequence. The dummy output conduction sequence has a time duration that is equal to the full output conduction sequence where no charge is transferred to output capacitor, Coat while the VOUT_OK signal remains asserted. However, in some designs if the signal VOUT_OK is deasserted during this period of time charge will be transferred to the output capacitor and external load.

The request for a SPC refresh sequence is generated by a timing circuit which is reset after each output conduction sequence. Hence, if a normal charge transfer cycle consisting of an input and output conduction sequences had not occurred within a specified period of time (i.e. the SPC refresh period) a refresh request is generated. Once the state machine receives a refresh request the SPC refresh sequence will be executed. The exception is that the VOUT_OK signal is deasserted at the time the refresh request is generated, then the normal charge transfer sequence is executed. The SPC refresh period is a design specific parameter and is set to the minimum number of the SPC refresh sequences required to maintain the internal supply voltage levels for a particular design. A partial high level flowchart of the SPC protocol is shown in FIG. 20.

Cold Start Protocol

There are two basic versions of the Cold Start Protocol. One version addresses the needs of both the VSDA and ISUDA variants while the other addresses the needs of the VSUA variant. Both versions of the Cold Start Protocol will be discussed in this section.

In general both versions of the cold start protocol involve the power-up of the control and gate drive circuitry in the input and output networks while maintaining the input-to-output network isolation integrity. To function correctly the cold start protocol requires the implementation of the input network resident initial power circuit (IPC), COLD START FLAG logic, and the output network resident "ONET Cold Start Gate Clamp" circuit. These circuits become active upon the first application of input power to the system and function independently of the state machine or any other control logic.

Version 1: Cold Start Protocol for VSDA and ISUDA variants

1) When the input DC voltage is first applied the initial power circuit becomes active and begins supplying initial power to the input network controller logic. This allows the state machine to become active. If the input voltage is at a value that is sufficient for the proper operation of the converter to complete the power-up sequence. At this time the COLD START FLAG is asserted which is read by the state machine to signal a cold start condition. The COLD START FLAG will remain asserted for approximately 100 µS (the duration of the flag assertion is design dependent, however in all cases it is made long enough to complete the power-up process). In the output network the ONET Cold Start Gate Clamp circuit "clamps" the output of the ONET gate driver to the capacitive transformer's output network power MOSFET devices. The clamp remain in affect until the output network supply voltage has been established.

2) The next phase of the power-up sequence is the establishment of the Intermediate System Voltage, or ISV across the summation capacitor $C_\Sigma$ (ISUDA variant) which is handled by the VSUA section. During this period the capacitive transformer of the VSDA section has its control signals set for their non-conductive state for both of its input and output networks. This to insure that an input-to-output isolation breach does not occur during the power-up sequence.

3) When the ISV has reached its nominal value, the state machine configures the VSDA section's capacitive transformer into its serial configuration to begin charging its segment capacitors. This configuration is maintained for a predetermined period of time which allows the segment capacitors to be sufficiently charged.

4) Once the segment capacitors have been charged, the input symbiotic power circuit is enabled. Sufficient time is allotted for the input network supply voltage to be established. The amount of time allotted is design specific parameter.

5) Once the input network symbiotic power has been established, the state machine enable the output network symbiotic power circuits. When the output network supply voltage has been established, the ONET Gate Clamp circuit will terminate the clamp function and signal the state machine that the output network supply voltage is "okay". At this point the cold start power-up sequence has been completed.

Version 2: Cold Start Protocol for the VSUA variant

For the VSUA variant a modified CDMA capacitive transformer is a key part of the process to generate the internal supply voltages needed. However, when the input DC voltage $V_{in}$ is less than 15 V a simpler method can be considered to supply the internal power required. As with the ISUDA and VSDA variants, the output network supply voltages are generated using an isolated symbiotic circuit.

1. When the input DC voltage is first applied temporary power is supplied from an initial power circuit (e.g. IPC) to the input network controller logic. This allows the state machine to become active and complete the power-up sequence if the input DC voltage is sufficient for the converter to operate. At this time the COLD START FLAG is asserted which is read by the state machine to signal a cold start condition. The COLD START FLAG remains asserted for the amount of time required to complete the power-up process (NOTE: the duration of this flag's assertion is design specific parameter). In the output network, the ONET Cold Start Gate Clamp circuit "clamps" the output of the ONET gate driver to the capacitive transformer output network MOSFET devices. The clamp remain in affect until the output network supply voltage has been established.

2. The next phase of the power-up sequence is the establishment of the input network supply voltage. The state machine switches the VSUA capacitive transformer into its parallel input configuration which allows the segment capacitors be charged from the input DC voltage source. This also allows the segment capacitors of the modified CDMA capacitive transformer to be charged from the input DC voltage source. The amount of time that the input configuration of the VSUA capacitive transformer is maintained is a design specific parameter.

3. When the segment capacitors have been sufficiently charged, normal CDMA capacitive transformer operation is started. The output voltage from the CDMA capacitive transformer supplies the voltage regulators to provide the supply voltage for the input network resident circuits.

4. Once the input network supply voltage has been established, the state machine enables the output network symbiotic power circuits. The voltage output of the CDMA capacitive transformer is use to supply the power for the output network SPC. When the output network supply voltage has been established, the ONET Gate Clamp circuit will terminate the clamp function and signal the state machine that the output supply voltage is "okay". At this point the cold start power-up sequence has been completed.

Delayed Excess Charge Transfer (DECT)

As mentioned earlier, the conversion efficiency of both the VSDA and VSUA variants of the HPSCVCR architecture are sensitive to the value input DC voltage. This is due to the segment capacitors becoming "over charged" during the input conduction sequence when the input DC voltage is greater than the minimal value required for the particular voltage range. As described by equation EQ4, the conversion efficiency of the VSDA design, for example, is greatest at the minimal value of the input DC voltage. The segment capacitor "over charging" can be minimized in the VSDA and VSUA designs, however, the effectiveness is minimal due to the time resolution of the state machine.

The ISUDA variant of the HPSCVCR architecture addresses this problem with the implementation of the Delayed Excess Charge Transfer (DECT) protocol shown which is implemented in the VSUA section. In the ISUDA variant the VSUA section is used to generate an Intermediate System Voltage or ISV that is applied to the VSDA section as its input voltage. Normally the output voltage of the VSUA section is equal to $V_{in} \cdot V_{su}$ which may not equal to the desired ISV value requiring the VSUA section to regulate its capacitive transformer's output to maintain the desired ISV value.

With the DECT protocol the VSUA section state machine monitors both the segment capacitor voltage of its capacitive transformer and the summation capacitor's voltage (i.e. its output voltage). The segment capacitors are monitored during both the input and output conduction sequences. During the input conduction sequence, if the segment capacitor voltage has reached a predetermined upper limit value, the input conduction sequence is terminated. This limits the amount of "over charging" that may be experienced by the segment capacitors. The charge transfer occurs normally during the output conduction sequence and is regulated to maintain the desired ISV value. However, in the DECT protocol the input conduction sequence is not re-entered until the segment capacitor voltage has dropped below a predetermined lower limit. Hence, excess charge is stored in the segment capacitors of the step-up capacitive transformer of the VSUA section and is transferred to the summation capacitor, $C_\Sigma$, only when the ISV has dropped below its lower limit. Within this scheme, the ISUDA variant of the HPSCVCR architecture will not require charge from the input DC voltage source on every cycle. As a result the net affect is that the current required from the input DC voltage source is spread over a longer period of time which reduces the average input current and power.

Failure and Fault Protocols

Within the HPSCVCR architecture there are three basic areas of both failure and or fault conditions that are of concerns. These areas are: Unit Over Temperature, Load Short Circuit, and Isolation Breach conditions. The failure and fault protocol addresses the detection and response procedures for these various conditions. Faults and failures in the HPSCVCR architecture are defined and responded to differently, with failures considered to be the most server. The definitions for both are given below as:

Failures are considered an unrecoverable error condition that is the result of an internal (i.e. device/part) failure which may have been introduced from an external source. The failure condition is usually not resolved, but instead a "fail-safe" condition to limit potential damage to the load and the input DC voltage source is sought.

Faults are considered a recoverable error condition that is not the result of a failure mode (i.e. device or part failure related) but as of random external source acting upon the particular HPSCVCR implementation. The fault condition is usually resolved by returning the DC-to-DC voltage converter back to a know state and then resuming operation either manually or automatically.

A detailed outline of the failure and fault description, detection, and response are given below.

Over Temperature Fault

The over temperature condition is defined as a specified device or number of devices or specific area exceeding the nominal operating temperature range limit. In particular the charge path devices and capacitors (both segment and output capacitors) are monitored to ensure that they are maintained within their respective specified operating temperature range. In the absence of any failure or fault, this condition may have been the result of:

1. continuous excessive load current, or
2. high operational environmental temperature.

Over Temperature Response

When this condition is detected, the effects the over temperature condition is reduced by lowering the output current delivered to the load. This is done by reducing the rate of charge transfer to the output network which reduces both the output current and voltage which lowers the power dissipated by the DC-to-DC voltage converter. Full charge transfer will resume once the device temperatures have returned to normal.

Excessive Current Fault

An excessive current fault condition is defined as, and exist when the output current exceeds the maximum current and time that is specified. This fault condition is usually the result of a short circuit across the output of the converter or the result of driving a large reactive (i.e. capacitive or inductive) load. The affect of this condition is that the converter's output voltage drops below its nominal value for an extended period of time. The response to this fault condition is dependent on the operational mode of the converter (i.e. power-up or normal operation) at the time the fault condition occurs and the method used to detect this condition.

1. During system power-up from either a "cold-start" or "warm-start" condition an excessive current fault is expected and is not considered a short circuit condition for an initial period of time. This initial period of time is called the "power-up time" $t_{pup}$. However, if the fault condition extends beyond $t_{pup}$ the excessive current fault condition is then considered a short and the appropriate response is taken.

2. If an excessive current fault is detected during the normal operating mode of the converter, the condition is considered a short and the appropriate response is taken immediately.

Power-up Mode Response

During power-up, an excessive current fault is expected due the large capacitive loads and devices that are connected to the converter's output. Under these conditions no response is taken for the period $t_{pup}$ after charge transfer has started. If the converter's output has not reached it nominal output voltage within this period of time, the excessive current fault is then considered a short circuit condition and the appropriate response taken. The time $t_{pup}$ is determined by the amount of time required to charge the maximum specified external capacitance to the nominal output voltage under full load conditions.

Short Circuit Responses

Depending on the particular application a number of responses can be selected.

1. Brown-out response. here the output voltage of the DC-to-DC voltage converter is lowered, thereby reducing the current and power delivered to the load circuit. If the output voltage should return to its nominal operating range, then full charge transfer would be resumed.

2. Shut-down response. With this response all charge transfer to the external load is halted. Charge transfer is re-started after cycling the input DC voltage or an input control pin (i.e. ENABLE or RESET if available).

Isolation Breach

An isolation breach is a server condition, and depending on the cause it could be considered either a fault condition or a failure condition which is the more server. This condition occurs when a combination of input and output network switch functions remain in their conductive state causing a low independence DC electrical path to exist between the input and output networks. The two primary error modes that could result in this condition are:

1. A gate drive circuit(s) is stuck causing a switch or set of switches to remain in their conductive state. This condition is difficult to detect during normal operation and would require addition independent circuits to monitor the gate drive circuits. This is considered a failure condition which would result in the removal of the DC-to-DC voltage converter.

2. A state machine algorithm "glitch" which initiates an improper switching sequence. The "glitch" may be the result of a hardware failure which would result in the removal of the unit. It may also be due to static electricity discharge or alpha particle and would have not cause permanent damage to the converter. This condition is detectable by additional independent "watch dog" logic. This "watch dog" logic monitors the gate drive control signal lines looking for irregular switching patterns. When an error is detected it generates a fault signal that is used to reset the unit.

Isolation Breach Response

In the event of gate drive circuit failure the safest protection is the use of an in-line fuse element. Once the fuse is blown the DC-to-DC voltage converter would have to be replace.

The response to the state machine glitch would be the DC-to-DC voltage converter internal system reset. This response would be initiated by the assertion of the FAULT signal. Once the unit has been disabled, either a manual or automatic restart procedure could be employed.

Input Voltage Range Violation

The definition of an Input Voltage Range Violation is when the input DC voltage value is either below the minimum limit or exceeds the maximum voltage limit for a specified period of time. Theses faults will result in the shut down or non-power-up response of the DC-to-DC voltage converter. However, the operation of the unit (i.e. DC-to-DC voltage converter) under these conditions is not predictable and could result in the permanent damage to the unit or the load circuit connected to the unit.

INDUSTRIAL UTILITY

Some of the advantages and features of the invention are enumerated below:

1. Conversion Efficiency of 90% and greater can be achieved with the Capacitor MOSFET Array or CMA capacitive transformer based HPSCVCR architecture designs. This is due to: 1) to both the massive parallel power MOSFET structures of the output network charge path used in the HPSCVCR architecture and the elimination of PN junction devices (i.e. diode rectifiers and BJT) in both the input and output the charge paths. 2) The electronic switching between serial and parallel capacitor configurations to step-down (or step-up) the input voltage to the desired output level. This reduces the internal voltage drops and $I^2R$ losses. Hence, high conversion efficiency can be achieved at low output voltages and high delivered output power levels.

2. Very Fast Response times (i.e. No-Load To Full-Load and Full-load to No Load) is achieved through the combination of hardware implementation and the System Charge Transfer Protocol implemented in the state machine controller. The Capacitor MOSFET Array or CMA capacitive transformer (or any version of the capacitive transformer) response is determined by the effective characteristics of the output equivalent circuit and the switching time of the electronic switches. The System Charge Transfer Protocol, which defines the state machine sequence ensures that charge stored in the capacitive transformer is transferred to the output network and external load in the minimum amount of time.

3. The HPSCVCR architecture achieves an effective input-to-output electrical isolation through a combination of both circuit design and the System Charge Transfer Protocol implementation.

4. HPSCVCR architecture based DC-to-DC voltage converters are based on a dual ramp ripple output voltage which as a number of benefits:

a) Reduced stress is placed on the charge path components which can be realized in both higher output power delivered or increased reliability of the overall unit.

b) HPSCVCR architecture based designs can realize an effective switching frequency of approximately twice its fundamental switching frequency. This can be realized as either reduced component size and overall unit size, or an increase in the unit's delivered output power.

5. The Integrated Step-Up Down Architecture or ISUDA variant of the HPSCVCR architecture offers the greatest flexibility to obtain high delivered output power at conventional system input DC voltage values.

6. The architecture of the Capacitive Transformer is such that it can be implemented based on either two port (diodes) or three port (i.e. BJT, MOSFET, etc.) active devices. The optimal active device would be a two port device with the characteristics of an ideal diode. However, given the limitation of actual devices available today the power MOSFET is the device of choice which offers low ON resistance, fast response times, and no intrinsic barrier voltage.

7. The capacitive transformer is "scale able" with both technology and size. If new technology is introduced which offers ideal switching characteristics the HPSCVCR architecture and the capacitive transformer (both step-up and step-down versions) can exploit this feature as mentioned in item 6. In addition, the capacitive transformer can be sized either up or down for a number of different application requirements. Scale able factors are:

Input voltage
   Delivered output power
   Output Voltage
   Operation frequency 8. The capacitive transformer as well as the HPSCVCR architecture can be transferred into integrated circuit technology. This would be the normal evolutionary path taken by this invention.

9. The capacitive transformer architecture is designed to take advantage of any new development in "static or semi-static energy storage devices". The importance here is that the HPSCVCR architecture although based on the electrostatic component, i.e. capacitors, it is able to utilize other energy storage devices or components 10. Very high power densities is offered by the capacitive transformer and all the HPSCVCR architecture variants.

Typical power densities offered by conventional transformer based converters are in the range of approximately 25 W to 50 W per cubic inch. Power densities in excess of 100 W/in$^3$ are achievable by designs that implement the HPSCVCR architecture. This is possible for the following reasons:

Capacitors have a higher energy density than its inductor counter-part. The capacitor is an electrostatic energy storage device which does not require current flow to maintain its electric field. Inductive components requires the flow of current to produce an electric field.

Capacitor construction is approaching near ideal components that are commercially available today with very low esr and esl parameters.

Power MOSFETs are available in SOIC (Small Outline Integrated Circuit) packages that offer high current carrying capability (i.e. low on resistance). Circuit integration will further decrease the overall unit size and result in higher power densities.

11. The Gate Distribution Network developed for the CMA capacitive transformer is designed to operate over a large range of supply voltages and distribute a high speed gate drive signal to Power MOSFET devices resident at different voltage potentials. In addition it ensures that the proper DC biasing is maintained during all phases of its operation. The gate distribution network is designed so that it can be scaled as to the number of power MOSFET devices needed to be driven.

12. The gate drive circuits of the INET electronic switch is designed to generate high speed gate drive signals for operating power MOSFET devices that have large offset voltages. The gate drive circuits ensures that the gate-to-source voltage of the power MOSFET does not exceeds design limits and automatically compensates for offset voltage changes. Another feature of the gate drive circuit is that it has an interface to high speed low voltage logic devices.

13. Symbiotic Power Circuit or SPC, efficiently generates internal supply voltages for the input and output network resident circuits at the required voltages while maintaining input to output network isolation. The SPC's operation is transparent to the operation of the HPSCVCR architecture under most operating conditions.

14. The System Charge Transfer Protocol provides a method to allow very fast response for no-load to full-load and full-load to no-load conditions. This algorithm also ensures that input to output network isolation is maintained and implements a number of "fail safe" procedures. The protocol's architecture allows for additional features and up grades to be added into the system at a later time.

HPSCVCR ARCHITECTURE DESIGN NOTES:

In general, the HPSCVCR architecture assumes that inductive affects due to etch, bonding wire, lead frames, etc., are essentially insignificant. This is ensured through careful circuit design, the physical module layout, and module fabrication to greatly reduce the inductive affects. By reducing the inductive affects, the HPSCVCR architecture circuit's respond has an RC characteristic. The small amount of parasitic inductance that does remain provides a beneficial affect of slowing down the edge rate of the charge path current during switching.

To ensure the highest efficiency the DC resistance of the charge paths must be kept to a minimum. This goal is achieved using the same techniques that are used to reduce the inductive affects in the circuits of the HPSCVCR architecture based designs.

Manufacturing techniques used in the fabrication of HPSCVCR architecture based designs is critical to their operation and performance. Surface Mounted Technology or SMT is used in the fabrication, of HPSCVCR based converter designs. The primary reasons for selecting SMT fabrication are:

1. Is the reduce inductive affects of the lead frame compared to that offered by other packaging technologies. One of the goals of the HPSCVCR architecture base designs is to eliminate as much of the inductive affects as possible. The second it the reduction in the DC resistive paths of these designs.

2. Another benefit of SMT is that it allows for double sided fabrication, which is not possible with through-hole packages. This allows for smaller unit package sizes.

OUTPUT POWER PREDICTION

During the development of the HPSCVCR architecture a method or expression was needed to predict the maximum potential output power of a design. This prediction was to be based on: the output ripple voltage, output capacitance, nominal output voltage, and the frequency of the output ripple voltage. The development of this expression is given below.

Figure 25:
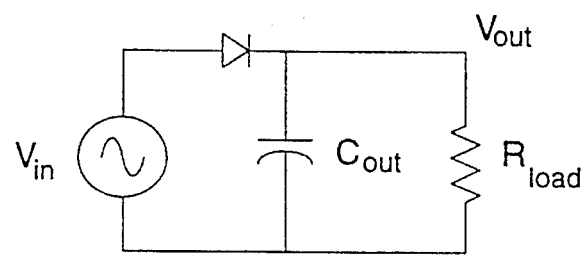
FIG. 25 shows a simplified output commutating (diode) and filtering (output capacitor) circuit.

All types of voltage converters requires either pulsating or alternating current to perform the voltage conversion. In AC-to-DC power supplies used in most electronic equipment, the alternating current is provided by the input voltage source. However, in high efficiency AC-to-DC and DC-to-DC voltage converter designs pulsating DC current is provided by a high frequency chopping circuit. The output stage in all of these designs contains a filtering network and commutating circuit. A simplified sample circuit is shown in FIG. 25.

Figure 26:
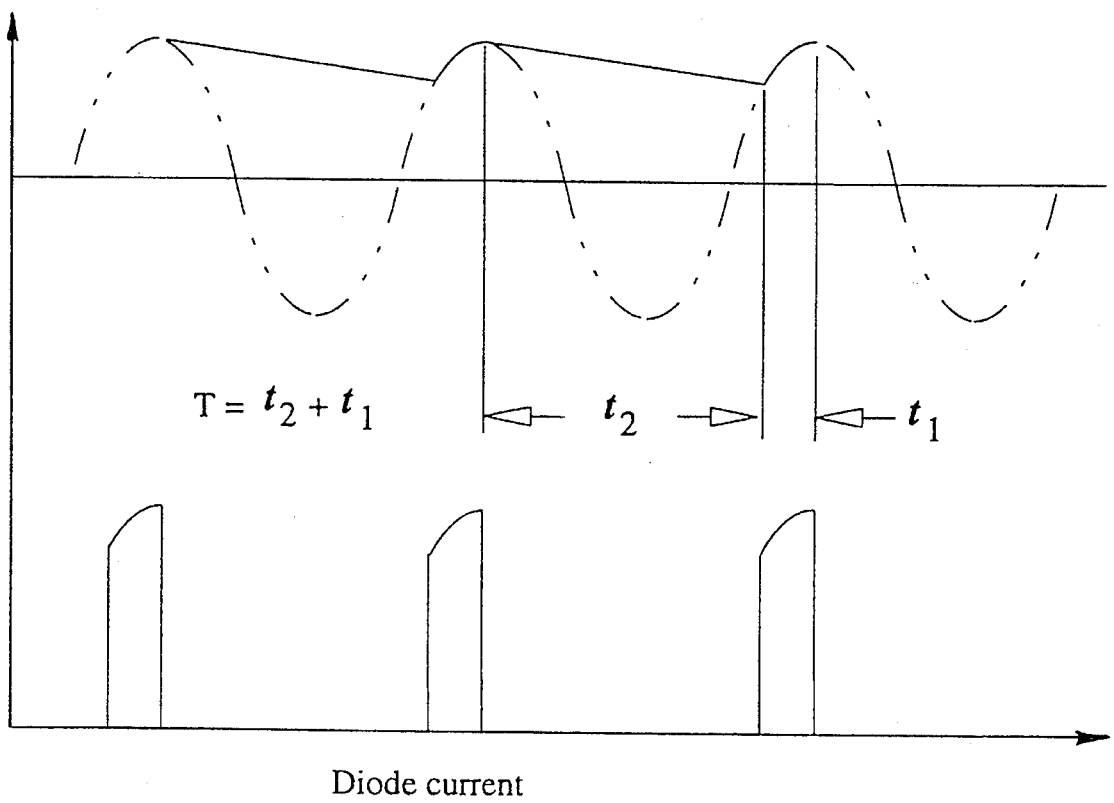
FIG. 26 shows an output voltage and current waveform of simplified circuit of FIG. 25.

Energy from the AC voltage source it transferred to the output capacitor only when the voltage at the output of the source is greater than the output capacitor's voltage and the turn-on voltage of the diode. When the diode is off, the circuit is said to be in its relaxation phase, where the output current is supplied from the output capacitor. The resultant output voltage waveform and current are shown in FIG. 26.

The change in the output voltage and current is given by the expressions:

$$v_o(t) = V_{oMAX} e^{\frac{-t}{R_L C_{out}}}$$

and $$i_o(t) = C_{out} \frac{dv_o(t)}{dt}$$

where $$i_o(t) = -\frac{V_{oMAX}}{R_L} e^{\frac{-t}{R_L C_{out}}}$$

$P_o(t) = v_o(t) i_o(t)$ and the average output power of this system is given by:

$$P_{AVG} = -\frac{1}{T} \int_0^{t_2} \frac{V_{oMAX}^2}{R_L} e^{\frac{-2t}{R_L C_{out}}}$$

performing the integral and evaluating the resultant expression at the $$P_{AVG} = \frac{V_oMAX2C_{out}}{2T} [e^{\frac{-2t_2}{R_LC_{out}}} - 1]$$

NOTE: that $T \approx t_2$ so that:

$$P_{AVG} = \frac{V_oMAX2C_{out}}{2T} [e^{\frac{-2T}{R_LC_{out}}} - 1]$$

$$T = -\frac{R_L}{2} C_{out} \ln\left(1 + \frac{2TP_{AVG}}{V_oMAX2C_{out}}\right)$$

$$P_{AVG} = V_oI_o \text{ and } P_{AVG} = \frac{V_o^2}{R_L}$$

making this substitution into the expression for "T" we have:

$$T = -\frac{V_o^2}{2P_{AVG}} C_{out} \ln\left(1 + \frac{2TV_oI_o}{V_oMAX2C_{out}}\right).$$

Next an expression that relates the output current $I_o$ to the output voltage $V_o$ is needed over the time period "T". It should also be noted that the change in the output voltage during this period of time is considered the output ripple voltage.

$$I_o = -\frac{V_oMAX}{T} C_{out} e^{\frac{-t}{R_LC_{out}}} \bigg|_{t=0}^{t=T} \text{ with:}$$

$$\Delta V \equiv V_{rip} = V_oMAX e^{\frac{-t}{R_LC_{out}}} \bigg|_{t=0}^{t=T} \text{ hence } I_o = -\frac{V_{rip}C_{out}}{T}$$

$$P_{AVG} = -\frac{V_o^2}{2T} C_{out} \ln\left(1 - \frac{2V_{rip}V_o}{V_oMAX2}\right)$$

note that:
$$\begin{cases} V_o = V_oMIN + \frac{V_{rip}}{2} \\ V_o = V_oMAX - \frac{V_{rip}}{2} \end{cases}$$

$$P_{AVG} = -\frac{V_o^2}{2T} C_{out} \ln\left(\frac{V_oMIN2}{V_oMAX2}\right)$$

$$= -\frac{V_o^2}{T} C_{out} \ln\left(\frac{V_oMIN}{V_oMAX}\right)$$

NOTE: that substitution for: $f=1/T$ and $V_oMIN=V_oMAX-V_{rip}$ in the argument for the natural log were made so that the final expression is:

$$P_{AVG} = -V_o^2 C_{out} f \ln\left(1 - \frac{V_{rip}}{V_oMAX}\right)$$

This is the basic form of equation EQ9. A more general form which also handles dual slop ripple voltage is developed below.

The assumption used to develop equation EQ9 was the relaxation period $t_2$ was the majority of the ripple period such that $t_2 \approx T$, (i.e. $t_2 \gg t_1$). However, in systems that develop a dual slop ripple voltage $t_2 \approx t_1$ where $T=t_2+t_1$, where energy is transferred to both the load and output capacitor for one of the time periods. By definition the energy being transferred to the load during both time periods are equal. The half period frequencies of the output ripple voltage are then:

$$t_2 = \alpha T = \frac{1}{\alpha} f = \frac{1}{f(t_2)}$$

and $$t_1 = (1-\alpha)T = \frac{1}{1-\alpha} f = \frac{1}{f(t_1)}$$

where $$\alpha = \frac{t_2}{t_1 + t_2}.$$

where: $0 < \alpha < 1$

The effective switching frequency of systems that develops a dual ramp ripple voltage is then determined by the larger of the two time periods $t_2$ or $t_1$.

$$f_{eff} = \frac{1}{\alpha} f = \frac{t_2 + t_1}{t_2} f = \left(1 + \frac{t_1}{t_2}\right)f \text{ for } t_2 > t_1 \text{ and}$$

$$f_{eff} = \frac{1}{1-\alpha} f = \frac{t_2 + t_1}{t_2 + t_1 - t_2} f = \left(1 + \frac{t_2}{t_1}\right)f$$

for $t_2 < t_1$ and

Hence, the maximum frequency multiplier value for the dual ramp system is 2 when $t_2=t_1$. In general the relaxation period time of the HPSCVCR architecture designs also includes the transitional dead zone sequences as well as the input conduction sequence, so that the effective switching frequency of this system is:

$$f_{eff} = \left(1 + \frac{t_1}{t_2 + t_{DZ}}\right)f \text{ with } f = \frac{1}{t_2 + t_{DZ} + t_1}$$

and the modified power prediction equation is now:

$$P_{OUT} = -V_o^2 C_{out} f_{eff} \ln\left(1 - \frac{V_{rip}}{V_oMAX}\right)$$

HPSCVCR Efficiency Expression

In this example, it is assumed that the output conduction sequence has just been completed and that the capacitors of the capacitive transformer have been switched to their series configuration. The series configured capacitors are connected across the input DC voltage source, $V_{in}$ for the time period of $t_2$. The following expression describes the charging of the series configured segment capacitors:

$$v_{stack}(t) = (N_{SD}V_{PMIN} - V_{in})e^{\frac{-N_{SD}t_2}{R_xC_p}} + V_{in}$$

letting $$\delta(t_2) = e^{\frac{-N_{SD}t_2}{R_xC_p}}$$

and substituting into the above equation:

$$v_{stack} = \delta(t_2)N_{SD}V_PMIN = V_{in}\delta(t_2) + V_{in}$$

During the input conduction sequence the individual segment capacitor voltages are restored in their starting value of $V_pMAX$. The target stack voltage is then the sum of the individual segment capacitor voltages, $$V_{stack} = N_{SD}V_PMAX,$$
$$N_{SD}V_PMAX = \delta(t_2)N_{SD}V_PMIN - V_{in}\delta(t_2) + V_{in},$$

-continued $$V_{in} = \frac{N_{SD}[V_{PMAX} - \delta(t_2)V_{PMAX}]}{1 - \delta(t_2)}.$$

Next, an expression that described the input current during the input conduction sequence, which is time period $t_2$, is derived from the equation that describes the stacked voltage of the series connected segment capacitors. So that:

$$I_{in}(t) = C_{in}\frac{dv_{stack}}{dt}, \text{ where } C_{in} = \frac{C_P}{N_{SD}}.$$

$$I_{in}(t) = \frac{C_P}{N_{SD}} \frac{d}{dt} [(N_{SD}V_{PMIN} - V_{in})e^{\frac{-N_{SD}t}{R_xC_p}} + V_{in}] = -$$

$$\frac{1}{R_x}(N_{SD}V_{PMIN} - V_{in})\delta(t), \text{ where } \delta(t) = e^{\frac{-N_{SD}t}{R_xC_p}}$$

The average input current over the operational cycle time period, T, is found by:

$$I_{in} = \frac{1}{T}\int_0^{t_2} I_{in}(t)dt$$

$$I_{in} = \frac{C_P}{TN_{SD}}(N_{SD}V_{PMIN} - V_{in})[\delta(t_2) - 1]$$

When the above expression for the average input current is evaluated at the limits of integration we have that: $v_{stack}=N_{SD}V_PMIN@t=0$ and $v_{stack}=N_{SD}V_PMAX@t=t_2$. So that the average input current can also be expressed by the following equation:

$$I_{in}(t) = \frac{C_P}{N_{SD}} \frac{d}{dt} [(N_{SD}V_{PMIN} - V_{in})e^{\frac{-N_{SD}t}{R_xC_p}} + V_{in}]$$

The efficiency of the HPSCVCR DC-to-DC voltage converter design is determined using a "black box" analysis by considering the ratio of the output power.

To show that the efficiency of the VSDA variant, and HPSCVCR based designs in general, is equal to the ratio of the output to input voltage multiplies by the step-down ration, $N_{SD}$. We start during the $t_1$ time period where the output and segment capacitor voltages are given by equations EQ7a and EQ7b respectively.

$$V_{out}(t)=K_1e^{m_1t}+K_2e^{m_2t} \qquad \text{EQ7a:}$$

$$V_p(t)=A_1e^{m_1t}+A_2e^{m_2t} \qquad \text{EQ7b:}$$

Multiplying the derivatives of the above equations by the respective capacitor terms, the output and segment capacitor currents are determined and are given below.

$$I_{out}(t)=C_{out}(m_1K_1e^{m_1t}+m_2K_2e^{m_2t}) \text{ and}$$

$$I_p(t)=N_{SD}C_p(m_1A_1e^{m_1t}+m_2A_2e^{m_2t}).$$

Hence, the average currents of the segment and output capacitors during time period $t_1$ are:

$$I_P = \frac{1}{t_1}\int_0^{t_1} N_{SD}C_PV_P(t)dt$$

and $$I_{out} = \frac{1}{t_1}\int_0^{t_1} C_{out}V_{out}(t)dt$$

where:

$$I_{PAVG} = \frac{N_{SD}C_P}{t_1}(A_1e^{m_1t}+A_2e^{m_2t})\Big|_0^{t_1}$$

and $$I_{outAVG} = \frac{C_{out}}{t_1}(K_1e^{m_1t}+K_2e^{m_2t})\Big|_0^{t_1}.$$

The exponential terms in the above expressions equals the change in the respective capacitor voltages during the $t_1$ time period. These changes are represented by the terms $\Delta V_p$ and $\Delta V_{out}$ which are substituted into the above equations:

$$I_{PAVG} = \frac{N_{SD}C_P}{t_1}\Delta V_P$$

and $$I_{outAVG} = \frac{C_{out}}{t_1}\Delta V_{out}.$$

During the $t_1$ time period the segment capacitors supply both the external load and output capacitor recharging currents. The output capacitor charging current must restore the exact amount of charge that had been removed from the output capacitor during the time period $t_2+t_{DZ}$. So that the segment capacitor current is equal to:

$$\frac{N_{SD}C_P}{t_1}\Delta V_P = \frac{C_{out}}{t_1}\Delta V_{out} + I_{LOAD}. \text{ and by definition:}$$

$$\frac{C_{out}\Delta V_{out}}{t_2+t_{DZ}} = I_{LOAD}$$

$$\frac{N_{SD}C_P}{t_1}\Delta V_P = \frac{C_{out}}{t_1}\Delta V_{out} + \frac{C_{out}\Delta V_{out}}{t_2+t_{DZ}}$$

The assumption is made, is that the time periods of $t_1$ and $t_2+t_{DZ}$ are equal. This is done to simplify the derivation and in practice is generally true. So that based on the assumption:

$$\frac{N_{SD}C_P}{t_1}\Delta V_P = \frac{2C_{out}}{t_1}\Delta V_{out}$$

The above equation relates the average equivalent segment capacitor voltage to the output capacitor charging current and external load current during the $t_1$ time period. The integral of both sides of the above expression is taken and averaged over the period T. When doing so the following factors must be accounted for:

1. During the $t_2+t_{DZ}$ time period the segment capacitors supplies no charge to either the external load or to the output capacitor, and 2. During the $t_2+t_{DZ}$ time period the output capacitor supplies all of the current to the load. Hence during this period of time the output capacitor current can be viewed as having a negative charging current.

$$\frac{1}{T}\int_T \frac{N_{SD}C_P}{t_1}\Delta V_P dx =$$

-continued $$\frac{1}{T} \int_T \left( \frac{2C_{out}}{t_1} \Delta V_{out} - \frac{C_{out}}{t_1} \Delta V_{out} \right) dx$$

$$\left| \frac{N_{SD}C_P \Delta V_P}{T} = I_P N_{SD} \right| = \left| \frac{C_{out} \Delta V_{out}}{T} = I_{out} \right| \text{ so that}$$

$$|I_P N_{SD}| = |I_{out}|$$

Recall that $$P_{in} = -\frac{C_P \Delta V_P}{T} V_{in} \text{ were } I_{in} = \frac{C_P \Delta V_P}{T}$$

which is equal to the average segment capacitor current, $I_P$. Therefore it can be concluded that the following relationship exist between the input and output currents for the VSDA variant of the HPSCVCR architecture, in that:

$$I_{in} = \frac{I_{out}}{N_{SD}}$$

Now the efficiency of the HPSCVCR "systems" can be represented in terms of the input and output voltages. The "black box" efficiency analysis of HPSCVCR based designs, as with other voltage converter types, is equal to the ratio of the output to input power, where:

$$P_{in} = V_{in}I_{in} = V_{in}\frac{I_{out}}{N_{SD}} \text{ and } P_{out} = V_{out}I_{out}.$$

Hence, the efficiency of HPSCVCR based design is:

$$\eta = \frac{P_{out}}{P_{in}} \times 100\% = \frac{V_{out}N_{SD}}{V_{in}} \times 100\% \text{ (step-down)}.$$

It is noted that the maximum efficiency of HPSCVR based designs occurs when the output conduction sequence, time period $t_1$ and the input conduction sequence $t_2$ are equal and $t_{DZ}$ is small when compared to both $t_1$ or $t_2$.

What is claimed is:

1. An integrated step-up/step-down DC-to-DC converter comprising:

a voltage input terminal;

a step-up voltage converter including (a) a first capacitor array including a plurality of capacitor elements, and (b) first switching means for operating in a first mode to connect said first capacitor array to said voltage input terminal and to connect each of said plurality of capacitor elements of said first capacitor array in parallel with each other within said first capacitor array, and in a second mode to connect said first capacitor array to an output of said step-up voltage converter and to connect each of said plurality of capacitor elements of said first capacitor array in series with each other within said first capacitor array;

a step-down voltage converter including (a) a second capacitor array including a plurality of capacitor elements, and (b) second switching means for operating in a third mode to connect said first capacitor array to said output of said step-up voltage converter and to connect each of said plurality of capacitor elements of said second capacitor array in series with each other within said second capacitor array, and in a fourth mode to connect said second capacitor array to an output of said step-down voltage converter and to connect each of said plurality of capacitor elements of said second capacitor array in parallel with each other within said second capacitor array;

a voltage output terminal coupled to said output of said step-down converter.

2. An integrated step-down/step-up DC-to-DC converter comprising:

a voltage input terminal;

a step-down voltage converter including (a) a first capacitor array including a plurality of capacitor elements, and (b) first switching means for operating in a first mode to connect said first capacitor array to said voltage input terminal and to connect each of said plurality of capacitor elements of said first capacitor array in series with each other within said first capacitor array, and in a second mode to connect said first capacitor array to an output of said step-down voltage converter and to connect each of said plurality of capacitor elements of said first capacitor array in parallel to each other within said first capacitor array;

a step-up voltage converter including (a) a second capacitor array including a plurality of capacitor elements, and (b) second switching means for operating in a third mode to connect said second capacitor array to said output of said step-down voltage converter and to connect each of said plurality of capacitor elements of said second capacitor array in parallel to each other within said second capacitor array, and in a fourth mode to connect said second capacitor array to an output of said step-up voltage converter and to connect each of said plurality of capacitor elements of said capacitor array in series with each other within said second capacitor array;

a voltage output terminal coupled to said output of said step-up converter.

3. A DC-to-DC voltage converter comprising:

a capacitor array including a plurality of capacitor elements; and, a plurality of switches which are switchable between at least two states and which are coupled to said plurality of capacitor elements of said capacitor array, wherein said plurality of capacitor elements are connected in series with each other when said plurality of switches are switched in a first state and wherein said plurality of capacitor elements are connected in parallel with each other when said plurality of switches are switched in a second state:

wherein said plurality of switches are power MOSFETs, respectively, and wherein said converter further comprises:

a gate drive distribution network including a network of series connected capacitors connected to gate terminals of each of said power MOSFETs, the series connected capacitors including at least high-side and low-side drive ports and distributing a gate charge from one of the high-side and low-side ports to each gate terminal of said power MOSFETs;

a port driver circuit connected to said high-side and low-side drive ports of said gate drive distribution network for supplying a gate switching circuit to said power MOSFETs; and, means for electrically connecting and disconnecting the gate drive distribution network to and from said gate terminals of said power MOSFETS.

4. A step-down DC-to-DC voltage converter comprising:

a voltage input terminal;

a voltage output terminal;

a capacitor array including a plurality of capacitor elements; and switching means for operating in a first mode to connect said capacitor array to said voltage input terminal and to connect each of said plurality of capacitor elements of said capacitor array in series with each other within said capacitor array, and in a second mode to connect said capacitor array to said voltage output terminal and to connect each of said plurality of capacitor elements of said capacitor array in parallel with each other within said capacitor array;

wherein said switching means each includes a plurality of power MOSFETs, respectively, and wherein said converter further comprises:

a gate drive distribution network including a network of series connected capacitors connected to gate terminals of each of said power MOSFETs, the series connected capacitors including at least high-side and low-side drive ports and distributing a gate charge from one of the high-side and low-side ports to each gate terminal of said power MOSFETs;

a port driver circuit connected to said high-side and low-side drive ports of said gate drive distribution network for supplying a gate switching circuit to said power MOSFETs; and, means for electrically connecting and disconnecting the gate drive distribution network to and from said gate terminals of said power MOSFETS.

5. A step-up DC-to-DC voltage converter (as claimed in claim 3,) comprising:

a voltage input terminal:

a voltage output terminal;

a capacitor array including a plurality of capacitor elements: and switching means for operating in a first mode to connect said capacitor array to said voltage input terminal and to connect each of said plurality of capacitor elements of said capacitor array in parallel with each other within said capacitor array, and in a second mode to connect said capacitor array to said voltage output terminal and to connect each of said plurality or capacitor elements of said capacitor array in series with each other within said capacitor array;

wherein said switching means each includes a plurality of power MOSFETs, respectively, and wherein said converter further comprises:

a gate drive distribution network including a network of series connected capacitors connected to gate terminals of each of said power MOSFETs, the series connected capacitors including at least high-side and low-side drive ports and distributing a gate charge from one of the high-side and low-side ports to each gate terminal of said power MOSFETs;

a port driver circuit connected to said high-side and low-side drive ports of said gate drive distribution network for supplying a gate switching circuit to said power MOSFETs; and, means for electrically connecting and disconnecting the gate drive distribution network to and from said gate terminals of said power MOSFETS.

6. An integrated step-down/step-up DC-to-DC voltage converter as claimed in claim 1, wherein said first and second switching means each includes a plurality of power MOSFETs, respectively, and wherein said converter further comprises:

a gate drive distribution network including a network of series connected capacitors connected to gate terminals of each of said power MOSFETs, the series connected capacitors including at least high-side and low-side drive ports and distributing a gate charge from one of the high-side and low-side ports to each gate terminal of said power MOSFETs;

a port driver circuit connected to said high-side and low-side drive ports of said gate drive distribution network for supplying a gate switching circuit to said power MOSFETs; and, means for electrically connecting and disconnecting the gate drive distribution network to and from said gate terminals of said power MOSFETS.

7. An integrated step-down/step-up DC-to-DC voltage converter as claimed in claim 2, wherein said first and second switching means each include a plurality of power MOSFETs, respectively, and wherein said converter further comprises:

a gate drive distribution network including a network of series connected capacitors connected to gate terminals of each of said power MOSFETs, the series connected capacitors including at least high-side and low-side drive ports and distributing a gate charge from one of the high-side and low-side ports to each gate terminal of said power MOSFETs;

a port driver circuit connected to said high-side and low-side drive ports of said gate drive distribution network for supplying a gate switching circuit to said power MOSFETs; and, means for electrically connecting and disconnecting the gate drive distribution network to and from said gate terminals of said power MOSFETS.

8. A DC-to-DC voltage converter (as claimed in claim 1,) comprising:

a capacitor array including a plurality of capacitor elements; and, a plurality of switches which are switchable between at least two states and which are coupled to said plurality of capacitor elements of said capacitor array, wherein said plurality of capacitor elements are connected in series with each other when said plurality of switches are switched in a first state and wherein said plurality of capacitor elements are connected in parallel with each other when said plurality of switches are switched in a second state;

further comprising a symbiotic power circuit for supply power to an input network and an output network of said converter so as to maintain isolation between said input and output networks of said converter, said symbiotic power circuit including first and second stages and means for regulating a flow of charge into said first stage and out of said second stage, and optocouplers for coupling of control signals to said first and second stages so as to maintain electrical isolation of said symbiotic power circuit.

9. A DC-to-DC voltage converter (as claimed in claim 2,) comprising:

a voltage input terminal;

a voltage output terminal;

a capacitor array including a plurality of capacitor elements; and switching means for operating in a first mode to connect said capacitor array to said voltage input terminal and to connect each of said plurality of capacitor elements of said capacitor array in series with each other within said capacitor array, and in a second mode to connect said capacitor array to said voltage output terminal and to connect each of said plurality of capacitor elements of said capacitor array in parallel with each other within said capacitor array;

further comprising a symbiotic power circuit for supply power to an input network and an output network of said converter so as to maintain isolation between said input and output networks of said converter, said symbiotic power circuit including first and second stages and means for regulating a flow of charge into said first stage and out of said second stage, and optocouplers for coupling of control signals to said first and second stages so as to maintain electrical isolation of said symbiotic power circuit.

10. A DC-to-DC voltage converter (as claimed in claim 3,) comprising:

a voltage input terminal:

a voltage output terminal;

a capacitor array including a plurality of capacitor elements; and switching means for operating in a first mode to connect said capacitor array to said voltage input terminal and to connect each of said plurality of capacitor elements of said capacitor array in parallel with each other within said capacitor array, and in a second mode to connect said capacitor array to said voltage output terminal and to connect each of said plurality of capacitor elements of said capacitor array in series with each other within said capacitor array;

further comprising a symbiotic power circuit for supply power to an input network and an output network of said converter so as to maintain isolation between said input and output networks of said converter, said symbiotic power circuit including first and second stages and means for regulating a flow of charge into said first stage and out of said second stage, and optocouplers for coupling of control signals to said first and second stages so as to maintain electrical isolation of said symbiotic power circuit.

11. A DC-to-DC voltage converter as claimed in claim 1, further comprising a symbiotic power circuit for supply power to an input network and an output network of said converter so as to maintain isolation between said input and output networks of said converter, said symbiotic power circuit including first and second stages and means for regulating a flow of charge into said first stage and out of said second stage, and optocouplers for coupling of control signals to said first and second stages so as to maintain electrical isolation of said symbiotic power circuit.

12. A DC-to-DC voltage converter as claimed in claim 2, further comprising a symbiotic power circuit for supply power to an input network and an output network of said converter so as to maintain isolation between said input and output networks of said converter, said symbiotic power circuit including first and second stages and means for regulating a flow of charge into said first stage and out of said second stage, and optocouplers for coupling of control signals to said first and second stages so as to maintain electrical isolation of said symbiotic power circuit.

* * * * *